(12) United States Patent
Hasegawa et al.

(10) Patent No.: US 7,800,719 B2
(45) Date of Patent: Sep. 21, 2010

(54) DISPLAY

(75) Inventors: Masahiro Hasegawa, Tenri (JP); Akira Sakai, Kyoto (JP); Kensaku Higashi, Shizuoka (JP); Yasuhiko Motoda, Shizuoka (JP); Hiroto Katagiri, Shizuoka (JP)

(73) Assignees: Sharp Kabushiki Kaisha, Osaka (JP); Tomoegawa Co., Ltd., Tokyo (JP)

( * ) Notice: Subject to any disclaimer, the term of this patent is extended or adjusted under 35 U.S.C. 154(b) by 749 days.

(21) Appl. No.: 11/701,372

(22) Filed: Feb. 2, 2007

(65) Prior Publication Data

US 2007/0195233 A1   Aug. 23, 2007

(30) Foreign Application Priority Data

| Feb. 17, 2006 | (JP) | ............................. 2006-041456 |
| Feb. 17, 2006 | (JP) | ............................. 2006-041457 |
| Jan. 25, 2007 | (JP) | ............................. 2007-015240 |
| Jan. 25, 2007 | (JP) | ............................. 2007-015241 |

(51) Int. Cl.
   *G02F 1/1335* (2006.01)
(52) U.S. Cl. .................................................. 349/112
(58) Field of Classification Search .................. 349/112
   See application file for complete search history.

(56) References Cited

U.S. PATENT DOCUMENTS

| 5,108,857 A | 4/1992 | Kitayama et al. |
| 5,851,700 A | 12/1998 | Honda et al. |
| 2007/0064180 A1 | 3/2007 | Hasegawa et al. |

FOREIGN PATENT DOCUMENTS

| JP | 63-309902 | 12/1988 |
| JP | 64-40903 | 2/1989 |
| JP | 64-40905 | 2/1989 |
| JP | 64-40906 | 2/1989 |
| JP | 64-77001 | 3/1989 |
| JP | 1-147405 | 6/1989 |
| JP | 1-147406 | 6/1989 |
| JP | 2-51101 | 2/1990 |
| JP | 2-54201 | 2/1990 |
| JP | 2-67501 | 3/1990 |
| JP | 3-87701 | 4/1991 |
| JP | 3-109501 | 5/1991 |
| JP | 6-9714 | 1/1994 |
| JP | 7-64069 | 3/1995 |
| JP | 2000-180833 | 6/2000 |
| JP | 2005-265915 | 9/2005 |
| JP | 2006-003506 | 1/2006 |

*Primary Examiner*—Jerry T Rahll
(74) *Attorney, Agent, or Firm*—Nixon & Vanderhye P.C.

(57) ABSTRACT

To provide a display which can improve viewing angle dependency of a contrast ratio at least in a specific azimuth without design change of a basic structure of a display element, limitation to white display state or black display state, and deterioration in display quality in other directions. The above-mentioned display is a display comprising: a display element with a contrast ratio dependent on a viewing angle; and an anisotropic scattering film having an anisotropic scattering layer, wherein the anisotropic scattering film is located on a viewing screen side of the display element and has a scattering central axis in substantially the same azimuth as an azimuth in which a contrast ratio of the display element in a direction inclined by a certain angle from a normal direction of a viewing screen of the display element has an extreme value.

16 Claims, 40 Drawing Sheets

DISPLAY

CROSS-REFERENCE TO RELATED APPLICATION

This Nonprovisional application claims priority under 35 U.S.C §119(a) on Patent Application No. 2006-41456 and Patent Application No. 2006-41457 filed in Japan on Feb. 17, 2006, Patent Application No. 2007-15240 and Patent Application No. 2007-15241 filed in Japan on Jan. 25, 2007, the entire contents of which are hereby incorporated by reference.

BACKGROUND OF THE INVENTION

1. Field of the Invention

The present invention relates to a display. More specifically, the present invention relates to a display including a display element such as a liquid crystal display element and an anisotropic scattering film.

2. Description of the Related Art

Liquid crystal displays typified by those in Twisted nematic (TN) mode have been known as a typical example of displays with display performances dependent on a viewing angle (with viewing angle characteristics). The term "with display performances dependent on a viewing angle" means that such devices show different display performances such as contrast ratio, gradation characteristics, and chromaticity between when observed in the front direction (the normal direction of the viewing screen of the display, the direction at a viewing angle of 0°) and when observed in an oblique direction (direction at a viewing angle larger than 0°). It is generally known that these display performances when the device is observed in the oblique direction are inferior to those when observed in the front direction.

In a TN mode liquid crystal display, the contrast ratio gradually decreases as the viewing angle increases in the upper, lower, left, or right direction (in the direction of 3 o'clock, 6 o'clock, 9 o'clock, and 12 o'clock). For example, even if the contrast ratio is 320 when the device is observed in the front direction, the contrast ratio is 10 when observed in the upper direction (direction of 12 o'clock) at a viewing angle of 75°, in the lower direction (direction of 6 o'clock) at a viewing angle of 50°, in the left direction (direction of 9 o'clock) at a viewing angle of 65°, and in the right direction (direction of 3 o'clock) at a viewing angle of 68°. The display color is neutral (not tinged) when observed in the front direction, but the display color is tinged with yellow when observed in the upper, lower, left, or right direction. Particularly when observed in the lower direction, an abnormal phenomenon of a gradation characteristic referred to as a gradation reversal in which negative and positive are reversed in a display image may be observed. Such viewing angle dependency of display performances of the liquid crystal displays results from optical anisotropy of components such as anisotropy of refractive index of liquid crystal molecules, polarization absorption property and polarization transmission property of a polarizing plate, and such viewing angle dependency of the display performances can be said to be inherent characteristics in the liquid crystal displays.

Various methods have been proposed as a method for improving the viewing angle dependency of the display performances of the liquid crystal displays. Examples of methods proposed as such methods include: pixel division methods (including Half Tone Gray Scale method in which one pixel is divided into multiple sections and voltages applied to pixels are changed in certain proportions and Domain Division method in which one pixel is divided into multiple domains and liquid crystal alignment is controlled separately in each domain); display modes such as In-plane switching (IPS) mode in which an electric field is applied to liquid crystals laterally, Multi-domain Vertical Alignment (MVA) mode in which liquid crystal vertically aligned during no voltage application is driven, and Optically Compensated Birefringence (OCB) mode in which a bend aligned cell and a retardation film are combined; and an optical compensation method using a retardation film. It has been also investigated to employ these methods in appropriate combinations, and these methods are adopted in many liquid crystal displays which have been already commercialized.

However, if the above-mentioned pixel division methods or the display modes are adopted, an alignment film, a structure of an electrode and the like, need to be modified, and for this modification, establishment of the production techniques or installation of the production facilities is needed. As a result, the production becomes difficult, and the production costs increase. In these respects, there was room for improvement. Further, its effect of improving the viewing angle dependency is insufficient. Also in the optical compensation method using a retardation film, its effect of improving the viewing angle dependency is limited. For example, an optimal phase difference value for compensating a phase difference of a liquid crystal cell varies between the cases of displaying white and black, and therefore it is impossible to compensate the phase difference of the liquid crystal cell in both black display and white display by the optical compensation method. In addition, the compensation effect attributed to the retardation film is not attained at all in axial azimuths of polarization axes (transmission axis and absorption axis) of a polarizing plate in principle, and the improvement effect is obtained only within the range of specified azimuth angles. In these respects, there was room for improvement.

In addition to the above-mentioned methods, a method of providing a scattering film for averaging outgoing light on the viewing screen side of a liquid crystal display element is known as a method of improving the viewing angle dependency of the display performances of the liquid crystal displays. This method can be applied to all display modes and basically needs no modification of the structure of the display cell. In addition, the effect can be attained during both black display and white display and attained also in the axial azimuth of the polarizing axes of the polarizing plate, which is different from in the above-mentioned optical compensation method using the retardation film.

A diffusion backlight system which emits diffused light is employed as a light source of a commonly used liquid crystal display. Most of liquid crystal display modes or polarizing plates show the best characteristics for vertically incident light. Therefore, light from the diffusion backlight system is collimated as far as possible by a lens film and the like, and is vertically inputted into a liquid crystal display element (liquid crystal cell). As a result, a better effect of improving the viewing angle dependency can be attained, and therefore many technologies concerning this diffusion backlight system have been proposed.

However, a method of obtaining the collimated light simply and effectively has not been established yet, and therefore, a method of using a scattering film for improving the viewing angle dependency is employed actually in combination with the diffusion backlight system, as mentioned above. In such a case, the effect of improving the viewing angle dependency can be attained as mentioned above, but there was room for improvement in that during black display, the scattering film angles part of leakage light, which is obliquely inputted into or outputted from the liquid crystal cell, to the front direction, and thereby light leakage increases in the front direction, which largely reduces the contrast ratio in the front direction. This is because the scattering film has isotropic scattering performances, and therefore the scattering property for transmitting light of the scattering film does not vary so much even if the incidence angle is somewhat changed.

For the above-mentioned circumstances, light control plates produced by irradiating a resin composition consisting of a plurality of compounds, each of which has a refractive index differing from one another and one or more photopolymerizable carbon-carbon double bonds in a molecule, with ultraviolet light from a linear light source within a prescribed angular range, and thereby curing the resin composition (for example, referring to Japanese Kokai Publication No. Sho-63-309902, Japanese kokai Publication No. Sho-64-40903, Japanese Kokai Publication No. Sho-64-40905, Japanese Kokai Publication No. Sho-64-40906, Japanese Kokai Publication No. Sho-64-77001, Japanese Kokai Publication No. Hei-01-147405, Japanese Kokai Publication No. Hei-01-147406, Japanese Kokai Publication No. Hei-02-51101, Japanese Kokai Publication No. Hei-02-54201, Japanese Kokai Publication No. Hei-02-67501, Japanese Kokai Publication No. Hei-03-87701, Japanese Kokai Publication No. Hei-03-109501, and Japanese Kokai Publication No. Hei-06-9714), and liquid crystal displays equipped with such light control plates (for example, referring to Japanese Kokai Publication No. Hei-07-64069 and Japanese Kokai Publication No. 2000-180833) are disclosed. Such light control plates selectively scatter light which enters the plates at a specific angle. Accordingly, it is thought that use of these light control plates can eliminate the above-mentioned reduction in contrast ratio in the front direction to some extent.

However, it is thought that as shown in FIG. 50, in this resin cured part of the light control plate, a plate-like regions 40 having refractive indexes different from those of surrounding regions are formed in parallel with one another in conformity with the length direction of a linear light source 51 located above a light control plate 50 in preparation of the light control plate 50. Therefore, the incidence angle dependency of the scattering property which the light control plate 50 exhibits is hardly recognized when the light control plate 50 is rotated about the A-A axis shown in FIG. 50, along which the plate-like regions 40 having refractive indexes different from those of surrounding regions alternately appear. However, the incidence angle dependency of the scattering property is recognized when rotated about the B-B axis along which the refractive index does not change and is uniform.

FIG. 51 is a diagram schematically showing the incidence angle dependency of the scattering property which the light control plate 50 in FIG. 50 shows. The vertical axis represents a linear transmitting light quantity as an indicator of a scattering degree. The horizontal axis represents an incidence angle. The solid line and the broken line in FIG. 51 represent the case of rotating the light control plate 50 about the A-A axis in FIG. 50 and the case of rotating the light control plate 50 about the B-B axis in FIG. 50, respectively. It is shown by the plus and minus of the incidence angle that the light control plate 50 is rotated in directions opposite to each other.

The linear transmitting light quantity expressed by the solid line in FIG. 51 is small in both of the front direction and the oblique direction. This means that the light control plate 50 is in a state of scattering light irrespective of the incidence angle if rotated about the A-A axis. The linear transmitting light quantity expressed by the broken line in FIG. 51 becomes smaller in the directions close to an incidence angle of 0°. This means that the light control plate 50 is also in a state of scattering light in the front direction when rotated about the B-B axis. Further, in the directions at large incidence angles, the linear transmitting light quantity increases. This means that the light control plate 50 is in a state of transmitting light in an oblique direction when rotated about the B-B axis.

As mentioned above, the previous light control plates show the anisotropic scattering property (property in which the scattering property varies depending on the incidence angle) only in a specific azimuth, and therefore the effect of improving the viewing angle dependency is obtained only in the specific azimuth. In other azimuths, the display quality is reduced because in other azimuths, incident light in an oblique direction is substantially uniformly scattered regardless of the incident angle. In such a respect, the previous light control plates have room for improvement.

SUMMARY OF THE INVENTION

The present invention has been made of the above-mentioned state of the art. The present invention has an object to provide a display which can improve viewing angle dependency of a contrast ratio at least in a specific azimuth without design change of a basic structure of a display element, limitation to white display state or black display state, and deterioration in display quality in other directions.

The present inventors made various investigations concerning displays including a display element with a contrast ratio dependent on a viewing angle and an anisotropic scattering film having an anisotropic scattering layer. The inventors first noted the viewing angle dependency of the contrast ratio of the display element. The inventors noted that in the display element, an azimuth in which the contrast ratio easily becomes lower as a polar angle becomes larger (an azimuth showing a narrow viewing angle of the display element) and an azimuth in which the contrast ratio is kept high as a polar angle becomes larger (an azimuth showing a wide viewing angle of the display element) exist. For example, in a typical VA mode liquid crystal display element, the contrast ratio is kept high even if the polar angle becomes larger in the upper direction (the direction having an azimuth angle of 90°), the lower direction (the direction having an azimuth angle of 270°), the left direction (the direction having an azimuth angle of 180°), the right direction (the direction having an azimuth angle of 0°). However, in the upper right direction (the direction having an azimuth angle of 45°), the upper left direction (the direction having an azimuth angle of 135°), the lower left direction (the direction having an azimuth angle of 225°), and the lower right direction (the direction having an azimuth angle of 315°), as the polar angle becomes larger, the contrast ratio easily becomes lower in comparison to the contrast ratios in the upper, lower, left, or right direction.

Then, the present inventors noted a scattering property of an anisotropic scattering film having a scattering central axis. In the anisotropic scattering film having a scattering central axis, the anisotropic scattering property (the property in which the scattering property varies depending on the incidence angle) is shown substantially symmetrically about the scattering central axis. The inventors found that if this anisotropic scattering film is located on the viewing screen side of the display element in such a way that an axial azimuth of the scattering central axis is substantially the same as an azimuth in which a contrast ratio of the display element in a direction inclined by a certain angle from the normal direction of the viewing screen of the display element has an extreme value (the above-mentioned azimuth showing a wide or narrow viewing angle of the display element, hereinafter, also referred to as "extreme value azimuth"), light (white luminance or black luminance) which enters the film in a direction substantially parallel to the axial direction of the scattering central axis can be scattered (diffused) in all directions about the scattering central axis and averaged, and therefore the viewing angle dependency of the contrast ratio at least in the extreme value azimuth that is substantially the same as the axial azimuth of the scattering central axis can be improved. For example, if an anisotropic scattering film having a scattering central axis in the normal direction of the viewing screen of the display element is located on the viewing screen side of the display element, the effect of improving the viewing angle dependency of the contrast ratio can be obtained in wider azimuths about the direction having a polar angle of 0°. If an anisotropic scattering film having a scattering central axis in a direction inclined by 30° from the normal direction of the viewing screen of the display element is located on the viewing screen side of the display element in such a way that an axial azimuth of the scattering central axis is substantially the same as an extreme value azimuth of the display element, in the extreme value azimuth, the effect of improving the viewing angle dependency of the contrast ratio can be obtained in directions showing a large polar angle around the direction having a polar angle of 30°.

Further, the present inventors found that this anisotropic scattering film shows anisotropic scattering property in azimuths other than the axial azimuth of the scattering central axis, which is different from in previous anisotropic scattering films showing anisotropic scattering property only in a specific azimuth, and therefore, incident light in directions other than the direction substantially parallel to the axial direction of the scattering central axis is weakly scattered and use of this anisotropic scattering film can suppress the scattering of light which enters the film in such directions from reducing display quality in directions showing a large contrast ratio, and the like.

Further, a commonly used display element is designed to show optimal display performances such as gamma curve and chromaticity in the direction showing the largest contrast ratio. The viewing angle dependency of these display performances has the same tendency as in the viewing angle dependency of the contrast ratio. Therefore, the inventors found that at least in the extreme value azimuth that is substantially the same as the axial azimuth of the scattering central axis, the viewing angle dependency of the display performances such as gamma curve and chromaticity also can be improved. The inventors found that the above-mentioned effect of improving the viewing angle dependency of the display performances by the anisotropic scattering film can be obtained without limitation to white display state or black display state, which is different from in retardation films. The inventors found that, because of the mechanism, the effect can be obtained for any display elements having viewing angle-dependent display performances, without design change of the basic structure of the display elements. As a result, the present inventors admirably solved the above-mentioned problems, leading to completion of the present invention.

That is, the present invention is a display comprising:

a display element with a contrast ratio dependent on a viewing angle; and an anisotropic scattering film having an anisotropic scattering layer, wherein the anisotropic scattering film is located on a viewing screen side of the display element and has a scattering central axis in substantially the same azimuth as an azimuth in which a contrast ratio of the display element in a direction inclined by a certain angle from a normal direction of a viewing screen of the display element has an extreme value.

BRIEF DESCRIPTION OF THE DRAWINGS

In FIG. 49A, P represents a direction having an incidence angle of 0°, S represents a scattering central axis, P(S) represents that a direction in which an incidence angle of 0° and an axial direction of the scattering central axis are the same, and the length of the arrow extending from a point of intersection of the scattering central axis and the anisotropic scattering film up to a curved surface in bell form (indicated by a broken line in the figure) represents a linear transmitting light quantity in each direction.

EXPLANATION OF SYMBOLS AND NUMERALS

Figure 1A:
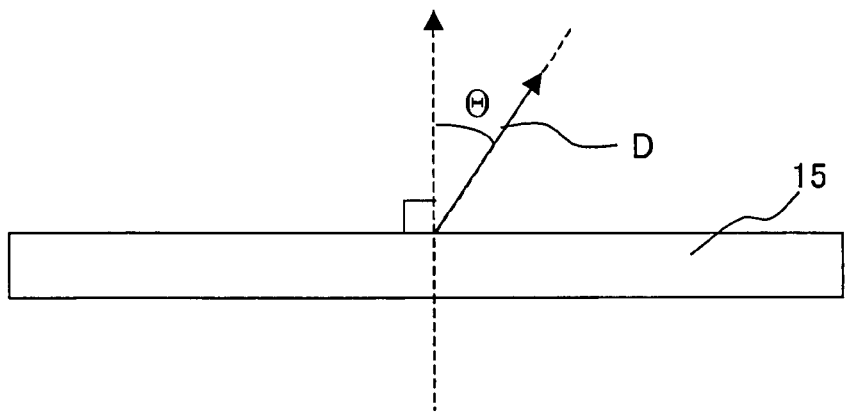
FIG. 1A is a diagram schematically showing a direction of a polar angle Θ of a display element.

3: Polarizer Film
3a, 3b: Polarizing element
4: Wide View (WV) film
10: Anisotropic scattering layer
10a: First anisotropic scattering film
10b: Second anisotropic scattering film
11a: VA mode liquid crystal cell
11b: TN mode liquid crystal cell
11c: IPS mode liquid crystal cell
12a: First retardation film
12b: Second retardation film
12c: Third retardation film
12d: Fourth retardation film
12e: Fifth retardation film
12f: Sixth retardation film
12g: Seventh retardation film
12h: Eighth retardation film
12j: Ninth retardation film
13a: First polarizing plate
13b: Second polarizing plate
13c: Third polarizing plate
13e: Fifth polarizing plate
13f: Sixth polarizing plate
13g: Seventh polarizing plate
13h: Eighth polarizing plate
13i: Polarizing plate with WV film
13j: Ninth polarizing plate
15: Display element
15a: VA mode liquid crystal display element
15b: TN mode liquid crystal display element
15c: IPS mode liquid crystal display element
20: Region having refractive indexes different from those of surrounding regions (rod-shaped hardening region)
30: Optical receiver
40: Plate-like region having refractive indexes different from those of surrounding regions
50: Light control plate
51: Linear light source
100: Display
100a: VA mode liquid crystal display
100b, 200b: TN mode liquid crystal display
100c: IPS mode liquid crystal display
a: Absorption axis
A: Angle formed by extreme value azimuth M1 of display element and azimuth at an azimuth angle of 0° of display
b: Inclination direction (Alignment control direction of discotic liquid crystal inside WV film)
C: Isostere of linear transmitting light quantity
d: Alignment control direction of liquid crystal inside liquid crystal cell
D: Direction inclined by Θ from normal direction of viewing screen of display element
$M_1$: Extreme value azimuth of display element
s: Slow axis
S: Scattering central axis
$S_1$: Axial azimuth of the scattering central axis S
δ: Angle formed by extreme value azimuth $M_1$ of display element and axial azimuth $S_1$ of scattering central axis
Φ: Azimuth angle
ω: Polar angle of scattering central axis S

DESCRIPTION OF THE PREFERRED EMBODIMENTS

The present invention is mentioned below in more detail.

The display of the present invention includes a display element with a contrast ratio dependent on a viewing angle and an anisotropic scattering film having an anisotropic scattering layer. In the above-mentioned display element, the contrast ratio has a dependency on a viewing angle. In the present description, the display element is not especially limited as long as it is an element for performing display and a liquid crystal display element may be mentioned, for example. The contrast ratio is one of the display performances of the display element and generally represented by a value calculated by dividing the largest luminance by the smallest luminance. The "dependency on a viewing angle" means that the display element shows different display performances between when observed in the front direction (the normal direction of the viewing screen of the display, the direction having a polar angle of 0°) and when observed in an oblique direction (the direction having a polar angle larger than 0°), or even at the same polar angle, between when observed in one azimuth and when observed in another azimuth. Therefore, "with a contrast ratio dependent on a viewing angle" means that the display element shows different contrast ratios between when observed in the normal direction and when observed in an oblique direction, or even at the same polar angle, between when observed in one azimuth and when observed in another azimuth.

The display element generally shows a larger contrast ratio as the viewing direction is closer to the front direction, but the display element may show a smaller contrast ratio as the viewing direction is closer to the normal direction.

The above-mentioned anisotropic scattering film has an anisotropic scattering layer. In the present description, the anisotropic scattering layer is not especially limited as long as it shows anisotropic scattering property (property in which the scattering property varies depending on the incidence angle) in at least one azimuth. The azimuth means an in-plane direction of the film surface of the anisotropic scattering film or of the viewing screen of the display element, and the azimuth is represented by an azimuth angle Φ (0°≦Φ≦360°). The incidence angle means an angle formed by the normal direction of the film surface of the anisotropic scattering film and an incident direction. Examples of the form of the above-mentioned anisotropic scattering film include a form in which the anisotropic scattering film consists of only the anisotropic scattering layer, a form in which a transparent substrate is laminated on one side (the viewing screen side or the back surface side) of the anisotropic scattering layer, and a form in which a transparent substrate is laminated on each side (the viewing screen side and the back surface side) of the anisotropic scattering layer. The above-mentioned anisotropic scattering layer may have a single layer structure or a multi layer structure.

The above-mentioned transparent substrate is preferred to have higher transparency. Therefore, the total luminous transmittance (JIS K 7361-1) of the above-mentioned transparent substrate is preferably 80% or more, and more preferably 85% or more, and furthermore preferably 90% or more. The haze value (JIS K 7136) of the above-mentioned transparent substrate is preferably 3.0 or less, and more preferably 1.0 or less, and furthermore preferably 0.5 or less. Examples of the above-mentioned transparent substrate include a transparent plastic film and a glass plate, but the plastic film is preferred because it has slim profile and lightweight, and is excellent in impact resistance and productivity. Examples of materials of the above-mentioned plastic film include polyethylene terephthalate (PET), polyethylene naphthalate (PEN), triacetylcellulose (TAC), polycarbonate (PC), polyallylate, polyimide (PI), aromatic polyamide, polysulfone (PS), polyether sulfone (PES), cellophane, polyethylene (PE), polypropylene (PP), polyvinyl alcohol (PVA) and cyclo olefin resin. The form of the above-mentioned plastic film includes a form in which the above-mentioned plastic film consists of a film formed by processing the above-mentioned material singly or a mixture of the above-mentioned materials and a form in which the above-mentioned plastic film consists of a laminate of the film formed as above mentioned. The above-mentioned transparent substrate preferably has a thickness of 1 μm to 5 mm in view of the application or the productivity, and more preferably 10 to 500 μm, and furthermore preferably 50 to 150 μm.

Figure 2A:
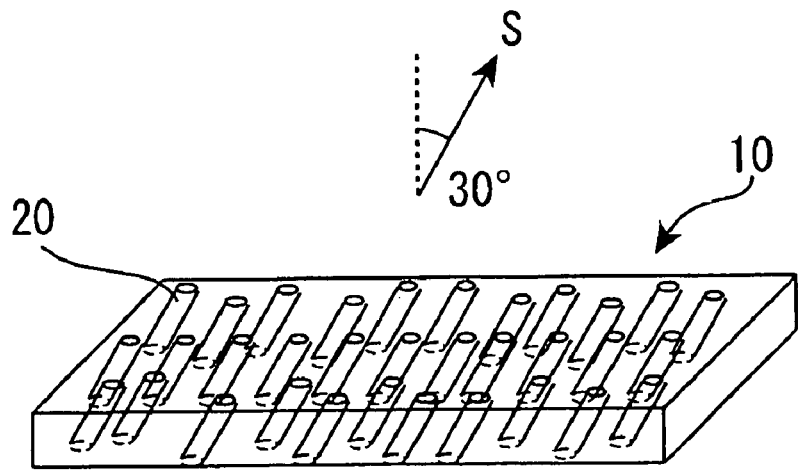
FIG. 2A is a perspective view schematically showing one example of a structure of an anisotropic scattering film (anisotropic scattering layer) constituting the display of the present invention.
Figure 2B:
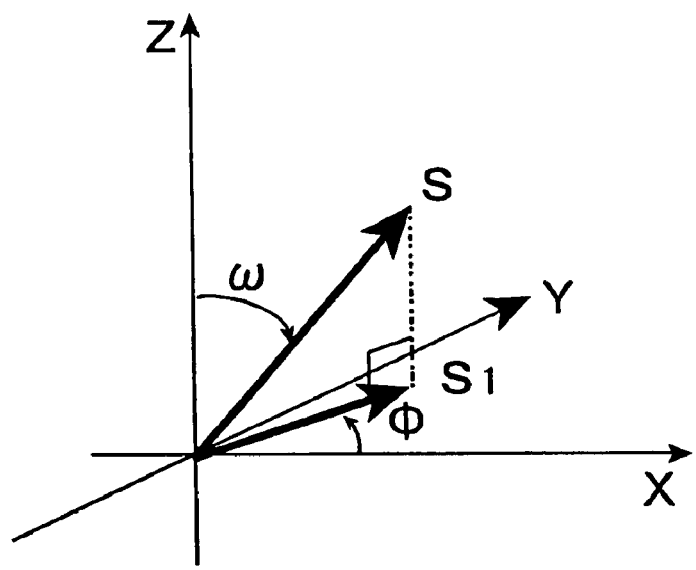
FIG. 2B is a diagram showing a polar angle and an axial azimuth of a scattering central axis of the anisotropic scattering film.

In the present invention, the above-mentioned anisotropic scattering film has a scattering central axis. In the present description, the scattering central axis means an axis in which the anisotropic scattering property is shown substantially symmetrically about its axial direction. In the present description, the axial direction of the scattering central axis is from the back surface side to the viewing screen side (observation surface side), as shown in FIG. 2B, for example. Also the normal direction of the film surface (Z axial direction) is from the back surface side to the viewing screen side. At this time, the angle ω formed by the axial direction of the scattering central axis S and the normal direction of the film surface (Z axial direction) is also referred to as a polar angle of the scattering central axis S. The above-mentioned scattering central axis S has the axial azimuth $S_1$ projected on the film surface if the axis S is inclined from the normal direction of the film surface (ω is not 0°), as shown in FIG. 2B, for example. If the scattering central axis S is substantially the same as the normal direction of the film surface (ω is substantially 0°), the axis S is considered to have the axial azimuth $S_1$ in all azimuths. The axial azimuth $S_1$ of the scattering central axis also has a predetermined direction, and the direction of the axial azimuth is determined according to the axial direction.

The above-mentioned anisotropic scattering film having the scattering central axis shows anisotropic scattering property in all azimuths. The scattering property of the anisotropic scattering film are not uniquely represented, but if a linear transmitting light quantity is used as an indicator of the scattering property of the anisotropic scattering film constituting the display of the present invention, the linear transmitting light quantity varies substantially symmetrically about the axial direction of the scattering central axis. The linear transmitting light quantity refers to a light quantity of collimated light exiting in the same direction as that of incident light when collimated light having a prescribed light quantity enters the anisotropic scattering film. The method shown in FIG. 6 may be mentioned as a measurement method of the above-mentioned linear transmitting light quantity, for example. In the method shown in FIG. 6, an optical receiver 30 (for example, goniophotometer) is fixed at a position which receives straight light from a light source (not shown in FIG. 6), and a specimen 10a is disposed between the light source and the optical receiver 30. According to this method, the linear transmitting light quantity can be measured for example, by rotating the specimen 10a about the L-L axis (rotation axis), and thereby changing an incidence angle in the M-M azimuth (measurement azimuth) perpendicular to the L-L axis in the film surface. The above-mentioned measurement azimuth can be appropriately changed by changing the rotation axis. Therefore, this method permits measurement of the linear transmitting light quantity in various directions.

In the present invention, the anisotropic scattering film is located on a viewing screen side of the display element and has a scattering central axis in substantially the same azimuth as an azimuth in which a contrast ratio of the display element in a direction inclined by a certain angle from a normal direction of a viewing screen of the display element has an extreme value. As a result, the extreme value azimuth of the display element is substantially the same as the axial azimuth of the scattering central axis of the anisotropic scattering film, and therefore, in the extreme value azimuth, light which enters the film in a direction substantially parallel to the axial direction of the scattering central axis is scattered in all directions about the scattering central axis and averaged. Therefore, at least in the extreme value azimuth, the viewing angle dependency of the contrast ratio can be improved. The above-mentioned anisotropic scattering film shows the anisotropic scattering property in all azimuths, as mentioned above. Therefore, light in a direction which is off from the axial direction of the scattering central axis, for example, light having a large incidence angle, is weakly scattered, and can be mostly transmitted. Therefore, it can be possible to suppress the scattering of the light entering in such a direction from reducing display quality in directions showing a large contrast ratio of the display element.

Further, a commonly used display element is designed to show optimal display performances such as gamma curve and chromaticity in the direction showing the largest contrast ratio. Therefore, the viewing angle dependency of these display performances also has the same tendency as in the viewing angle dependency of the contrast ratio. Accordingly, the present invention can also improve the viewing angle dependency of the display performances such as gamma curve and chromaticity, generally. The functional effects of the present invention can be obtained for any display elements having viewing angle-dependent display performances without design change of the basic structure and limitation to white display state or black display state, because of the mechanism.

The "azimuth in which a contrast ratio of the display element in a direction inclined by a certain angle from the normal direction of the viewing screen of the display element has an extreme value" is specifically mentioned below, with reference to FIGS. 1A to 1C.

FIG. 1A is a diagram schematically explaining "a direction inclined by a certain angle from the normal direction of the viewing screen of the display element".

In FIG. 1A, the dotted line shows a direction having a polar angle of Θ, and the dotted arrow shows the normal direction of the viewing screen of a display element 15. The "direction inclined by a certain angle Θ from the normal direction of the viewing screen of the display element" means all directions D having a polar angle of Θ, and the directions D are from the back surface side to the viewing screen side.

The normal direction of the viewing screen of the display element 15 is in the same direction as the normal direction (Z axial direction) of the viewing screen of the display and as the normal direction of the film surface of the anisotropic scattering film.

Figure 1B:
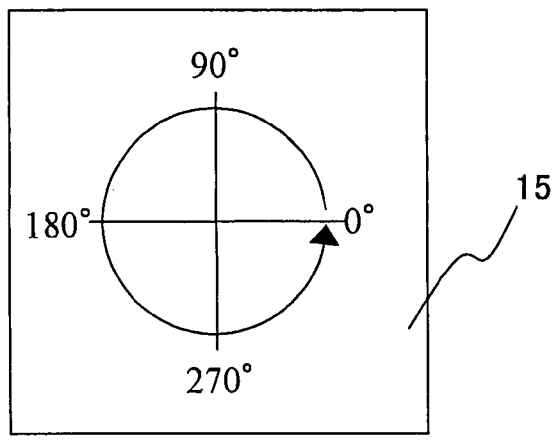
FIG. 1B is a diagram schematically showing an azimuth of the display element.

FIG. 1B is a diagram schematically showing an azimuth of the display element.

As shown in FIG. 1B, the azimuth of the display element 15 is represented by an azimuth angle Φ (0°≦Φ<360°). In the present description, the direction having Φ=0° is referred to as right direction, the direction having Φ=90° as upper direction, the direction having Φ=180° as left direction, and the direction having Φ=270° as lower direction. FIGS. 1A and 1B show that a direction having an azimuth angle Φ and a polar angle −Θ (0°≦Θ<90°) is completely in the same direction as a direction having an azimuth angle Φ+180° (an azimuth opposite to the azimuth at an azimuth angle Φ) and an polar angle Θ. In the present description, the value range of the polar angle is 0° or more generally and thereby, the azimuth at an azimuth angle Φ is distinguished from the azimuth at an azimuth angle Φ+180°. Each direction is represented by specifying both the azimuth angle Φ (0°≦Φ≦360°) and the polar angle Θ (0°≦Θ<90°).

Figure 1C:
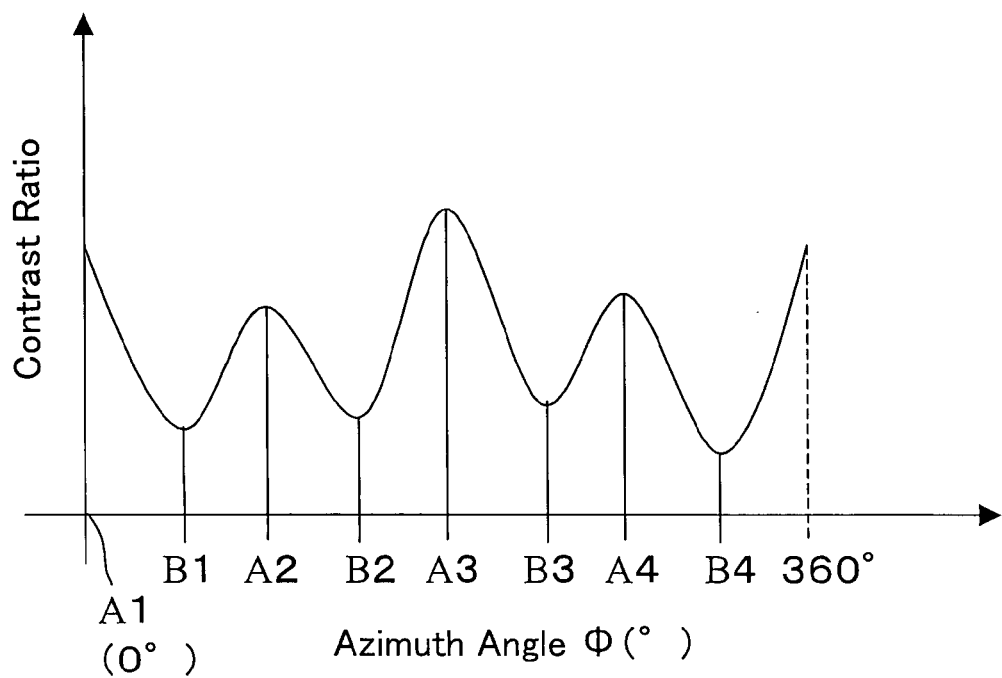
FIG. 1C is a diagram schematically showing azimuth angle dependency of a contrast ratio of the display element in a direction having a certain polar angle Θ.

FIG. 1C is a diagram schematically showing an extreme value azimuth of the display element. The "extreme value azimuth of the display element" means, in a graph showing azimuth angle dependency of a contrast ratio of the display element in a direction inclined by a certain angle from the normal direction of the viewing screen of the display element, an azimuth shown as the top of the mountain-shaped curved line (an azimuth in which the contrast ratio of the display element has a maximum value, hereinafter also referred to as "maximum azimuth" or "maximum azimuth of the display element") or an azimuth shown as the lowest point of the valley shaped curved line (an azimuth in which the contrast ratio of the display element has a minimum value, hereinafter also referred to as "minimum azimuth" or "minimum azimuth of the display element". For example, in FIG. 1C, A1 to A4 each show the maximum azimuth and B1 to B4 each show the minimum azimuth.

The number of the maximum azimuth of the display element is not especially limited, and is four generally, as shown in FIG. 1C. The number of the minimum azimuth of the display element is not especially limited, and is four generally, as shown in FIG. 1C. For example, if a liquid crystal display element in which a pair of polarizing plates are disposed on both sides of a liquid crystal cell in such a way that the absorption axes (transmission axes) are perpendicular to each other (Cross-Nicol arrangement) is observed in the axial directions of the absorption axes (transmission axes) of the polarization plates, the contrast ratio of the liquid crystal display element is kept high even if the viewing angle is increased (the polar angle is increased) because the angle formed by the absorption axes (transmission axes) is kept at 90°. Therefore, in such a case, the four axial azimuths of the absorption axes (transparent axes) of the polarizing plates are considered to be the maximum azimuths. In contrast, if the liquid crystal display element is observed in four azimuths bisecting the four angles formed by the absorption axis and the transmission axis of the polarizing plate, the contrast ratio is decreased as the viewing angle is increased because the angle formed by the absorption axes (transmission axes) is off 90°. These four azimuths are considered to be azimuths shown as the lowest points of the valley shaped curved line (minimum azimuths) in the graph showing the azimuth angle dependency of the contrast ratio of the display element in a direction inclined by a certain angle from the normal direction of the viewing screen of the display element.

In the present description, the term "substantially the same" means not only a state where the two azimuths are the same but also a state which can be considered to be equivalent to the state where the two azimuths are the same in view of the functional effects of the present invention.

As mentioned above, the scattering central axis may be (i) in substantially the same direction as the normal direction of the viewing screen of the display element, or may be (ii) inclined in substantially the same azimuth as the extreme value azimuth, from the normal direction of the viewing screen of the display element. Therefore, the polar angle ω of the scattering central axis is not especially limited as long as it is 0° or more and less than 90°, but is preferably 0° or more and less than 60°. The polar angle ω of the scattering central axis is more preferably substantially 0° in terms of improvement in display quality of the TN mode liquid crystal display element and the like, and still more preferably 30° or more and 50° or less in terms of improvement in display quality in a direction having a specific azimuth and a large polar angle.

Figure 7:
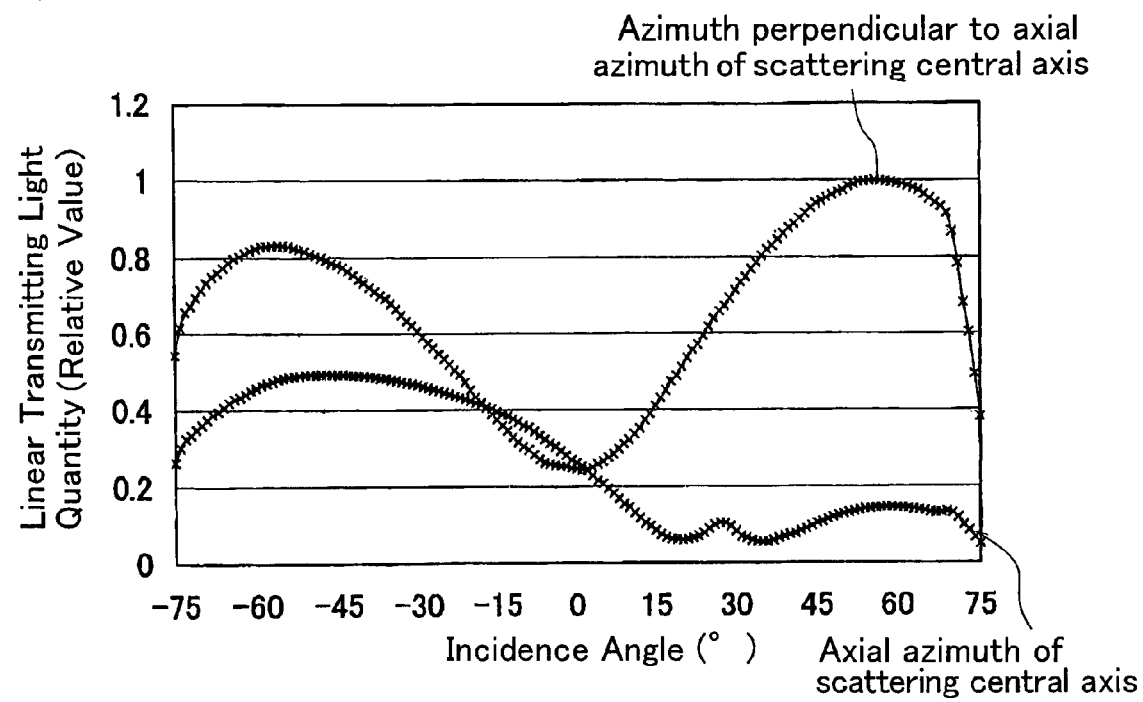
FIG. 7 is a diagram showing incidence angle dependency of scattering property of a first anisotropic scattering film.

According to the above-mentioned anisotropic scattering film having a scattering central axis in a direction inclined from the normal direction of the viewing screen of the display element, in the axial azimuth of the scattering central axis, the linear transmitting light quantity substantially similarly varies, depending on the incidence angle η (−90°<η<90°), between in directions (ω<η<90°) having incidence angles larger than the polar angle ω (0°≦ω<90°) of the scattering central axis and in directions (−90°<η<ω) having incidence angles smaller than the polar angle ω of the scattering central axis. According to the anisotropic scattering film having a scattering central axis in a direction having a polar angle of 30°, as shown in FIG. 7, in the axial azimuth of the scattering central axis, the linear transmitting light quantity varies in a small arch as the incidence angle is increased in directions having polar angles larger than 30°, but, in directions having polar angles smaller than 30°, the linear transmitting light quantity varies in a large arch as the incidence angle is decreased.

According to the above-mentioned anisotropic scattering film having a scattering central axis in a direction inclined from the normal direction of the viewing screen of the display element, in the azimuths perpendicular to the axial azimuth of the scattering central axis, the linear transmitting light quantity generally varies, depending on the incidence angle η (−90°<η<90°), substantially symmetrically between in directions (0°<η<90°) having incidence angles larger than 0° and in directions (−90°<η<0°) having incidence angles smaller than 0°. For example, according to an anisotropic scattering film having a scattering central axis in a direction having a polar angle of 30°, as shown in FIG. 7, in the azimuths perpendicular to the axial azimuth of the scattering central axis, the linear light transmitting light varies, depending on the incidence angle, substantially symmetrically between in directions at incidence angles larger than 0° and in directions at incidence angles smaller than 0°.

The arrangement of the above-mentioned anisotropic scattering film and the display element is not especially limited, but the anisotropic scattering film is preferably attached to the display element. The method of attaching the anisotropic scattering film to the display element is not especially limited and includes, for example, a method of using an adhesive and a method of using a pressure sensitive adhesive.

The display of the present invention may or may not include other components as long as it includes the above-mentioned display element and the above-mentioned anisotropic scattering film as components, and its configuration is not particularly limited.

The linear transmitting light quantity of the anisotropic scattering film in the axial direction of the scattering central axis is preferred to be lower from the viewpoint of effectively attaining the functional effects of the present invention.

Hereinafter, the preferred form of the display of the present invention is mentioned in more detail.

It is preferable that the extreme value is a maximum value. That is, it is preferable that the above-mentioned "azimuth in which a contrast ratio of the display element in a direction inclined by a certain angle from the normal direction of the viewing screen of the display element has an extreme value" is the maximum azimuth of the display element. As a result, light (white luminance) which enters the film in a direction substantially parallel to the axial direction of the scattering central axis is scattered (diffused) in all directions about the scattering central axis and averaged if this anisotropic scattering film is located on the viewing screen side of the display element in such a way that the axial azimuth of the scattering central axis is substantially the same as the maximum azimuth of the display element. Therefore, the viewing angle dependency of the contrast ratio of the display can be improved at least in the maximum azimuth substantially the same as the axial azimuth of the scattering central axis.

The maximum azimuth preferably includes four azimuths at azimuth angles Φ of 0°, 90°, 180°, and 270° if the display element is a VA mode or IPS mode liquid crystal display element. The maximum azimuth preferably includes four azimuths at azimuth angles Φ of 45°, 135°, 225°, and 315° if the display element is a TN mode or OCB mode liquid crystal display element. If the display element has two or more maximum azimuths, the anisotropic scattering film has a scattering central axis in an azimuth substantially the same as one of the maximum azimuths of the display element.

It is preferable that the extreme value is a minimum value. That is, it is preferable that the above-mentioned "azimuth in which a contrast ratio of the display element in a direction inclined by a certain angle from the normal direction of the viewing screen of the display element has an extreme value" is the minimum azimuth of the display element. As a result, light (black luminance) which enters the film in a direction substantially parallel to the axial direction of the scattering central axis is scattered (diffused) in all directions about the scattering central axis and averaged if this anisotropic scattering film is located on the viewing screen side of the display element in such a way that the axial azimuth of the scattering central axis is substantially the same as the minimum azimuth of the display element. Therefore, the viewing angle dependency of the contrast ratio of the display can be improved at least in the minimum azimuth substantially the same as the axial azimuth of the scattering central axis.

The minimum azimuth preferably includes four azimuths at azimuth angles Φ of 45°, 135°, 225°, and 315° if the display element is a VA mode or IPS mode liquid crystal display element. The minimum azimuth preferably includes four azimuths at azimuth angles Φ of 0°, 90°, 180°, and 270° if the display element is a TN mode or OCB mode liquid crystal display element. If the above-mentioned display element has two or more minimum azimuths, the anisotropic scattering film has a scattering central axis in an azimuth substantially the same as one of the minimum azimuths of the display element.

If the display element has a plurality of extreme value azimuths, the extreme value azimuth as which the axial azimuth of the scattering central axis is substantially the same varies depending on the position at which the display is placed. For example, the cases where a display including a display element with four maximum azimuths at azimuth angles Φ of 0°, 90°, 180°, and 270° and four minimum azimuths at azimuth angles Φ of 45°, 135°, 225°, and 315° is used for a car navigation system which is required to have high visibility in a specific azimuth such as direction of driver's seat (right direction) are mentioned. If the car navigation system is disposed at a height of driver's eyes, the anisotropic scattering film preferably has a scattering central axis in an azimuth substantially the same as the maximum azimuth of the display element (the azimuth at an azimuth angle Φ of 0°). Further, for example, if the car navigation system disposed at a height lower than driver's eyes, the anisotropic scattering film preferably has a scattering central axis substantially the same as the minimum azimuth of the display element (the azimuth at an azimuth angle Φ of 45°).

It is preferable that the anisotropic scattering film has a scattering central axis in substantially the same azimuth as an azimuth in which a contrast ratio of the display element in a direction inclined by a certain angle of 20° or more from the normal direction of the viewing screen of the display element has an extreme value.

It is more preferable that the anisotropic scattering film has a scattering central axis in substantially the same azimuth as an azimuth in which a contrast ratio of the display element in a direction inclined by 45° from the normal direction of the viewing screen of the display element has an extreme value.

Figure 3:
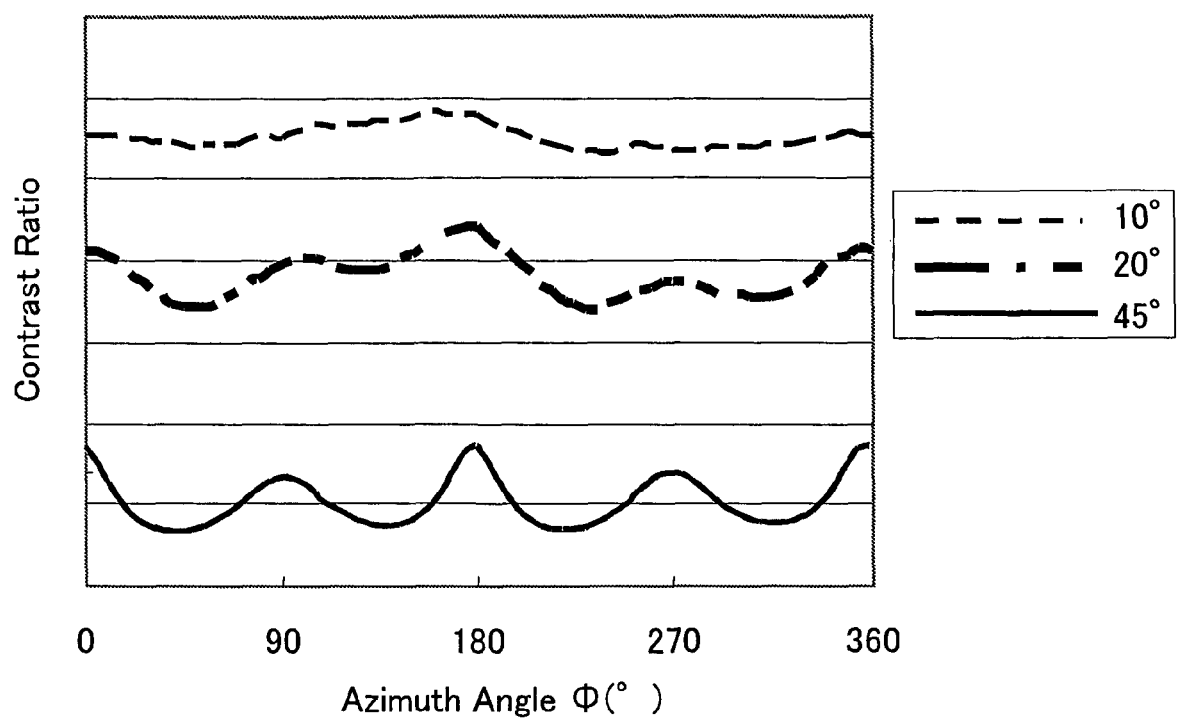
FIG. 3 is a graph showing azimuth angle dependency of a contrast ratio of a VA mode liquid crystal display element in direction having a polar angle Θ of 10°, 20° and 45°.

The extreme value azimuth of the display element can be determined by measuring a contrast ratio of the display element in a direction inclined by a certain angle (hereinafter, also referred to as "measurement angle") from the normal direction of the viewing screen of the display element, and preparing a graph showing the azimuth angle dependency of the contrast ratio, as shown in FIG. 1C, for example. In the present invention, the measurement angle is not especially limited as long as it is larger than 0° and smaller than 90°. However, in a commonly used display element such as a liquid crystal display element, if the measurement angle is about 10°, the contrast ratio is large in all azimuths, as shown in FIG. 3. Therefore, it may become difficult to distinguish the maximum value from the minimum value of the contrast ratio. From these viewpoints, the measurement angle is preferably 20° or more and more preferably 45°.

Therefore, in the present invention, the above-mentioned axial azimuth of the scattering central axis is substantially the same as any of the extreme value azimuths of the display element. However, it is preferable that the axial azimuth is substantially the same as the extreme value azimuth of the display element, determined at a certain measurement angle of 20° or more, and it is more preferable that the axial azimuth is substantially the same as the extreme azimuth of the display element, determined at a measurement angle of 45°.

The number or the azimuth angle of the extreme value azimuth of the display element may be different depending on the measurement angle.

It is preferable that the anisotropic scattering layer is formed by curing a composition containing a photo-curable compound. As a result, the above-mentioned anisotropic scattering film having anisotropic scattering property, that is, the anisotropic scattering film showing anisotropic scattering property in all azimuths can be easily produced. If the cross-sectional surface of the anisotropic scattering layer formed by curing the composition is observed with a microscope, a fine structure extending in an oblique direction is recognized, for example. In this case, as shown in FIG. 2A, it is thought that many minute rod-shaped cured regions 20 having refractive indexes slightly different from those of surrounding regions are formed.

Further, in this case, as shown in FIG. 2B, the scattering central axis S of the anisotropic scattering film constituting the display of the present invention is inclined obliquely to the normal direction (Z axial direction) of the viewing screen of the display. It is thought that the axial direction is parallel to the extending direction of the rod-shaped cured region 20 in FIG. 2A. In this case, the inclined scattering central axis S has the axial azimuth $S_1$ projected on the X-Y plane, as shown in FIG. 2B, and it is thought that the axial azimuth $S_1$ is parallel to the azimuth of the shadow of the rod-shaped cured region 20 projected on the X-Y plane. Therefore, it is through that the above-mentioned anisotropic scattering property of the anisotropic scattering film is exhibited attributed to the internal structure of the anisotropic scattering layer. In FIG. 2A, the shape of the rod-shaped cured regions 20 is shown as a cylindrical column but it is not especially limited. In FIG. 2A, as one of preferred examples, the rod-shaped cured regions 20 extend in the oblique direction, but the extending direction of the rod-shaped cured regions 20 is not especially limited, as well as the axial direction of the scattering central axis. Further, the shape of the anisotropic scattering layer is shown as a sheet in FIG. 2A, but it is not particularly limited.

The form of the above-mentioned composition containing the photo-curable compound includes (A) a form in which the composition contains a photopolymerizable compound only, (B) a form in which the composition contains a mixture of a plurality of photopolymerizable compounds, and (C) a form in which the composition contains a mixture of a single or a plurality of photopolymerizable compounds and a high polymer resin not having photo-polymerizability. It is thought that according to the forms (A) to (C), minute structures (rod-shaped cured regions) of the order of microns having refractive indexes different from those of surrounding regions are formed in the anisotropic scattering layer by light irradiation as described above, and therefore the above-mentioned incidence angle dependency of the linear transmitting light quantity can be exhibited.

Accordingly, the single of photopolymerizable compound in the forms (A) and (C) preferably shows refractive indexes which largely change before and after photopolymerization. Photopolymerizable compounds showing different refractive indexes after curing are preferably combined as the plurality of photopolymerizable compounds in the forms (B) and (C). Photopolymerizable compounds showing different refractive indexes after curing are preferably combined as the above-mentioned photopolymerizable compound and the high polymer resin not having photopolymerizability in the above-mentioned form (C). The change of the refractive index and difference between the refractive indexes is preferably 0.01 or more, and more preferably 0.05 or more, and furthermore preferably 0.10 or more from the viewpoint of effectively attaining the functional effects of the present invention.

It is preferable that the above-mentioned photo-curable compound preferably includes a photopolymerizable compound of a polymer, an oligomer or a monomer, having a radical polymerizable or cationic polymerizable functional group (radical polymerizable compound or cationic polymerizable compound), and a photopolymerization initiator, and has a property of being polymerized and cured by ultraviolet light and/or visible light irradiation.

The above-mentioned radical polymerizable compound principally contains one or more unsaturated double bonds in a molecule. Specific examples thereof include acrylic oligomers such as epoxy acrylate, urethane acrylate, polyester acrylate and silicone acrylate, and acrylate monomers such as 2-ethylhexyl acrylate, phenoxyethyl acrylate, isonorbornyl acrylate, 2-hydroxyethyl acrylate, 2,2,2-trifluoroethyl methacrylate, 2-perfluorooctyl-ethylacrylate, triethyleneglycol diacrylate, 1,6-hexanediol diacrylate, 1,9-nonanediol diacrylate, trimethylolpropane triacrylate, ethylene oxide (EO) modified trimethylolpropane triacrylate, pentaerithritol triacrylate, pentaerithritol tetraacrylate and dipentaerithritol hexaacrylate.

Compounds containing one or more epoxy groups, vinyl ether groups, and/or oxetane groups in a molecule may be used as the above-mentioned cationic polymerizable compound. Examples of the compound containing one or more epoxy groups in a molecule include diglycidyl ethers of bisphenols such as bisphenol A, hydrogenated bisphenol A, bisphenol F, bisphenol AD, bisphenol S, tetramethylbisphenol A, tetramethylbisphenol F, tetrachlorobisphenol A, and tetrabromobisphenol A, polyglycidyl ethers of novolac resins such as phenol novolac, cresol novolac, phenol novolac bromide and o-cresol novolac, diglycidyl ethers of alkylene glycols such as ethylene glycol, butanediol, 1,6-hexanediol, neopentyl glycol, trimethylolpropane and ethylene oxide (EO) adduct of bisphenol A, and glycidyl esters such as glycidyl ester of hexahydrophthalic acid and glycidyl ester of dimer acid. Further, alicyclic epoxy compounds such as 3,4-epoxycyclohexanemethyl-3',4-epoxycyclohexylcarboxylate, oxetane compounds such as 1,4-bis [(3-ethyl-3-oxetanylmethoxy)methyl]benzene and 3-ethyl-3-(hydroxymethyl)-oxetane, and vinyl ether compounds such as diethylene glycol divinyl ether and trimethylolpropane trivinyl ether also may be used.

The above-mentioned photopolymerizable compound is not limited to the compounds described above. In order to produce adequate difference between the refractive indexes, a fluorine atom (F) may be introduced into the photopolymerizable compound for decrease in the refractive index, and a sulfur atom (S), a bromine atom (Br), or various metal atoms may be introduced for increase in the refractive index. In order to increase the refractive index of the above-mentioned anisotropic scattering layer, it is effective to add, to the photopolymerizable compound, ultra-fine functional particles formed by introducing a photopolymerizable functional group such as an acrylic group and an epoxy group on the surface of ultra-fine particles consisting of a metal oxide having a high refractive index such as titanium oxide ($TiO_2$), zirconium oxide ($ZrO_2$), tin oxide ($SnO_2$) and the like.

Examples of photopolymerization initiators which can polymerize the above-mentioned radical polymerizable compound include benzophenone, 2,4-diethylthioxanthone, benzoin isopropyl ether, 2,2-diethoxyacetophenone, benzyl dimethyl ketal, 2,2-dimethoxy-1,2-diphenylethane-1-one, 2-hydroxy-2-methyl-1-phenylpropane-1-one, 1-hydroxycyclohexylphenyl ketone, 2-methyl-1-[4-(methylthio)phenyl]-2-morpholinopropane-1,1-[4-(2-hydroxyethoxy)-phenyl]-2-hydroxy-2-methy-1-propane-1-one, bis(cyclopentadienyl)-bis(2,6-difluoro-3-pyl-1-yl)titanium, and 2-benzyl-2-dimethylamino-1-(4-morpholinophenyl)-butanone-1, 2,4,6-trimethylbenzoyldiphenylphosphine oxide.

Photopolymerization initiators which can polymerize the above-mentioned cationic polymerizable compound are compounds which produce acid by light irradiation and can polymerize the cationic polymerizable compound by this produced acid. Generally, onium salts and metallocene complexes are suitably used. A diazonium salt, a sulfonium salt, iodonium salt, a phosphonium salt, a selenium salt, and the like are used as the onium salts. As a counter ion for these salts, anions such as tetrafluoroboric acid ion ($BF_4^-$), hexafluorophosphoric acid ion ($PF_6^-$), hexafluoroarsenic acid ion ($AsF_6^-$) and hexafluoroantimonic acid ion ($SbF_6^-$) are used. Examples of photopolymerization initiators of the cationic polymerizable compound include triphenylsulfonium-hexafluoro antimonate, triphenylsulfonium-hexafluoro phosphate, (4-methoxyphenyl)phenyliodonium-hexafluoro antimonate, bis(4-t-butylphenyl)iodonium-hexafluoro phosphate, and (η5-isopropylbenzene)(η5-cyclopentadienyl)iron (II)-hexafluorophosphate.

The above-mentioned photopolymerization initiator is preferably mixed in an amount of 0.01 parts by weight or more and 10 parts by weight or less with respect to 100 parts by weight of the photopolymerizable compound. If the amount of the photopolymerization initiator is less than 0.01 parts by weight, the photocurability may be deteriorated and if it is more than 10 parts by weight, only the surface of the compound may be cured and the internal curability may be deteriorated. The photopolymerization initiator is more preferably mixed in an amount of 0.1 parts by weight or more and 7 parts by weight or less with respect to 100 parts by weight of the photopolymerizable compound, and further more preferably 0.1 parts by weight or more and 5 parts by weight or less.

The above-mentioned high polymer resin not having photo-polymerizability in the form (C) includes acrylic resins, styrene resins, styrene-acryl copolymers, polyurethane resins, polyester resins, epoxy resins, cellulose resins, vinyl acetate resins, vinyl chloride-vinyl acetate copolymers, and polyvinyl butyral resins. These high polymer resins need to have adequate compatibility with the photopolymerizable compounds before photopolymerization, and various organic solvents and plasticizers may be used in order to secure such compatibility. If acrylate is used as the photopolymerizable compound, the high polymer resin is preferably selected from acrylic resins from the viewpoint of the compatibility.

The method of curing the above-mentioned composition is not especially limited, but includes a method in which the composition is provided in sheet form on a substrate and irradiated with collimated light (ultraviolet light, for example) in a predetermined direction. As a result, clusters of a plurality of rod-shaped cured regions extending parallel to the irradiation direction of collimated light (for example, referring to FIG. 2A) can be formed.

Usual coating methods or printing methods may be used as the method of providing the composition in sheet form on the substrate. Specifically, coating methods such as air doctor coating, bar coating, blade coating, knife coating, reverse roll coating, transfer roll coating, gravure roll coating, kiss roll coating, cast coating, spray coating, slot orifice coating, calendar coating, dam coating, dip coating and die coating; and printing methods such as intaglio printing method like gravure printing and stencil printing method such as screen printing may be employed. If the composition has a low viscosity, a method in which a structure having a predetermined height is provided on a peripheral area of a substrate and a liquid composition is applied to an area surrounded by this structure, also may be employed.

A short arc type ultraviolet lamp is normally used as a light source used for irradiation of the above-mentioned collimated light (ultraviolet light, for example) and specifically a high-pressure mercury lamp, a low pressure mercury lamp, a metahalide lamp, a xenon lamp and the like may be used. An device used for irradiation of collimated light (ultraviolet light, for example) in a predetermined direction is not particularly limited but an exposure system for resist exposure is preferably used from the viewpoint that collimated light (ultraviolet light, for example) with uniform intensity can be radiated to a given area and the exposure system can be selected from commercially available systems. If an anisotropic scattering layer with small size is formed, a method, in which an ultraviolet spot light source is used as a point source and ultraviolet light is radiated away from an adequate distance, can be also employed.

The collimated light radiated to the above-mentioned composition provided in sheet form needs to include a wavelength by which the photopolymerizable compound can be polymerized and cured, and generally, light with a wavelength about 365 nm of a mercury lamp is used. If the anisotropic scattering layer is formed using light of this wavelength range, the illuminance intensity is preferably 0.01 mW/cm$^2$ or more and 100 mW/cm$^2$ or less. If the illuminance intensity is less than 0.01 mW/cm$^2$, the production efficiency may be decreased because a curing time becomes long. If it is more than 100 mW/cm$^2$, a curing rate of the photopolymerizable compound is too fast and a structure formation does not occur and therefore it may be impossible to develop desired anisotropic scattering property. The illuminance intensity is more preferably 0.1 mW/cm$^2$ or more and 20 mW/cm$^2$ or less.

It is preferable that the anisotropic scattering film has a direction showing a linear transmitting light quantity not larger than a linear transmitting light quantity in an axial direction of the scattering central axis and having an azimuth that is the same as the azimuth in which the contrast ratio of the display element in the direction inclined by the certain angle from the normal direction of the viewing screen of the display element has the extreme value.

The direction showing the linear transmitting light quantity not larger than the linear transmitting light quantity in the axial direction of the scattering central axis is generally close to the axial direction of the scattering central axis, and disposed substantially radially about the axial direction of the scattering central axis. As a result, functional effects equivalent to or better than those in the case where the axial azimuth of the scattering central axis is the same as the extreme value azimuth of the display element can be obtained.

Figure 4:
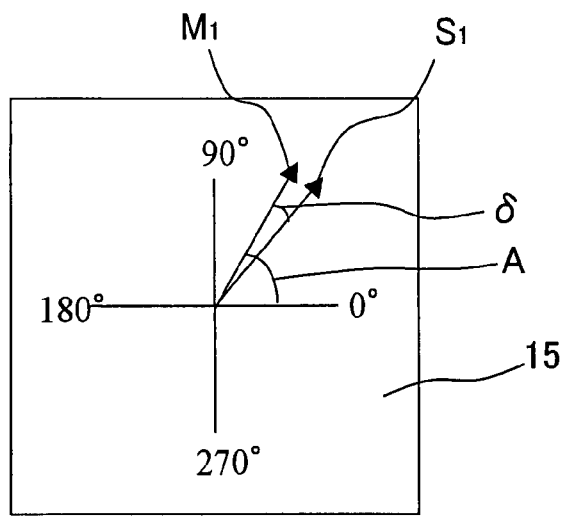
FIG. 4 is an explanatory diagram showing a relationship between an axial azimuth of a scattering central axis of an anisotropic scattering film constituting the display of the present invention and an extreme value azimuth of the display element.

FIG. 4 is an explanatory diagram showing a relationship between the axial azimuth of the scattering central axis of the anisotropic scattering film constituting the display of the present invention and the extreme value azimuth of the display element constituting the display of the present invention. The two solid arrows in FIG. 4 represent the extreme value azimuth $M_1$ of the display element and the axial azimuth $S_1$ of the scattering central axis, respectively. "A" represents an angle formed by the extreme value azimuth $M_1$ of the display element and the azimuth at an azimuth angle of 0° of the display, and "δ" represents an angle formed by the extreme value azimuth $M_1$ of the display element and the axial azimuth $S_1$ of the scattering central axis.

The display of the present invention is mentioned below with reference to FIG. 4, but is not limited to the configuration shown in FIG. 4. For example, the arrangement relationship between the extreme azimuth $M_1$ of the display element and the axial azimuth $S_1$ of the scattering central axis is not limited to the relationship shown in FIG. 4.

It is preferable that an angle (δ) formed by an axial azimuth of the scattering central axis and the azimuth in which a contrast ratio of the display element in the direction inclined by the certain angle from the normal direction of the viewing screen of the display element has the extreme value is 15° or less. If the angle formed by the axial azimuth of the scattering central axis and the maximum azimuth of the display element is more than 15°, black luminance in a direction showing a higher black luminance is scattered and the black luminance in a direction showing a higher contrast ratio becomes higher, and thereby the contrast ratio in the directions showing the higher contrast ratio may be reduced. If the angle formed by the axial azimuth of the scattering central axis and the minimum azimuth of the display element is more than 15°, the quantity of the black luminance to be scattered becomes smaller and thereby the effect of improving the contrast ratio may be hardly obtained.

Figure 5:
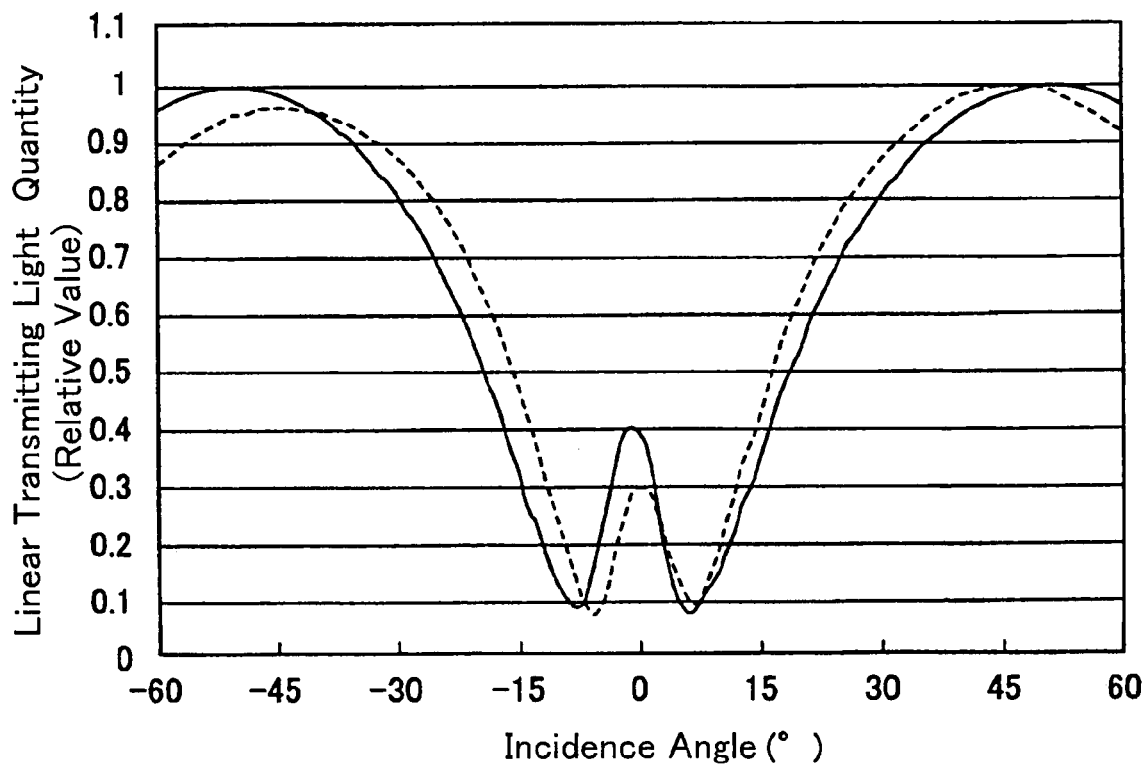
FIG. 5 is a diagram showing one example of incidence angle dependency of scattering property of an anisotropic scattering film constituting the display of the present invention. The solid line and broken line in FIG. 5 show incidence angle dependencies of the scattering properties in the case where the film is rotated about two rotation axes (short side axis and long side axis) perpendicular to each another.

The anisotropic scattering film showing the scattering property in FIG. 5 shows, in directions at incidence angles of −15 to 15°, a linear transmitting light quantity equivalent to or lower than that in the axial direction of the scattering central axis (the direction at an incidence angle of 0°). Therefore, if the angle (δ) formed by the axial azimuth of the scattering central axis and the extreme value azimuth of the display element is 15° or less, the anisotropic scattering film can exhibit sufficient diffusion performances in the extreme value azimuth of the display element, which is substantially the same as the axial azimuth of the scattering central axis. As shown in FIG. 5, the linear transmitting light quantity in directions at incidence angles out of the range of −15 to 15° is larger than that in the axial direction of the scattering central axis. Therefore, if the angle (δ) formed by the axial azimuth of the scattering central axis and the extreme value azimuth of the display element is more than 15°, the anisotropic scattering film can not exhibit sufficient diffusion performances in the extreme value azimuth of the display element, which is substantially the same as the axial azimuth of the scattering central axis. In such an extreme value azimuth, the viewing angle dependency of the contrast ratio of the display element may be exhibited as it is, as the viewing angle dependency of the contrast ratio of the display.

The angle (δ) formed by the axial azimuth of the scattering central axis and the azimuth in which the contrast ratio of the in the direction inclined by the certain angle from the normal direction of the viewing screen of the display element has the extreme value is more preferably 10° or less, and still more preferably 5°. As a result, the axial azimuth of the scattering central axis becomes approximately the same as the extreme value azimuth of the display element. Therefore, the viewing angle dependency can be more improved at least in the extreme value azimuth of the display element, which is substantially the same as the axial azimuth of the scattering central axis, without significant reduction in the contrast ratio in azimuths other than the extreme value azimuth substantially the same as the axial azimuth of the scattering central axis such as the direction showing the largest contrast ratio.

It is more preferable that an angle (δ) formed by the axial azimuth of the scattering central axis and the azimuth in which the contrast ratio of the display element in the direction inclined by 20° or more from the normal direction of the viewing screen of the display element has the extreme value is 15° or less. It is still more preferable that and angle (δ) formed by the axial azimuth of the scattering central axis and the azimuth in which the contrast in the direction inclined by 45° from the normal direction of the viewing screen of the display element has the extreme value is 15° or less.

It is preferable that, the anisotropic scattering film has the scattering central axis in a direction forming a smaller angle with a direction showing the smallest linear transmitting light quantity of the anisotropic scattering film than an angle with a direction showing the largest linear transmitting light quantity of the anisotropic scattering film. This relationship is represented by $0° \leq \alpha < \beta$, if the angle formed by the direction showing the smallest linear transmitting light quantity and the axial direction of the scattering central axis is represented by $\alpha$, and the angle formed by the direction showing the largest linear transmitting light quantity and the axial direction of the scattering central axis is represented by $\beta$. The polar angle of the direction showing a large contrast ratio of the display element is generally smaller than that of the direction showing a small contrast ratio of the display element. Therefore, according to this configuration, light in the direction showing a large contrast ratio of the display element is scattered more intensely than light in the direction showing a small contrast ratio. Therefore, the functional effects of the present invention can be more effectively attained.

The more preferred form of the anisotropic scattering film includes (i) a form in which a graph showing the incidence angle dependency of the scattering property has a substantially W shape in a figure showing a relationship between the incidence angle and the linear transmitting light quantity (for example, referring to FIG. 5) and (ii) the graph has a substantially U shape in the figure. As one example, an anisotropic scattering film having the form (i) and having the scattering central axis in the normal direction of the film surface is mentioned below.

In the anisotropic scattering film having the above-mentioned form (i) and having the scattering central axis in the normal direction of the film surface, the linear transmitting light quantity is small enough in the axial direction of the scattering central axis (the normal direction of the film surface), but as the polar angle (as a magnitude of the incidence angle becomes larger) is larger, the linear transmitting light quantity in a direction forming the polar angle with the axial direction of the scattering central axis gradually decreases and shows the smallest value in a direction at a magnitude of an incidence angle of 5 to 20° ($\alpha$). In directions at a magnitude of incidence angles larger than $\alpha$, the linear transmitting light quantity becomes larger as a magnitude of incidence angle becomes larger, and the quantity shows the largest value in a direction at a magnitude of an incidence angle of 40 to 65° ($\beta$). In directions at a magnitude of incidence angles larger than $\beta$, the linear transmitting light quantity becomes smaller as a magnitude of incidence angle becomes larger. Such an incidence angle dependency of the scattering property can be obtained substantially uniformly in all azimuths, that is, the figure showing the relationship between the incidence angle and the linear transmitting light quantity is shown almost symmetrically about the scattering central axis (the axis at an incidence angle of 0°) (for example, referring to FIG. 5).

The axial direction of the scattering central axis and the above-mentioned range of the incidence angle at which the linear transmitting light quantity shows the smallest value or the largest value are not limited to those mentioned above as one example. It is preferable that the linear transmitting light quantity in the axis direction of the scattering central axis is smaller in the form (i). A form in which the linear transmitting light quantity shows the smallest value in the axial direction of the scattering central axis corresponds to the above-mentioned form (ii).

Figure 49A:
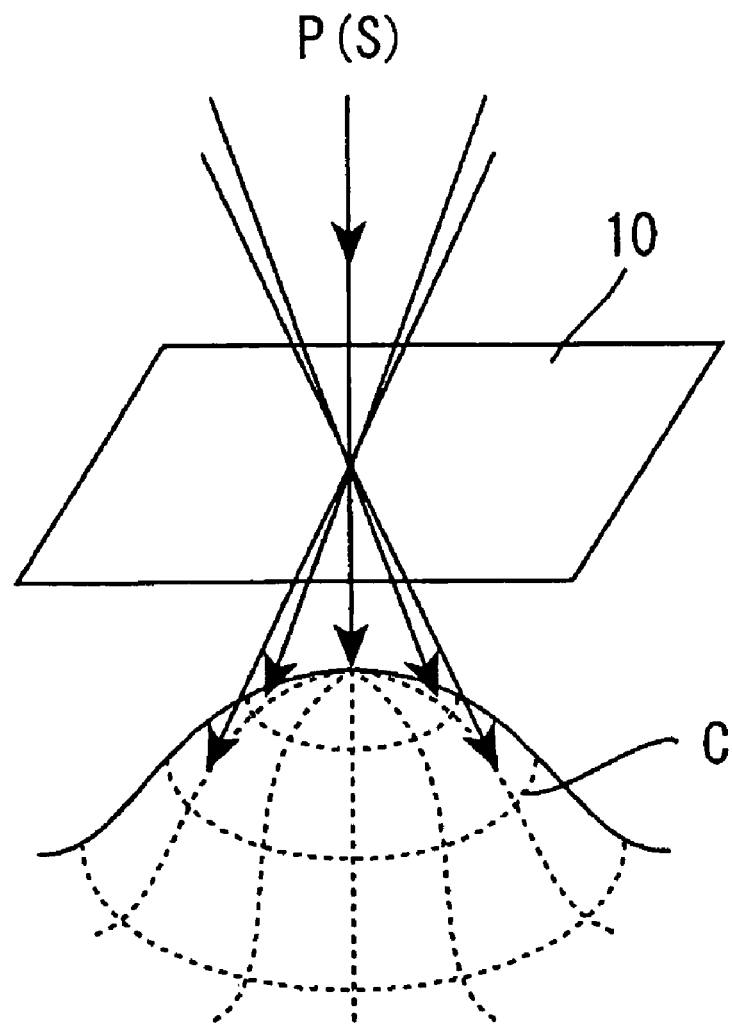
FIG. 49A is a perspective view schematically showing one example of scattering property of an anisotropic scattering film constituting the display of the present invention.
Figure 49B:
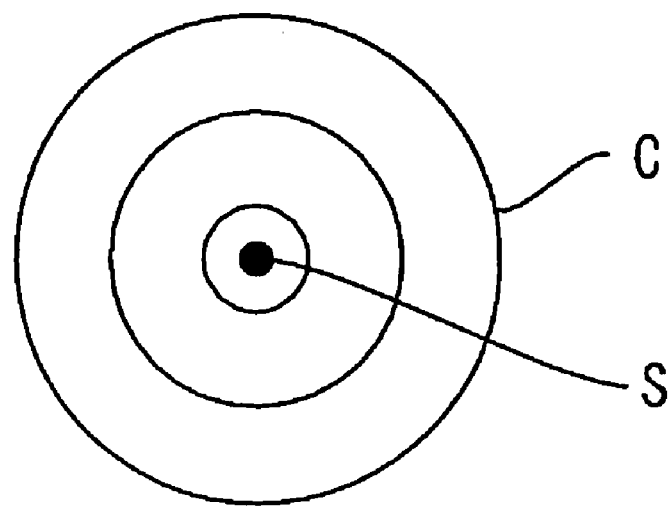
FIG. 49B is a plan view schematically showing the curved surface in bell form which specifies the linear transmitting light quantity in FIG. 49A when viewed in the front direction.
Figure 50:
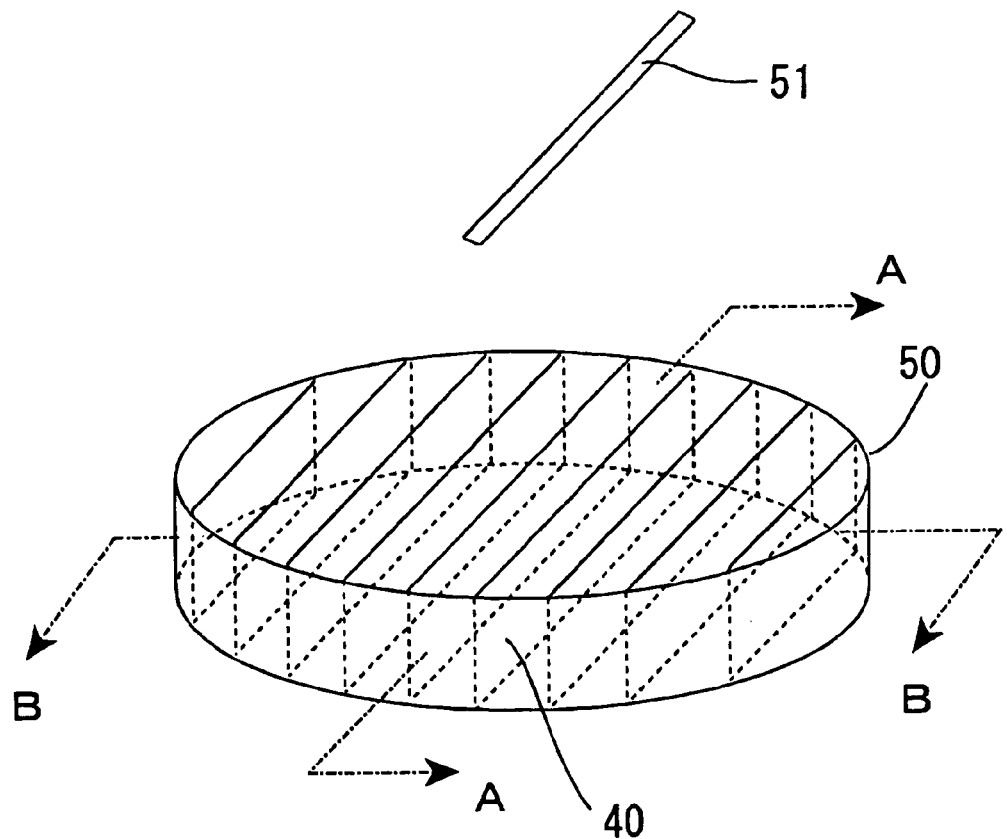
FIG. 50 is a perspective view schematically showing a structure of a previous anisotropic scattering film.
Figure 51:
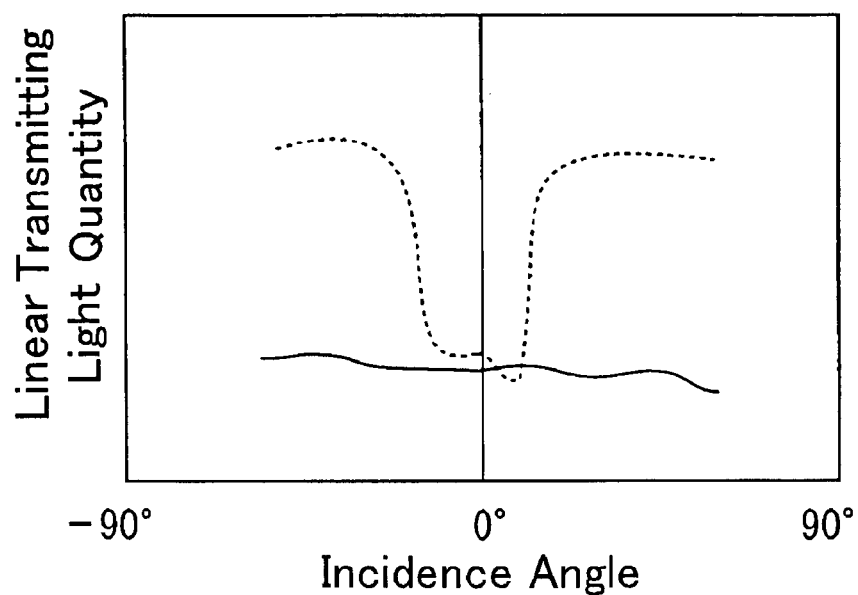
FIG. 51 is a schematic view showing scattering property of a previous anisotropic scattering film.

It is preferable that the incidence angle dependency of the scattering property of the anisotropic scattering film in the above-mentioned form (ii) is expressed by a curved surface in bell form (indicated by the broken line in FIG. 49A), which is symmetric about the axial direction of the scattering central axis as shown in FIGS. 49A and 49B, if the linear transmitting light quantities and the traveling directions of all-directional incident light are expressed by vectors starting at one exiting point and the ends of theses vectors are connected with each other. If the anisotropic scattering film shows the above-mentioned anisotropic scattering property, reduction in the largest contrast ratio can be particularly suppressed, and the viewing angle dependency of the contrast ratio can be improved in wider azimuths including the extreme value azimuth. In addition, the effects of improving the viewing angle dependency of the contrast ratio can be uniformly obtained in all azimuths. Further, the above-mentioned functional effects can be easily obtained by aligning the normal direction of the viewing screen of the display element with the normal direction of the film surface of the anisotropic scattering film, that is, by attaching the display element to the anisotropic scattering film.

The range of the incidence angle at which the linear transmitting light quantity is a predetermined value or less may be wide in the above-mentioned forms (i) and (ii). As a result, light in a wide range of directions showing a larger contrast ratio of the display element is scattered more intensely than light in directions showing a small contrast ratio, and therefore the functional effects of the present invention can be more effectively obtained.

It is preferable that an angle formed by the direction showing the smallest linear transmitting light quantity and the axial direction of the scattering central axis is close to 0°. The smallest value of the above-mentioned linear transmitting light quantity is preferably 50% or less of the largest value in the drawing showing the relationship between the incidence angle and the linear transmitting light quantity (for example, referring to FIG. 5), and more preferably 30% or less, and still more preferably 20% or less.

It is preferable that the anisotropic scattering film has an azimuth in which a polar angle of a direction showing the smallest linear transmitting light quantity is smaller than a polar angle of a direction showing the largest linear transmitting light quantity. The polar angle of the above-mentioned direction showing a large contrast ratio of the display element is generally smaller than that of the direction showing a small contrast ratio of the display element. Therefore, in the above-mentioned azimuth, light in the direction showing a large contrast ratio of the display element is scattered more intensely than light in the direction showing a small contrast ratio of the display element, according to this configuration. Therefore, the functional effects of the present invention can be more effectively obtained.

In view of attaining the functional effects of the present invention more effectively, it is more preferable that in the above-mentioned anisotropic scattering film, the polar angle of the direction showing the smallest linear transmitting light quantity is smaller than that of the direction showing the largest linear transmitting light quantity, in all azimuths.

It is preferable that in the anisotropic scattering film,
the largest value of a linear transmitting light quantity in a direction having a polar angle larger than a polar angle of an axial direction of the scattering central axis is smaller than the largest value of a linear transmitting light quantity in a direction having a polar angle smaller than a polar angle of an axial direction of the scattering central axis,
in an axial azimuth of the scattering central axis.

In this embodiment, the "direction having a polar angle larger than a polar angle of the scattering central axis" means directions having the same azimuth as the axial azimuth of the scattering central axis and having a polar angle larger than that of the scattering central axis. The "direction having a polar angle smaller than a polar angle of the scattering central axis" includes not only directions having the same azimuth as the axial azimuth of the scattering central axis and having a polar angle smaller than that of the scattering central axis, but also directions having the azimuth opposite to the axial azimuth of the scattering central axis. In the present invention, the above-mentioned anisotropic scattering film is disposed in such a way that the axial azimuth of the scattering central axis is substantially the same as the extreme value azimuth of the display element. Therefore, light (white luminance or black luminance) in the direction showing a large contrast ratio in the axial azimuth of the scattering central axis is scattered about the scattering central axis without deteriorating display quality in the azimuth opposite to the axial azimuth of the scattering central axis, according to this form. As a result, the viewing angle dependency in the extreme value azimuth of the display element can be more improved.

The more preferred form of the above-mentioned anisotropic scattering film includes a form (iii) in which, in the azimuths perpendicular to the axial azimuth of the scattering central axis, the polar angle of the direction showing the smallest linear transmitting light quantity is smaller than the polar angle of the direction showing the largest linear transmitting light quantity. According to this form, the display quality in the extreme value azimuth of the display element that is substantially the same as the axial azimuth of the axial direction of the scattering central axis can be improved without deteriorating the display quality in the azimuths perpendicular to the axial azimuth of the display element. The above-mentioned form (iii) is mentioned with reference to FIG. 7 as one example. The axial direction of the scattering central axis and the range of the incidence angle at which the linear transmitting light quantity shows the smallest value or the largest value are not limited to those mentioned above as one example shown in FIG. 7.

FIG. 7 is a diagram showing one example of incidence angle dependency of scattering property of an anisotropic scattering film constituting the display of the present invention.

In the anisotropic scattering film shown in FIG. 7, the polar angle ω of the scattering central axis is 30°. That is, in the anisotropic scattering film in FIG. 7, the polar angle ω of the scattering central axis is large, and therefore, the incidence angle dependency of the linear transmitting light quantity largely differs between in the axial azimuth of the scattering central axis and in the directions perpendicular to the axial azimuth.

The incidence angle dependency of the scattering property in the axial azimuth of the scattering central axis is mentioned first. In the directions having polar angles larger than the polar angle of the scattering central axis, the linear transmitting light quantity is small enough in the axial direction of the scattering central axis (the direction at an incidence angle of 30°), but gradually decreases in the directions in which the incidence angle is larger, and the quantity shows the smallest value in a direction at an incidence angle of 30 to 40°. In the directions at incidence angles larger than 30 to 40°, the linear transmitting light quantity becomes larger as the incidence angle becomes larger, and the quantity shows the largest value in a direction at an incidence angle of 50 to 60°. In the directions at incidence angles larger than 50 to 60°, the linear transmitting light quantity becomes smaller in directions at a larger incidence angle.

In the directions having polar angles smaller than the polar angle of the scattering central axis, the linear transmitting light quantity gradually decreases as the incidence angle becomes smaller, and the quantity shows the smallest value in a direction at an incident of 15 to 25°. In the directions at incidence angles smaller than 15 to 25°, the linear transmitting light quantity becomes larger as the incidence angle becomes smaller, and the quantity shows the largest value in a direction at an incidence angle of −55 to −45°. In the directions at incidence angles smaller than −55 to −45°, the linear transmitting light quantity becomes smaller as the incidence angle becomes smaller.

Then, the incidence angle dependency of the scattering property in the azimuths perpendicular to the above-mentioned axial azimuth of the scattering central axial is mentioned. In this azimuth, the linear transmitting light quantity shows similar tendency between in the directions at incidence angles larger than 0° and in the directions at incidence angles smaller than 0°. Therefore, the incident angle dependency only in the directions at incidence angles larger than 0° is mentioned.

The linear transmitting light quantity shows the smallest value in a direction at an incidence angle of 0 to 10°. In the directions at incidence angles larger than 0 to 10°, the linear transmitting light quantity becomes larger as the incidence angle becomes larger, and the quantity shows the largest value in a direction at an incidence angle of 55 to 65°. In the directions at incidence angles of 55 to 65°, the linear transmitting light quantity becomes smaller as the incident angle becomes larger.

In view of attaining the functional effects of the present invention effectively, the linear transmitting light quantity in the axial direction of the scattering central axis is preferred to be smaller, and the above-mentioned linear transmitting light quantity may show the smallest value in the axial direction of the scattering central axis.

It is preferable that the display element is a liquid crystal display element. As a result, slim profile, lightweight, and low power consumption of the display can be realized and the viewing angle dependency of the contrast ratio can be improved in the extreme value azimuth of the liquid crystal display element, which is substantially the same as the axial azimuth of the scattering central axis. Therefore, the display of the present invention can be preferably used for car navigation systems which are required to have high visibility in a specific azimuth such as direction of driver's seat.

The above-mentioned liquid crystal display element may be a transmitting liquid crystal display element, a transmitting and reflective (transflective) liquid crystal display element, or a reflective liquid crystal display element.

It is preferable that the liquid crystal display element comprises:
a liquid crystal cell having a liquid crystal sandwiched between a pair of substrates; and
a polarizing plate including a supporting film and a polarizing element.

The liquid crystal display element having such a form develops the viewing angle dependency of the contrast ratio resulting from at least anisotropy of the refractive index of the liquid crystal or polarization absorption property and polarization transmission property of the polarizing plate. Therefore, the above-mentioned anisotropic scattering film is disposed on the viewing screen side of such a liquid crystal display element, and thereby the viewing angle dependency of the contrast ratio of the liquid crystal display element can be improved. As mentioned above, in the liquid crystal display element in which a pair of polarizing plates is disposed on both sides of a liquid crystal cell in such a way that the absorption axes (transmission axes) are perpendicular to each other (Cross-Nicol arrangement), the maximum azimuths of the liquid crystal display element correspond to four azimuths of the absorption axes (transmission axes) of the polarizing plates, and also the minimum azimuths of the liquid crystal display element correspond to four azimuths bisecting the four angles formed by the absorption axis and the transmission axis of the polarizing plate.

The form of the above-mentioned liquid crystal cell is not especially limited, and a form in which the liquid crystal cell has liquid crystal interposed between a thin film transistor array substrate and a color filter substrate may be mentioned, for example. The form of the above-mentioned polarizing plate is not especially limited, and includes a form in which the polarizing plate includes a polarizing element and a supporting film in this order from the liquid crystal cell side, a form in which the polarizing plate includes a supporting film and a polarizing element in this order from the liquid crystal cell side, and a form in which the polarizing plate includes the first supporting film, a polarizing element, the second supporting film in this order from the liquid crystal cell side. As the supporting film, the same materials mentioned in the transparent substrate of the anisotropic scattering film may be used. Further, the polarizing plate is generally disposed on both of the viewing screen side and the back surface side of the liquid crystal cell, but may be disposed only on the viewing screen side or on the back surface side. The polarizing plate more preferably includes a retardation film. As a result, the viewing angle dependency of chromaticity and the like of the liquid crystal display element also can be improved.

The display mode of the above-mentioned liquid crystal display element is not especially limited, and preferably VA (Vertical Alignment) mode, TN (Twisted Nematic) mode, IPS (In-Plane Switching) mode, or OCB (OPtically Compensated Birefringence) mode.

The VA mode is a mode in which liquid crystal molecules are aligned in the direction substantially perpendicular to the substrate surface during no voltage application and then tilted by voltage application, and thereby display is performed. The VA mode includes MVA (Multi-domain Vertical Alignment) mode in which projective structures and/or slits are formed on a substrate and thereby a liquid crystal cell is divided into plural domains. In the VA mode liquid crystal display element, the liquid crystals preferably have negative dielectric constant anisotropy.

The TN mode is a mode in which liquid crystal molecules are aligned during no voltage application in such a way that the longitudinal axes of the molecules are substantially parallel to the substrate surface and the molecules continuously twist by a predetermined angle (twist angle) between a pair of substrates, and the liquid crystal molecules realigned by voltage application in such a way that the longitudinal axes of the molecules is parallel to the electric field direction, and thereby display is performed. The TN mode includes not only normal TN mode in which the twist angle is 90° but also STN mode in which the twist angle is 180° or more, and the like. In the TN mode liquid crystal display element, the liquid crystals preferably have positive dielectric constant anisotropy.

The IPS mode is a mode in which liquid crystals are rotated in a substrate plane by a lateral electric field applied between a pair of comb-type electrodes provided on one substrate. If liquid crystal molecules have negative dielectric constant anisotropy, the longitudinal axes of the liquid crystal molecules are located in the direction substantially perpendicular to the direction of the teeth of the comb-type electrodes during no voltage application and rotated in the direction substantially parallel to the direction of the teeth of the comb-type electrodes by voltage application. If the liquid crystal molecules have positive dielectric constant anisotropy, the longitudinal axes of the liquid crystal molecules are located in the direction substantially parallel to the direction of the teeth of the comb-type electrodes during no voltage application and rotated in the direction substantially perpendicular to the direction of the teeth of the comb-type electrodes during voltage application. During no voltage application, the longitudinal axes of the liquid crystal molecules are located substantially parallel to the substrate surface and the polarization axis of one polarizing element regardless of a plus or a minus sign of dielectric constant anisotropy of the liquid crystal molecules.

The OCB mode is a mode in which a three-dimensional optical compensation is performed by providing an alignment structure which is optically complementary in the liquid crystal thickness direction (bend alignment) and using a retardation film.

EFFECT OF THE INVENTION

According to the display of the present invention, the viewing angle dependency of the contrast ratio can be improved at least in a specific azimuth without design change of the basic structure of the display element, limitation to white display state or black display state, and deterioration in display quality in other directions.

BEST MODE FOR CARRYING OUT THE INVENTION

The present invention will, hereinafter, be described in more detail with reference to the following Embodiments, but the present invention is not limited only to these Embodiments.

1. Preparation of Liquid Crystal Displays in Embodiments 1 to 8 and Comparative Embodiments 1 and 2

(Preparation of the First Anisotropic Scattering Film)

A liquid resin was ejected at a marginal region of a polyethylene terephthalate (PET) film having a thickness of 75 μm in 76×26 size (product name: COSMOSHINE®, product number: A4300, product of TOYOBO Co., Ltd.) with a dispenser. Then, this liquid resin was cured to form a partition with a height of 0.2 mm. Then, a photopolymerizable composition having the following formulation was added dropwise into a region surrounded by the partition, and then thereon another film PET was coated.

| "Formulation of photopolymerizable composition" | |
|---|---|
| 2-(perfluorooctyl)-ethylacrylate | 50 parts by weight, |
| 1,9-nonanediol diacrylate | 50 parts by weight, |
| 2-hydroxy-2-methyl-1-phenylpropane-1-one | 4 parts by weight |

Then, the liquid film having a thickness of 0.2 mm and being sandwiched between the PET films was irradiated with ultraviolet for 1 minute at an irradiation intensity of 30 mW/cm$^2$ at an angle inclined by 30° from the vertical direction using an epi-irradiation unit of UV spot light source (trade name: L2859-01, product of Hamamatsu Photonics K.K), and thereby the first anisotropic scattering film was obtained. In addition, when the cross-sectional surface of the first anisotropic scattering film was observed with a microscope, minute rod-shaped regions 20 extending at an inclination of 30° from the normal direction of the film surface were recognized, as shown in FIG. 2A.

(Measurement of Scattering Property of the First Anisotropic Scattering Film)

Figure 6:
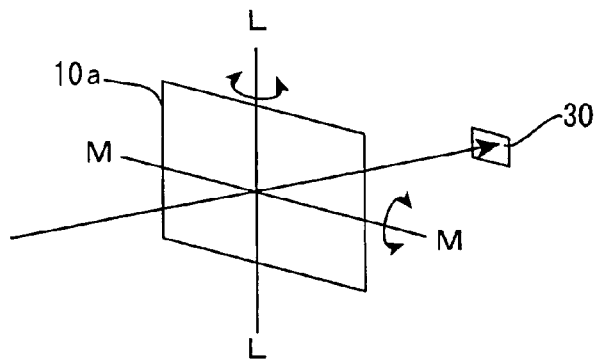
FIG. 6 is a perspective diagram schematically showing a measurement method of scattering property of a scattering film.

FIG. 6 is a perspective view schematically showing measurement method of anisotropic scattering property of the first anisotropic scattering film.

According to the method shown in FIG. 6, a specimen 10a is rotated about a predetermined direction as a rotation axis and thereby not only the linear transmitting light quantity when the optical axis is in the same direction as the normal direction of the test surface (when the incidence angle is 0°) but also that when the optical axis is not in the same direction as the normal direction of the specimen surface (when the incidence angle is not 0°) can be measured. Specifically, an optical receiver 30 was fixed at a position which receives straight light from a light source (not shown), as shown in FIG. 6, using GoniophotoMeter (trade name: automatic angle changing photometer GP-5, product of MURAKAMI COLOR RESEARCH LABORATORY CO., Ltd.). The first anisotropic scattering film as the specimen 10a was fixed at a sample holder (not shown) between the light source and the optical receiver 30. Then, as shown in FIG. 6, the first anisotropic scattering film 10a was rotated about the direction of the short side of the first anisotropic scattering film 10a as a rotation axis (L) (hereinafter, also referred to as a rotation about the short side axis) and the linear transmitting light quantity at each incidence angle was measured. Then, the first anisotropic scattering film 10a was rotated about the direction of the long side of the first anisotropic scattering film 10a as a rotation axis (M) (hereinafter, also referred to as a rotation about the long side axis) and the linear transmitting light quantity at each incidence angle was measured.

The direction of the short side axis of the first anisotropic scattering film 10a corresponds to the azimuth perpendicular to the extending azimuth of the rod-shaped cured region 20, and the direction of the long side axis corresponds to the extending azimuth of the rod-shaped cured region 20. That is, the first anisotropic scattering film 10a was rotated about the short side axis and thereby anisotropic scattering property in the extending azimuth of the rod-shaped cured region 20 were measured, and the first anisotropic scattering film 10a was rotated about the long side axis and thereby anisotropic scattering property in the azimuth perpendicular to the extending azimuth of the rod-shaped cured region 20 were measured.

FIG. 7 shows relationships between the incidence angle and the linear transmitting light quantity in the cases where the first anisotropic scattering film was rotated about the above-mentioned two rotation axes. It is shown by the plus and minus of the incidence angle that the first anisotropic scattering film was rotated in directions opposite to each other.

FIG. 7 shows that in the extending azimuth of the rod-shaped cured region 20, the relationship was shown in a deep valley shape including a small mountain-shaped part at an incidence angle of 30°. It was also found that in the azimuth perpendicular to the extending azimuth of the rod-shaped cured region 20, the relationship was shown in a valley shape including the deepest part at an incidence angle of 0°. Therefore, it was found that the first anisotropic scattering film 10a had a scattering central axis in the same direction as the extending direction of the rod-shaped cured region 20, that is, the polar angle of the scattering central axis was 30°.

Figure 8:
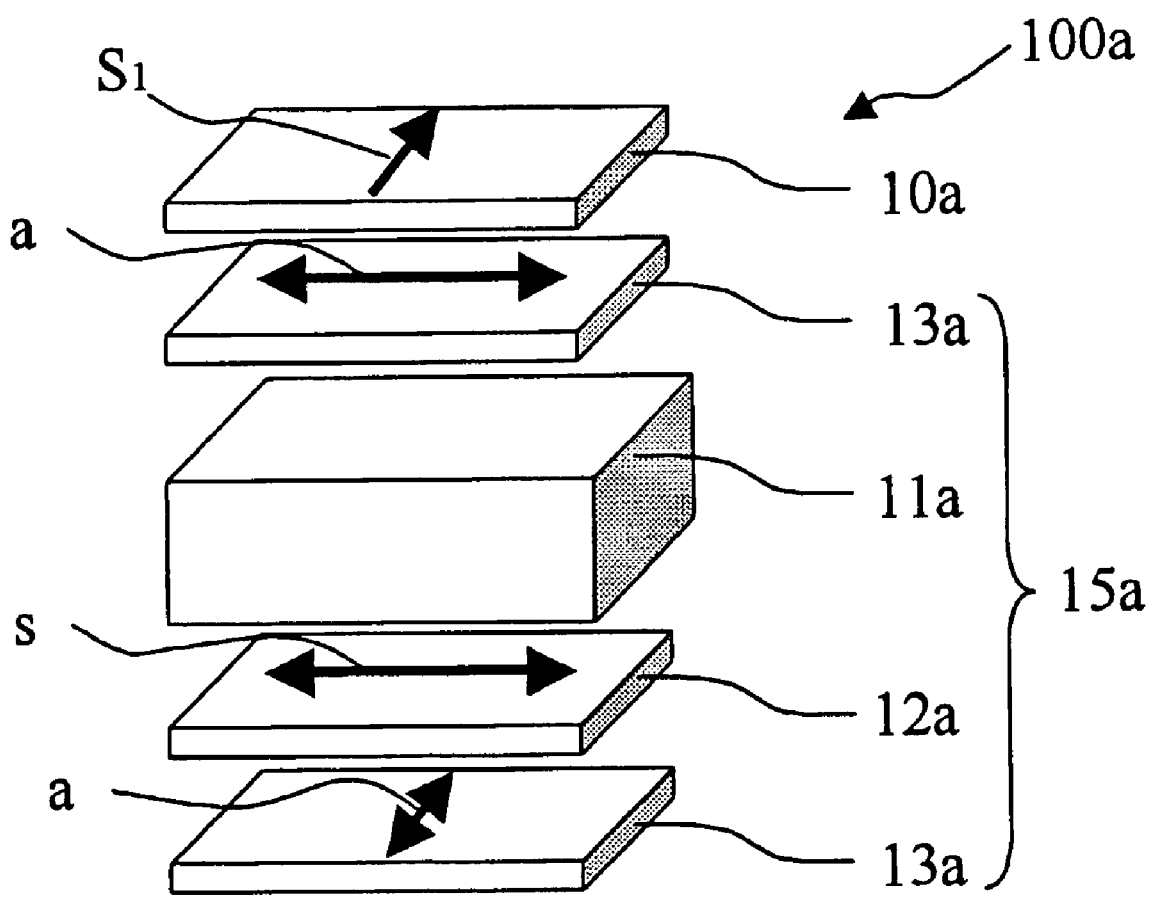
FIG. 8 is a perspective view schematically showing a configuration of a VA mode liquid crystal display according to Embodiment 1 of the present invention.

FIG. 8 is a perspective view schematically showing a configuration of a VA mode liquid crystal display according to Embodiment 1 of the present invention. The attachment and relative positional relationship of axial directions between films is shown in FIG. 8 and Table 1.

TABLE 1

| Component | Azimuth angle φ |
|---|---|
| First anisotropic scattering film 10a (axial azimuth S1 of scattering central axis) | 90° |
| First polarizing plate 13a on viewing screen side (absorption axis a) | 0°–180° |
| VA mode liquid crystal cell 11a (liquid crystal molecule tilt azimuth) | 45°, 135°, 225°, 315° |
| First retardation film 12a (lagging axis s) | 0°–180° |
| First polarizing plate 13a on back surface side (absorption axis a) | 90°–270° |

(Preparation of VA Mode Liquid Crystal Display Element 15*a*)

First, a relationship between a birefringence Δn of a liquid crystal material and a thickness d of a VA mode liquid crystal cell was adjusted to Δnd=300 nm and the liquid crystal cell 11*a* in which liquid crystal molecules were inclined in four azimuths at azimuth angles of 45°, 135°, 225°, and 315° during voltage application was prepared. Then, a first retardation film 12*a* was attached to the backlight side of the liquid crystal cell 11*a*, and further a first polarizing plate 13*a* including a TAC (triacetyl cellulose) film as a supporting film on the liquid crystal cell 11*a* side was attached to the backlight side of the first retardation film 12*a* and to the viewing screen side of the liquid crystal cell 11*a*. As a result, a VA mode liquid crystal display element 15*a* was prepared.

With respect to the retardation of the first retardation film 12*a*, Re was 3 nm and Rth was 250 nm. Re is expressed by the following equation (1):

$$Re=(n_x-n_y)\times d, \quad (1)$$

if two principal refractive indexes in a plane of three principal refractive indexes of an index ellipsoid are taken as nx and ny (nx≧ny) and one principal refractive index in the normal direction is defined as nz and the thickness of the retardation film is defined as d.

Using the above-mentioned nx, nz and d, Rth is expressed by the following equation (2):

$$Rth=(n_x-n_z)\times d \quad (2)$$

Also in the following Embodiments and Comparative Embodiments, Re and Rth were determined by the same method as in this Embodiment. With respect to the performances of the polarizing element constituting the first polarizing plate 13*a*, the polarizing element showed a parallel transmittance of 36.25%, a cross transmittance of 0.005%, and a polarization degree of 99.99%.

(Measurement of Optical Characteristics of VA Mode Liquid Crystal Display Element 15*a*)

Figure 16:
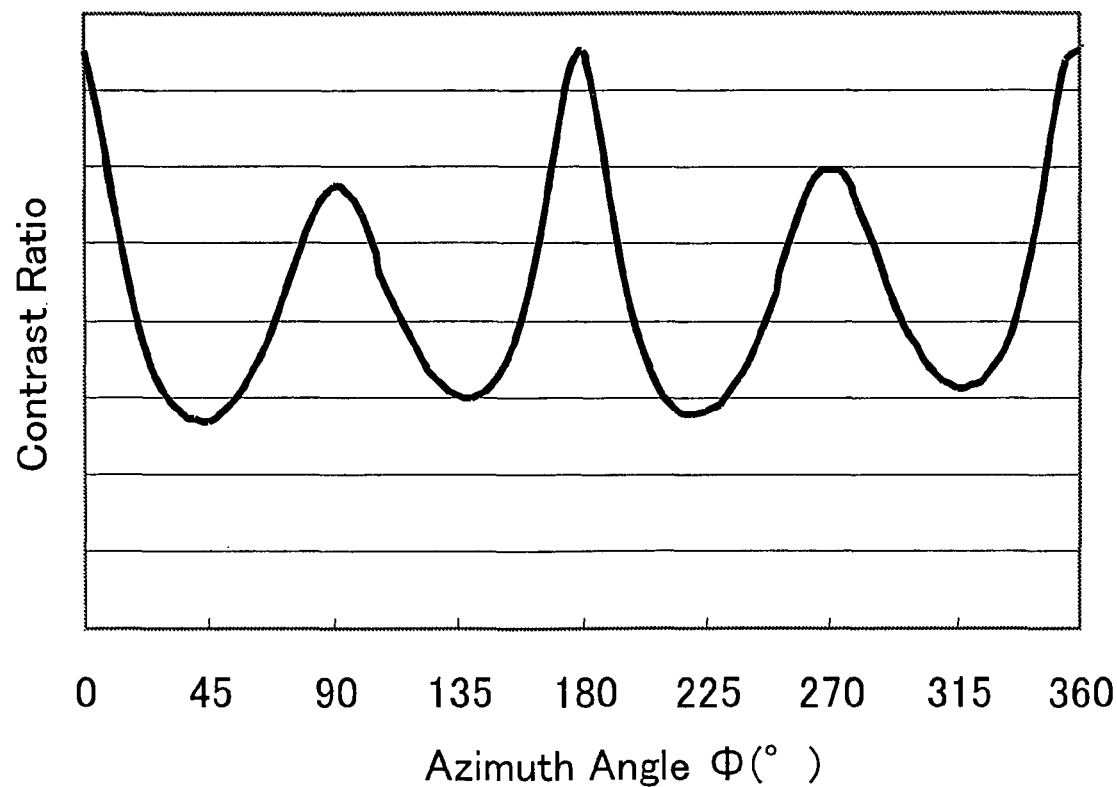
FIG. 16 is a diagram showing azimuth angle dependency of a contrast ratio in a direction having a polar angle Θ of 45° of the VA mode liquid crystal display element prepared in Embodiment 1 of the present invention.

The VA mode liquid crystal display element 15*a* prepared in Embodiment 1 was measured for azimuth angle dependency of a contrast ratio in a direction having a polar angle Θ of 45° using a viewing angle measurement device (trade name: EZContrast160R, product of ELDIM company). FIG. 16 shows the results. As shown in FIG. 16, the VA mode liquid crystal display element 15*a* had four azimuths at azimuth angles Φ of 0°, 90°, 180°, and 270° as the azimuth in which the contrast ratio in the direction having a polar angle Θ of 45° showed a maximum value (the maximum azimuth). Further, the VA mode liquid crystal display element 15*a* had four azimuths at azimuth angles Φ of 45°, 135°, 225°, 315° as the azimuth in which the contrast ratio in the direction having a polar angle Θ of 45° showed a minimum value (minimum azimuth).

(Preparation of VA Mode Liquid Crystal Display 10*a*)

Then, the first anisotropic scattering film 10*a* was attached to the viewing screen side of the VA mode liquid crystal display element 15*a* in such a way that the azimuth at an azimuth angle Φ of 90° of the liquid crystal display element 15*a* (the maximum azimuth) was almost the same as the axial azimuth $S_1$ of the scattering central axis of the first anisotropic scattering film 10*a*. As a result, a VA mode liquid crystal display 100*a* was prepared.

Embodiment 2

Figure 9:
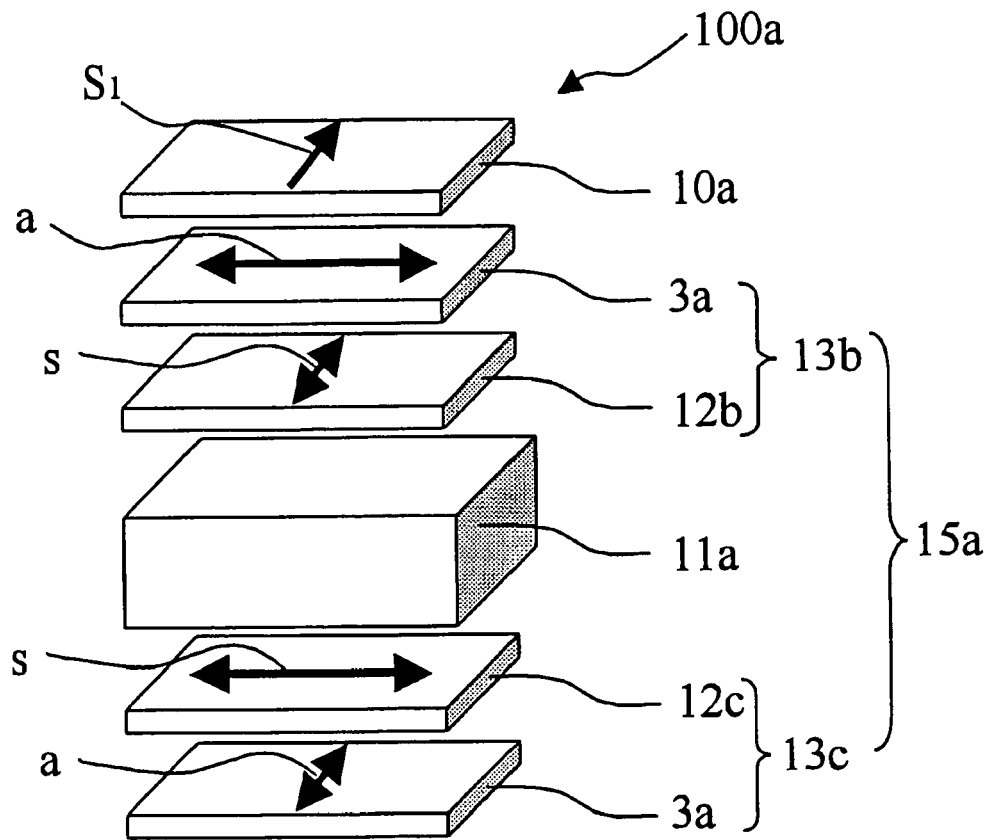
FIG. 9 is a perspective view schematically showing a configuration of a VA mode liquid crystal display according to Embodiment 2 of the present invention.

FIG. 9 is a perspective view schematically showing a configuration of a VA mode liquid crystal display 100*a* according to Embodiment 2 of the present invention. The attachment and relative positional relationship of axial directions between films is shown in FIG. 9 and Table 2.

TABLE 2

| Component | Azimuth angle φ |
|---|---|
| First anisotropic scattering film 10a (axial azimuth S1 of scattering central axis) | 90° |
| Polarizing element 3a on viewing screen side (absorption axis a) | 0°-180° |
| The second retardation film 12b (lagging axis | 90°-270° |
| VA mode liquid crystal cell 11a (liquid crystal molecule tilt azimuth) | 45°, 135°, 225°, 315° |
| Third retaradation film 12c (lagging axis s) | 0°-180° |
| Polarizing element 3a on back surface side (absorption axis a) | 90°-270° |

(Preparation of VA Mode Liquid Crystal Display Element 15*a*)

First, a second polarizing plate 13*b* including a second retardation film 12*b* as a supporting film on the VA mode liquid crystal cell 11*a* side was attached to the viewing screen side of the liquid crystal cell 11*a* prepared in Embodiment 1 and a third polarizing plate 13*c* including a third retardation film 12*c* as a supporting film on the liquid crystal cell 11*a* side was attached to the backlight side of the liquid crystal cell 11*a*. As a result, a VA mode liquid crystal display element 15*a* was prepared.

With respect to the retardation of the second retardation film 12*b*, Re was 140 nm and Rth was 138 nm. With respect to the retardation of the third retardation film 12*c*, Re was 2 nm and Rth was 190 nm. The polarizing element 3*a* had the same performances as in the polarizing element in Embodiment 1.

(Measurement of Optical Characteristics of VA Mode Liquid Crystal Display Element 15*a*)

The VA mode liquid crystal display element 15*a* prepared in Embodiment 2 was measured for azimuth angle dependency of a contrast ratio in a direction having a polar angle Θ of 45° using a viewing angle measurement device (trade name: EZContrast160R, product of ELDIM company). Similarly to the liquid crystal display element in Embodiment 1, the VA mode liquid crystal display element 15*a* had four azimuths at azimuth angles Φ of 0°, 90°, 180°, and 270° as the azimuth in which the contrast ratio in the direction having a polar angle Θ of 45° showed a maximum value (the maximum azimuth). Further, the VA mode liquid crystal display element 15*a* had had four azimuths at azimuth angles Φ of 45°, 135°, 225°, 315° as the azimuth in which the contrast ratio in the direction having a polar angle Θ of 45° showed a minimum value (minimum azimuth).

(Preparation of VA Mode Liquid Crystal Display 100*a*)

Then, the first anisotropic scattering film 10*a* was attached to the viewing screen side of the VA mode liquid crystal display element 15*a* in such a way that the azimuth at an azimuth angle Φ of 90° of the liquid crystal display element 15*a* (the maximum azimuth) was almost the same as the axial azimuth $S_1$ of the scattering central axis of the first anisotropic scattering film 10*a*. As a result, a VA mode liquid crystal display 100*a* was prepared.

Embodiment 3

Figure 10:
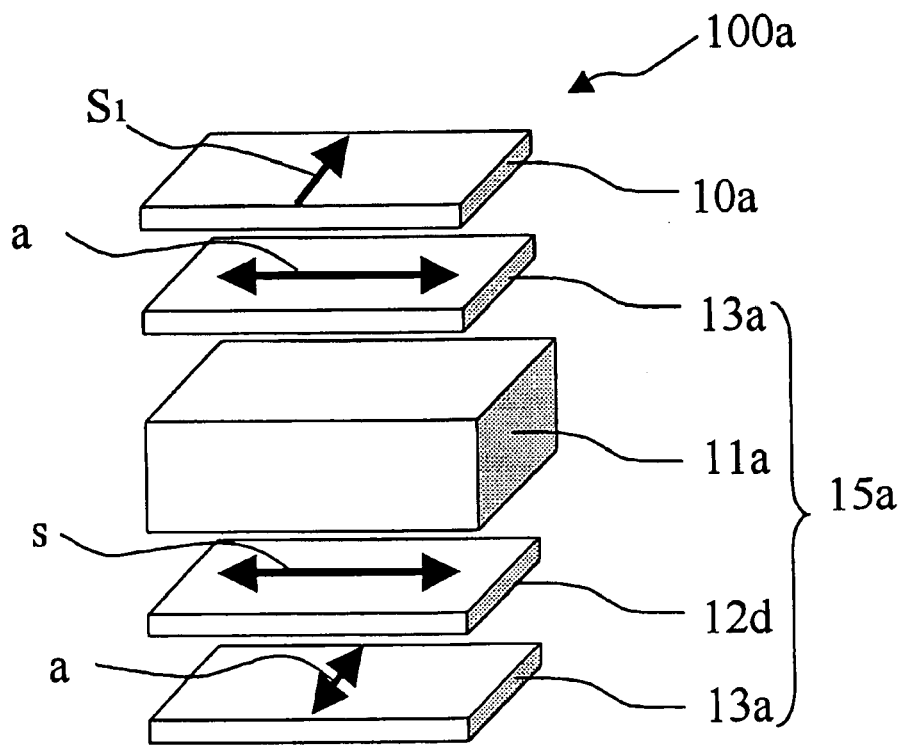
FIG. 10 is a perspective view schematically showing a configuration of a VA mode liquid crystal display according to Embodiment 3 of the present invention.

FIG. 10 is a perspective view schematically showing a configuration of a VA mode liquid crystal display 100*a* according to Embodiment 3 of the present invention. The attachment and relative positional relationship of axial directions between films is shown in FIG. 10 and Table 3.

TABLE 3

| Component | Azimuth angle φ |
|---|---|
| First anisotropic scattering film 10a (axial azimuth S1 of scattering central axis) | 90° |
| First polarizing plate 13a on viewing screen side (absorption axis a) | 0°-180° |
| VA mode liquid crystal cell 11a (liquid crystal molecule tilt azimuth) | 45°, 135°, 225°, 315° |
| Fourth retardation film 12d (lagging axis s) | 0°-180° |
| First polarizing plate 13a on back surface side (absorption axis a) | 90°-270° |

(Preparation of VA Mode Liquid Crystal Display Element 15a)

First, a fourth retardation film 12d was attached to the backlight side of the VA mode liquid crystal cell 11a prepared in Embodiment 1. Further, the first polarizing plate 13a including a TAC film as a supporting film on the liquid crystal cell 11a side was attached to the backlight side of a fourth retardation film 12d and to the viewing screen side of the liquid crystal cell 11a. As a result, a VA mode liquid crystal display element 15a was prepared.

With respect to the retardation of the fourth retardation film 12d, Re was 50 nm and Rth was 220 nm. The first polarizing plate 13a had the same performances as in Embodiment 1.

(Measurement of Optical Characteristics of VA Mode Liquid Crystal Display Element 15a)

The VA mode liquid crystal display element 15a prepared in Embodiment 3 was measured for azimuth angle dependency of a contrast ratio in a direction having a polar angle Θ of 45° using a viewing angle measurement device (trade name: EZContrast160R, product of ELDIM company). Similarly to the liquid crystal display element in Embodiment 1, the VA mode liquid crystal display element 15a had four azimuths at azimuth angles Φ of 0°, 90°, 180°, and 270° as the azimuth in which the contrast ratio in the direction having a polar angle Θ of 45° showed a maximum value (the maximum azimuth). Further, the VA mode liquid crystal display element 15a had had four azimuths at azimuth angles Φ of 45°, 135°, 225°, 315° as the azimuth in which the contrast ratio in the direction having a polar angle Θ of 45° showed a minimum value (minimum azimuth).

(Preparation of VA Mode Liquid Crystal Display 100a)

Then, the first anisotropic scattering film 10a was attached to the viewing screen side of the VA mode liquid crystal display element 15a in such a way that the azimuth at an azimuth angle Φ of 90° of the liquid crystal display element 15a (the maximum azimuth) was almost the same as the axial azimuth S₁ of the scattering central axis of the first anisotropic scattering film 10a. As a result, a VA mode liquid crystal display 100a was prepared.

Embodiment 4

Figure 11:
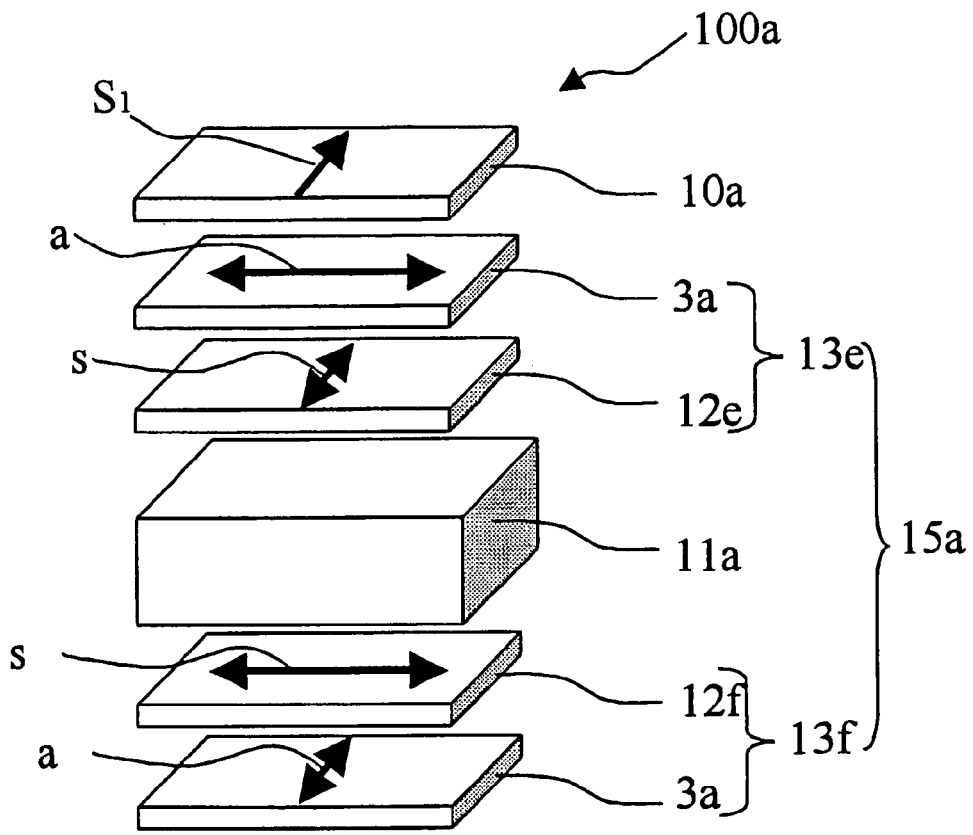
FIG. 11 is a perspective view schematically showing a configuration of a VA mode liquid crystal display according to Embodiment 4 of the present invention.

FIG. 11 is a perspective view schematically showing a configuration of a VA mode liquid crystal display 100a according to Embodiment 4 of the present invention. The attachment and relative positional relationship of axial directions between films is shown in FIG. 11 and Table 4.

TABLE 4

| Component | Azimuth angle φ |
|---|---|
| First anisotropic scattering film 10a (axial azimuth S1 of scattering central axis) | 90° |
| Polarizing element 3a on viewing screen side (absorption axis a) | 0°-180° |
| Fifth retardation film 12e (lagging axis s) | 90°-270° |
| VA mode liquid crystal cell 11a (liquid crystal molecule tilt azimuth) | 45°, 135°, 225°, 315° |
| Sixth retardation film 12f (lagging axis s) | 0°-180° |
| Polarizing element 3a on back surface side (absorption axis a) | 90°-270° |

(Preparation of VA Mode Liquid Crystal Display Element 15a)

First, a fifth polarizing plate 13e including a fifth retardation film 12e as a supporting film on the VA mode liquid crystal cell 11a side was attached to the viewing screen side of the liquid crystal cell 11a prepared in Embodiment 1. Further, a sixth polarizing plate 13f including a sixth retardation film 12f as a supporting film on the liquid crystal cell 11a side was attached to the backlight side of the liquid crystal cell 11a. As a result, a VA mode liquid crystal display element 15a was prepared.

With respect to the retardation of the fifth and sixth retardation films 12e and 12f, Re was 60 nm and Rth was 90 nm in both films. The polarizing element 3a had the same performances as in the polarizing element of Embodiment 1.

(Measurement of Optical Characteristics of VA Mode Liquid Crystal Display Element 15a)

The VA mode liquid crystal display element 15a prepared in Embodiment 4 was measured for azimuth angle dependency of a contrast ratio in a direction having a polar angle Θ of 45° using a viewing angle measurement device (trade name: EZContrast160R, product of ELDIM company). Similarly to the liquid crystal display element in Embodiment 1, the VA mode liquid crystal display element 15a had four azimuths had four azimuths at azimuth angles Φ of 0°, 90°, 180°, and 270° as the azimuth in which the contrast ratio in the direction having a polar angle Θ of 45° showed a maximum value (the maximum azimuth). Further, the VA mode liquid crystal display element 15a had had four azimuths at azimuth angles Φ of 45°, 135°, 225°, 315° as the azimuth in which the contrast ratio in the direction having a polar angle Θ of 45° showed a minimum value (minimum azimuth).

(Preparation of VA Mode Liquid Crystal Display 100a)

Then, the first anisotropic scattering film 10a was attached to the viewing screen side of the VA mode liquid crystal display element 15a in such a way that the azimuth at an azimuth angle Φ of 90° of the liquid crystal display element 15a (the maximum azimuth) was almost the same as the axial azimuth S₁ of the scattering central axis of the first anisotropic scattering film 10a. As a result, a VA mode liquid crystal display 100a was prepared.

Embodiment 5

Figure 12:
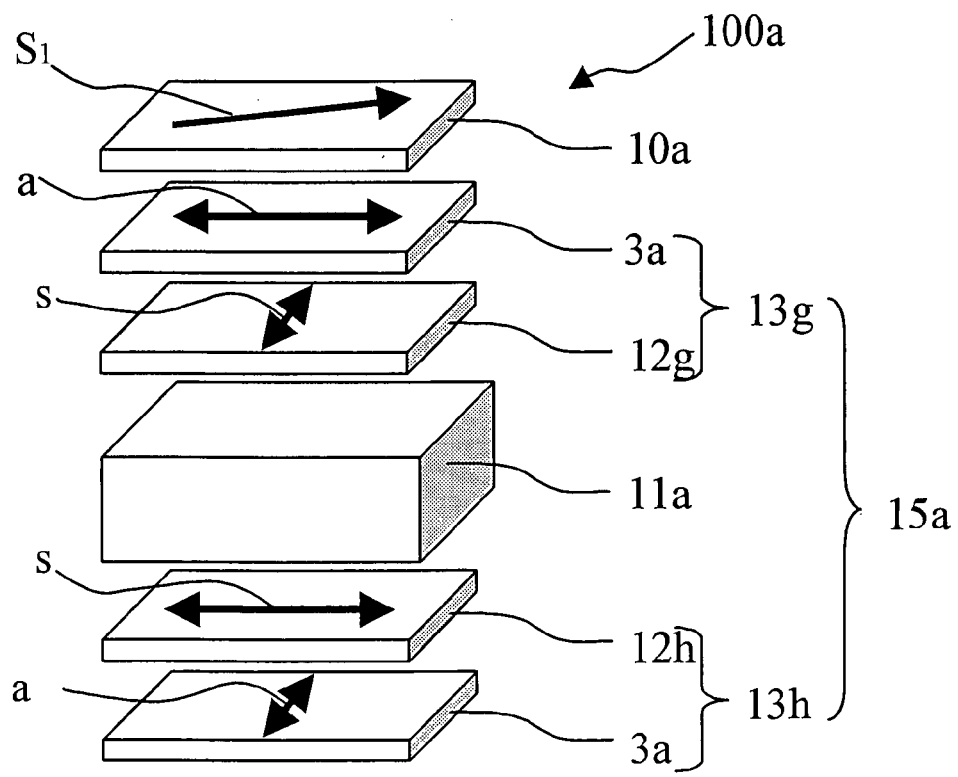
FIG. 12 is a perspective view schematically showing a configuration of a VA mode liquid crystal display according to Embodiment 5 of the present invention.

FIG. 12 is a perspective view schematically showing a configuration of a VA mode liquid crystal display 100a according to Embodiment 5 of the present invention. The attachment and relative positional relationship of axial directions between films is shown in FIG. 12 and Table 5.

TABLE 5

| Component | Azimuth angle φ |
|---|---|
| First anisotropic scattering film 10a (axial azimuth S1 of scattering central axis) | 90° |
| Polarizing element 3a on viewing screen side (absorption axis a) | 0°-180° |
| Seventh retradation film 12g (lagging axis s) | 90°-270° |
| VA mode liquid crystal cell 11a (liquid crystal molecule tilt azimuth) | 45°, 135°, 225°, 315° |
| Eighth retaradation film 12h (lagging axis s) | 0°-180° |
| Polarizing element 3a on back surface side (absorption axis a) | 90°-270° |

(Preparation of VA Mode Liquid Crystal Display Element 15a)

First, a seventh polarizing plate 13g including a seventh retardation film 12g as a supporting film on the VA mode liquid crystal cell 11a side was attached to the viewing screen side of the liquid crystal cell 11a prepared in Embodiment 1, and an eighth retardation film 12h including an eighth retardation film 12h as a supporting film on the liquid crystal cell 11a side was attached to the backlight side of the liquid crystal cell 11a. As a result, a VA mode liquid crystal display element 15a was prepared.

With respect to the retardation of the seventh retardation film 12g, Re was 90 nm and Rth was 100 nm. With respect to the retardation of the eighth retardation film 12h, Re was 3 nm and Rth was 100 nm. The polarizing element 3a had the same performances as in the polarizing element of Embodiment 1.

(Measurement of Optical Characteristics of VA Mode Liquid Crystal Display Element 15a)

The VA mode liquid crystal display element 15a prepared in Embodiment 5 was measured for azimuth angle dependency of a contrast ratio in a direction having a polar angle Θ of 45° using a viewing angle measurement device (trade name: EZContrast160R, product of ELDIM company). Similarly to the liquid crystal display element in Embodiment 1, the VA mode liquid crystal display element 15a had four azimuths had four azimuths at azimuth angles Φ of 0°, 90°, 180°, and 270° as the azimuth in which the contrast ratio in the direction having a polar angle Θ of 45° showed a maximum value (the maximum azimuth). Further, the VA mode liquid crystal display element 15a had had four azimuths at azimuth angles Φ of 45°, 135°, 225°, 315° as the azimuth in which the contrast ratio in the direction having a polar angle Θ of 45° showed a minimum value (minimum azimuth).

(Preparation of VA Mode Liquid Crystal Display 100a)

Then, the first anisotropic scattering film 10a was attached to the viewing screen side of the VA mode liquid crystal display element 15a in such a way that the azimuth at an azimuth angle Φ of 90° of the liquid crystal display element 15a (the maximum azimuth) was almost the same as the axial azimuth $S_1$ of the scattering central axis of the first anisotropic scattering film 10a. As a result, a VA mode liquid crystal display 100a was prepared.

Embodiment 6

Figure 13:
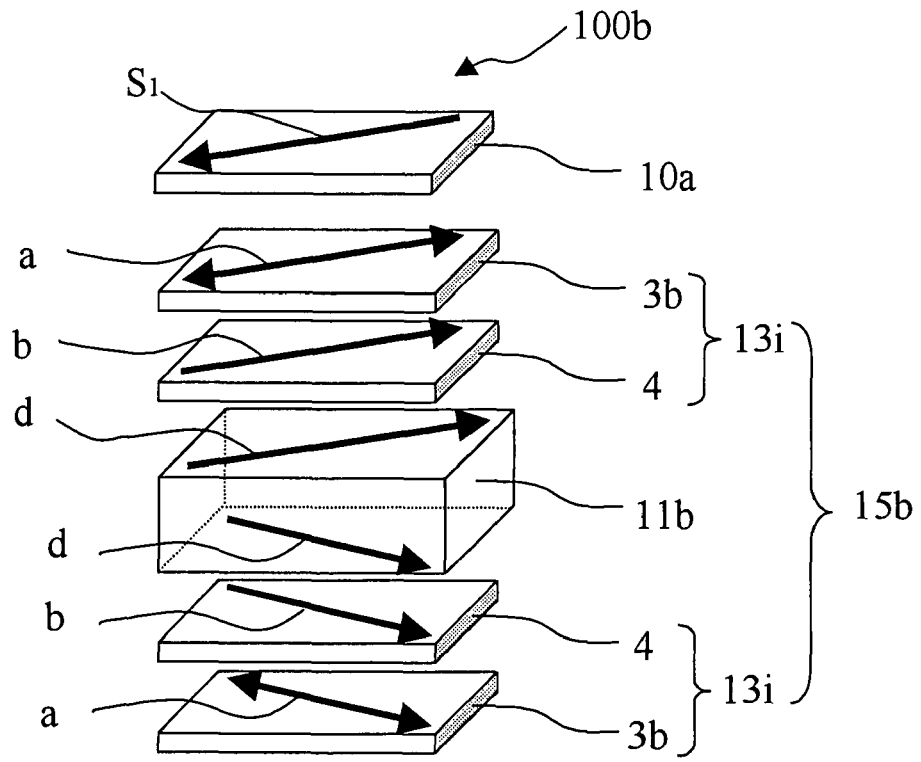
FIG. 13 is a perspective view schematically showing a configuration of a TN mode liquid crystal display according to Embodiment 6 of the present invention.

FIG. 13 is a perspective view schematically showing a configuration of a TN mode liquid crystal display 100b according to Embodiment 6 of the present invention. The attachment and relative positional relationship of axial directions between films is shown in FIG. 13 and Table 6.

TABLE 6

| Component | Azimuth angle φ |
|---|---|
| First anisotropic scattering film 10a (axial azimuth S1 of scattering central axis) | 225° |
| Polarizing element 3b on the viewing screen side (absorption axis a) | 45°-225° |
| WV film 4 on viewing screen side (alignment control direction b of liquid crystal) | 45° |
| TN mode liquid crystal cell 11b (alignment control direction d of liquid crystal) | 45° (on viewing screen side) 315° (on back surface side) |
| WV film 4 on back surface side (alignment control direction b of liquid crystal) | 315° |
| Polarizing element 3b on back surface side (absorption axis a) | 90°-270° |

(Preparation of TN Mode Liquid Crystal Display Element 15b)

First, a TN mode liquid crystal cell 11b in which a relationship between a birefringence Δn of a liquid crystal material and a thickness d of a liquid crystal cell was adjusted to Δnd=350 nm was prepared, and a wide view (WV) film 4—including polarizing plate (trade name: Viewing Angle Compensation Polarizing Film NWF-KD•EG, product of NIKKO DENKO CORP.) 13i was attached on each side of the cell 11b. As a result, a TN mode liquid crystal display element 15b was prepared. The polarizing element 3b was different from the polarizing element 3a. With respect to the performances of the polarizing plate 13i, the polarizing plate 13i showed a parallel transmittance of 36.10%, a perpendicular transmittance of 0.005%, and a polarization degree of 99.99%.

(Measurement of Optical Characteristics of TN Mode Liquid Crystal Display Element 15b)

Figure 17:
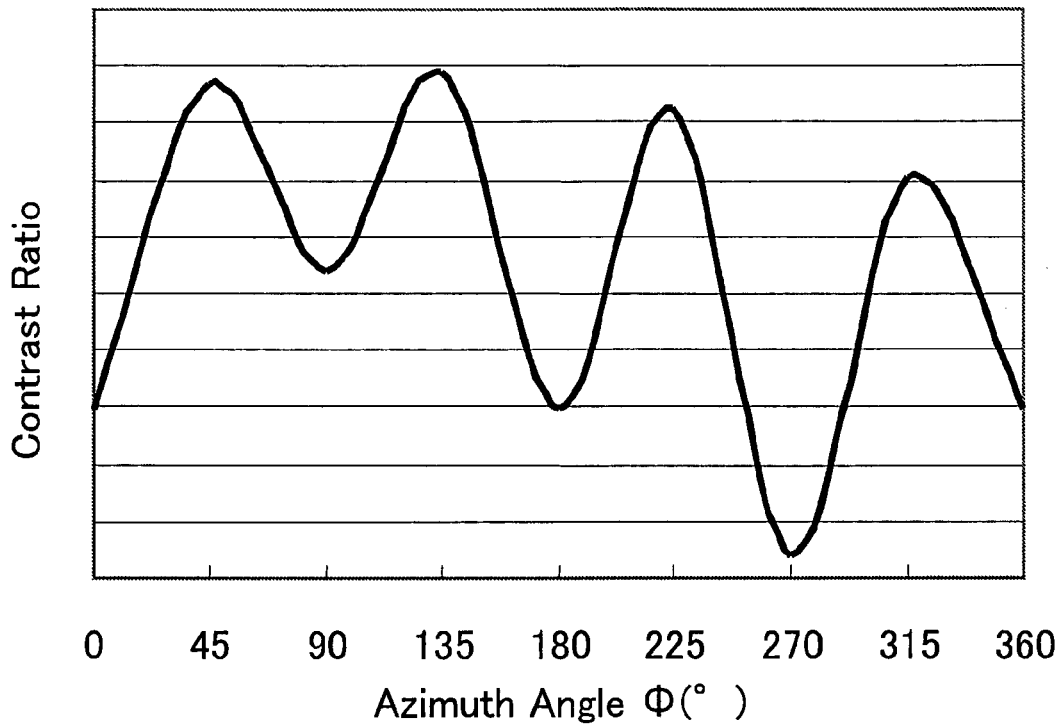
FIG. 17 is a diagram showing azimuth angle dependency of a contrast ratio in a direction having a polar angle Θ of 45° of the TN mode liquid crystal display element prepared in Embodiment 6 of the present invention.

The TN mode liquid crystal display element 15b was measured for viewing angle dependency of a contrast ratio in a direction having a polar angle Θ of 45° using a viewing angle measurement device (trade name: EZContrast160R, product of ELDIM company). FIG. 17 shows the results. As shown in FIG. 17, the TN mode liquid crystal display element 15b had four azimuths at azimuth angles Φ of 45°, 135°, 225°, and 315° as the azimuth in which the contrast ratio in the direction having a polar angle Θ of 45° showed a maximum value (the maximum azimuth). Further, the TN mode liquid crystal display element 15b had four azimuths at azimuth angles Φ of 0°, 90°, 180°, and 270° as the azimuth in which the contrast ratio in the direction having a polar angle Θ of 45° showed a minimum value (minimum azimuth).

(Preparation of TN Mode Liquid Crystal Display Element 100b)

Then, the first anisotropic scattering film 10a was attached to the viewing screen side of the TN mode liquid crystal display element 15b in such a way that the azimuth at an azimuth angle Φ of 225° of the liquid crystal display element 15b (the maximum azimuth) was almost the same as the axial azimuth $S_1$ of the scattering central axis of the first anisotropic scattering film 10a. As a result, a TN mode liquid crystal display 100b was prepared.

Embodiment 7

Figure 14:
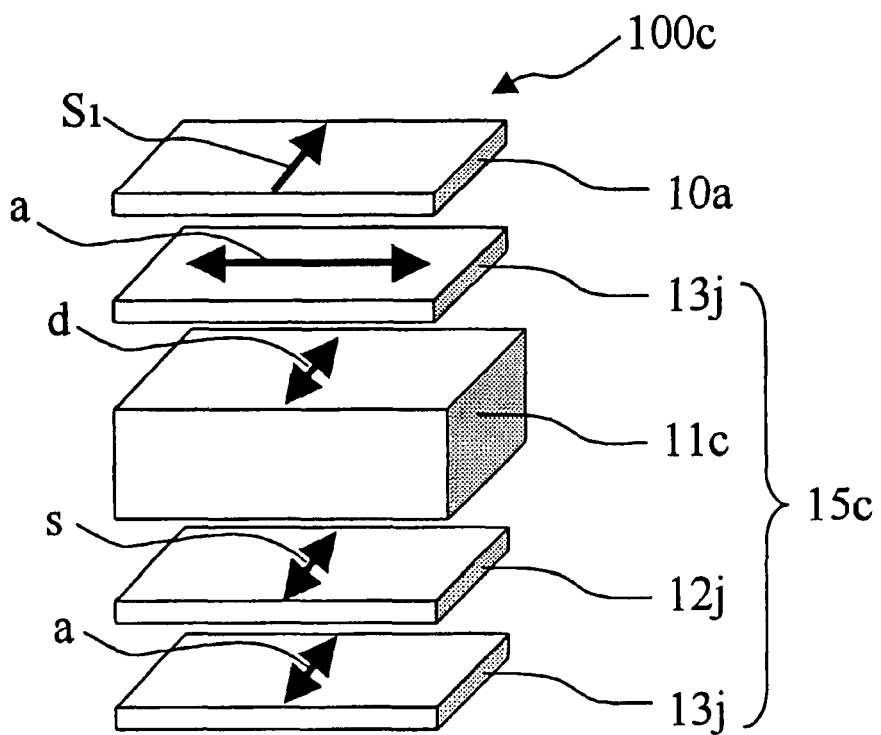
FIG. 14 is a perspective view schematically showing an IPS mode liquid crystal display according to Embodiment 7 of the present invention.

FIG. 14 is a perspective view schematically showing a configuration of an IPS mode liquid crystal display 100c according to Embodiment 7 of the present invention. The attachment and relative positional relationship of axial directions between films is shown in FIG. 14 and Table 7.

TABLE 7

| Component | Azimuth angle φ |
|---|---|
| First anisotropic scattering film 10a (axial azimuth S1 of scattering central axis) | 90° |
| Ninth polarizing plate 13j on viewing screen side (absorption axis a) | 0°-180° |
| IPS mode liquid crystal cell 11c (alignment control direction d of liquid crystal) | 90°-270° |
| Ninth retardation film 12j (lagging axis s) | 90°-270° |
| Ninth polarizing plate 13j on back surface side (absorption axis a) | 90°-270° |

(Preparation of IPS Mode Liquid Crystal Display Element 15c)

First, polarizing plates attached on the viewing screen side and the backlight side of a commercially available IPS mode liquid crystal TV (trade name: TH-26L X 50, product of Matsushita Electric Industrial Co., Ltd.) were peeled, and thereby an IPS mode liquid crystal cell 11c was prepared. Then, a ninth retardation film 12j was attached to the backlight side of a liquid crystal cell 11c, and further a ninth polarizing plate 13j was attached to the backlight side of the ninth retardation film 12j and on the viewing screen side of the liquid crystal cell 11c. As a result, an IPS mode liquid crystal display 15c was prepared.

With respect to the retardation of the ninth retardation film 12j, Re was 140 nm and Rth was 45 nm. With the performances of the ninth polarizing plate 13j, the ninth polarizing plate 13j showed a parallel transmittance of 35.95%, a perpendicular transmittance of 0.004%, and a polarization degree of 99.99%.

(Measurement of Optical Characteristics of IPS Mode Liquid Crystal Display Element 15c)

Figure 18:
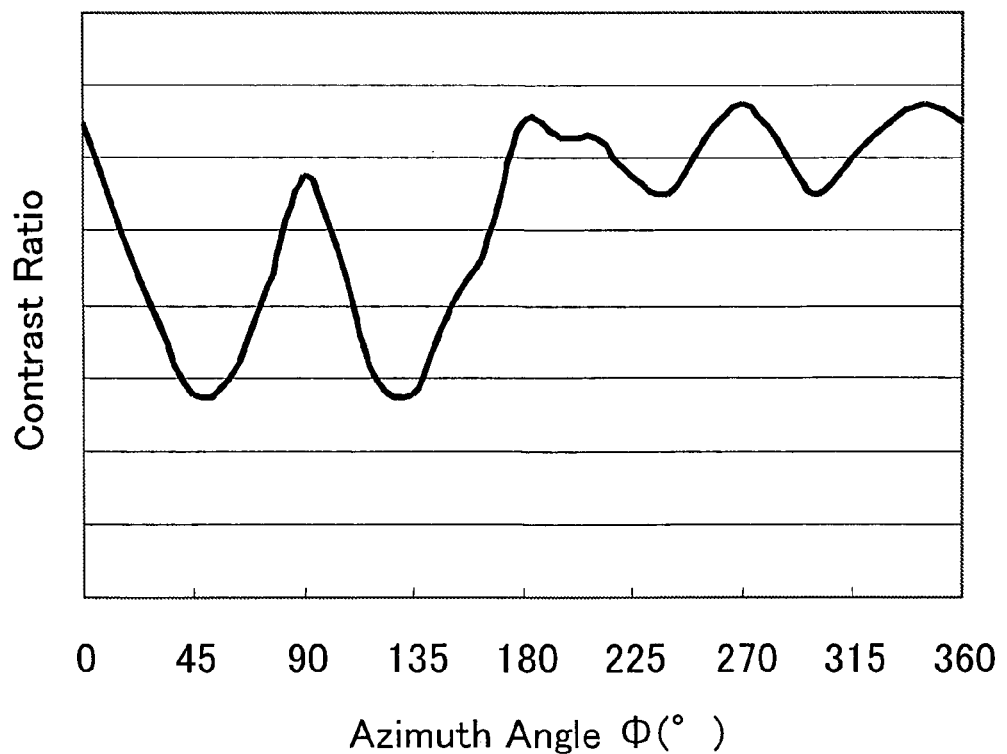
FIG. 18 is a diagram showing azimuth angle dependency of a contrast ratio in a direction having a polar angle Θ of 45° of the IPS mode liquid crystal display element prepared in Embodiment 7 of the present invention.

The IPS mode liquid crystal display element 15c was measured for azimuth angle dependency of a constant ratio in a direction having a polar angle Θ of 45° using a viewing angle measurement device (trade name: EZContrast160R, product of ELDIM company). FIG. 18 shows the results. As shown in FIG. 18, the IPS mode liquid crystal display element 15c had four azimuths at azimuth angles Φ of 0°, 90°, 180°, and 270° as the azimuth in which the contrast ratio in the direction having a polar angle Θ of 45° showed a maximum value (the maximum azimuth). Further, the IPS mode liquid crystal display element 15c had four azimuths at azimuth angles Φ of 45°, 135°, 225°, 315° as the azimuth in which the contrast ratio in the direction having a polar angle Θ of 45° showed a minimum value (the minimum azimuth).

(Preparation of IPS Mode Liquid Crystal Display Element 100c)

Then, the first anisotropic scattering film 10a was attached to the viewing screen side of the liquid crystal display element 15c in such a way that the azimuth at an azimuth angle Φ of 90° of the IPS mode liquid crystal display element 15c (the maximum azimuth) was almost the same as the axial azimuth $S_1$ of the scattering central axis of the first anisotropic scattering film 10a. As a result, an IPS mode liquid crystal display 100c was prepared.

Embodiment 8

(Preparation of OCB Mode Liquid Crystal Display Element and Measurement of Optical Characteristics)

Figure 19:
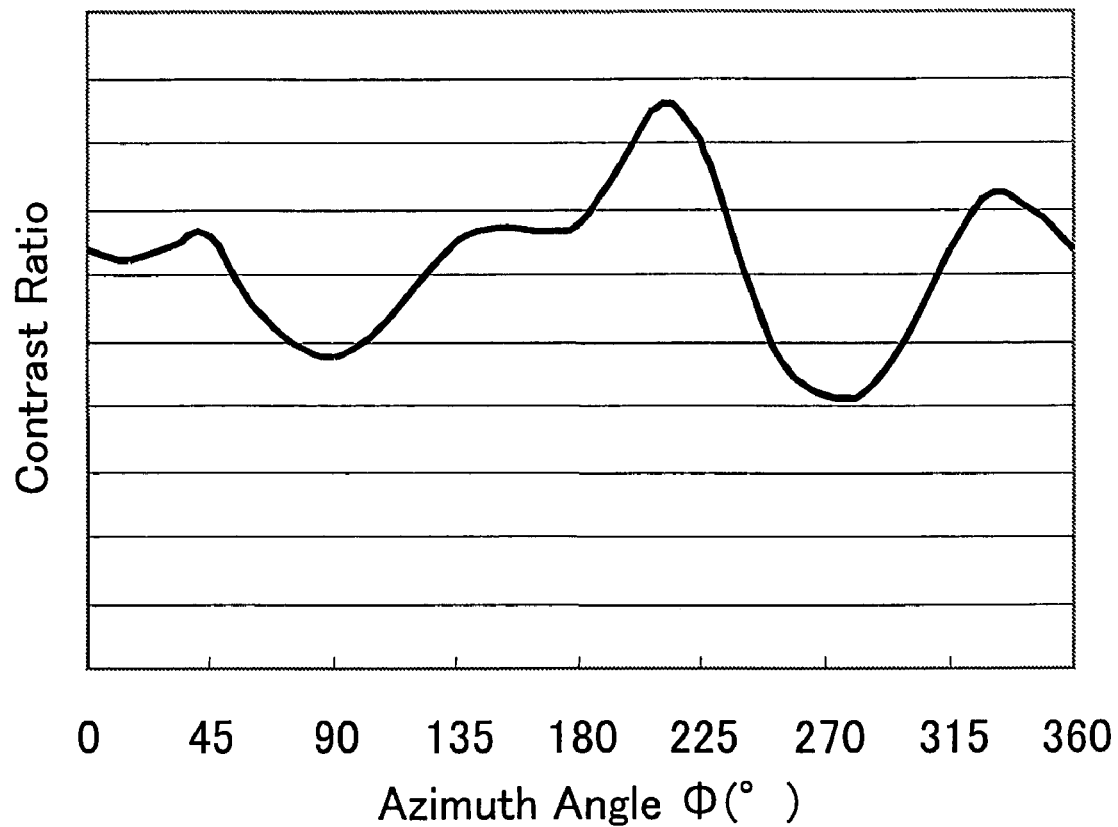
FIG. 19 is a diagram showing azimuth angle dependency of a contrast ratio in a direction having a polar angle Θ of 45° of the OCB mode liquid crystal display element prepared in Embodiment 8 of the present invention.
Figure 20A:
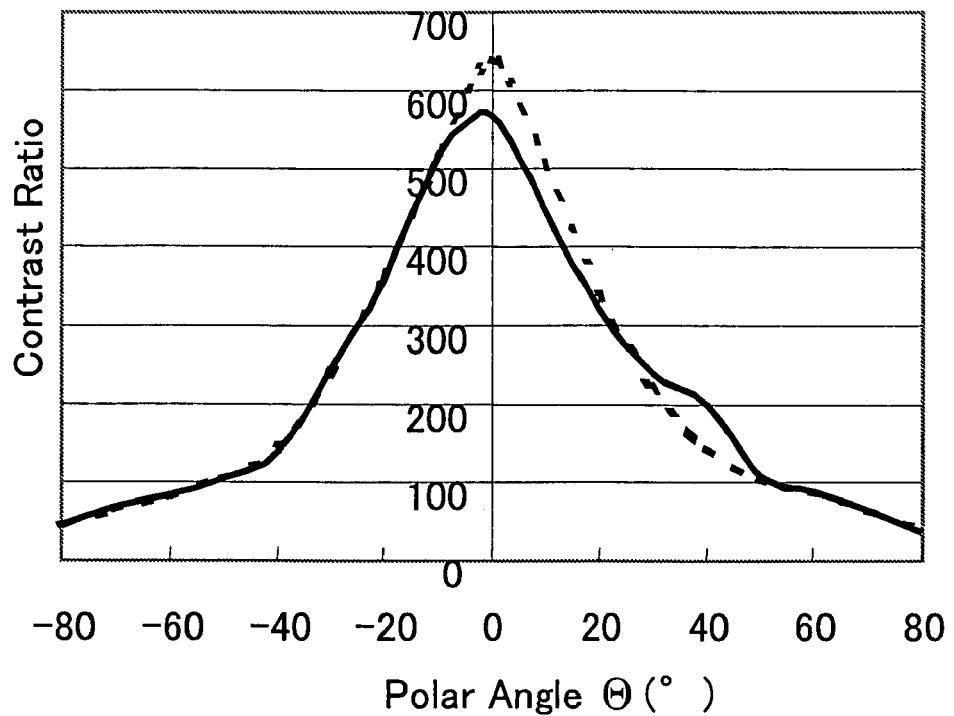
FIG. 20A is a diagram showing polar angle dependencies of contrast ratios in two azimuths at azimuth angles Φ of 90° and 270° of the VA mode liquid crystal display element (broken line) and the VA mode liquid crystal display (solid line) according to Embodiment 1 of the present invention.
Figure 20B:
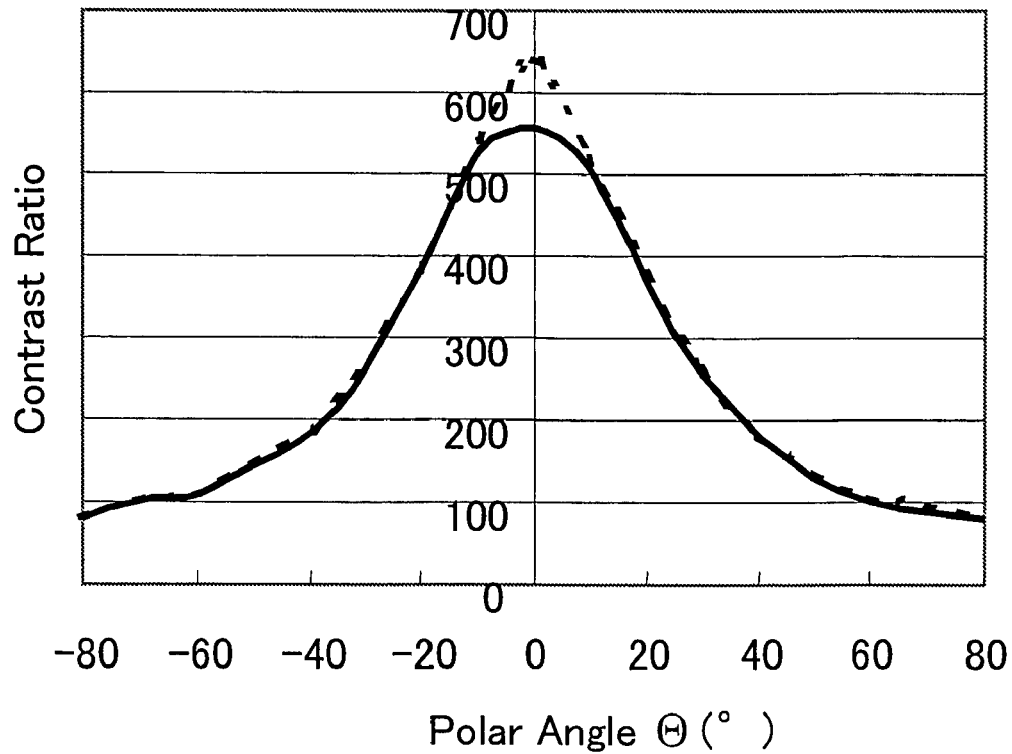
FIG. 20B is a diagram showing polar angle dependencies of contrast ratios in two azimuths at azimuth angles Φ of 0° and 180° of the VA mode liquid crystal display element (broken line) and the VA mode liquid crystal display (solid line) according to Embodiment 1 of the present invention.
Figure 21A:
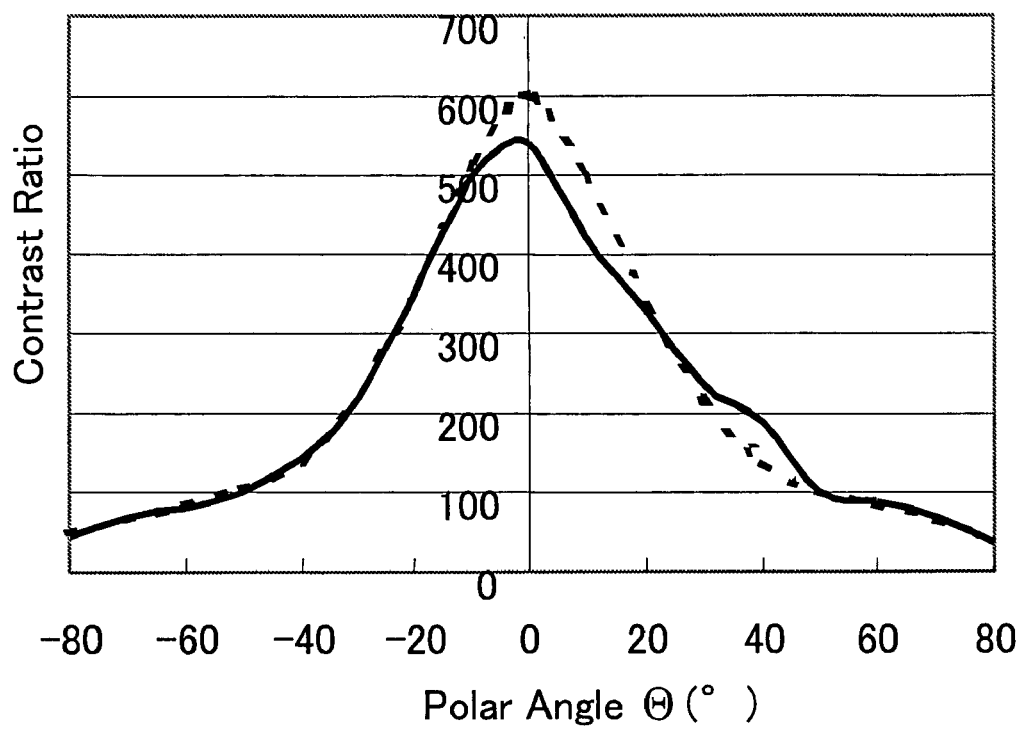
FIG. 21A is a diagram showing polar angle dependencies of contrast ratios in two azimuths at azimuth angles Φ of 90° and 270° of the VA mode liquid crystal display element (broken line) and the VA mode liquid crystal display (solid line) according to Embodiment 2 of the present invention.
Figure 21B:
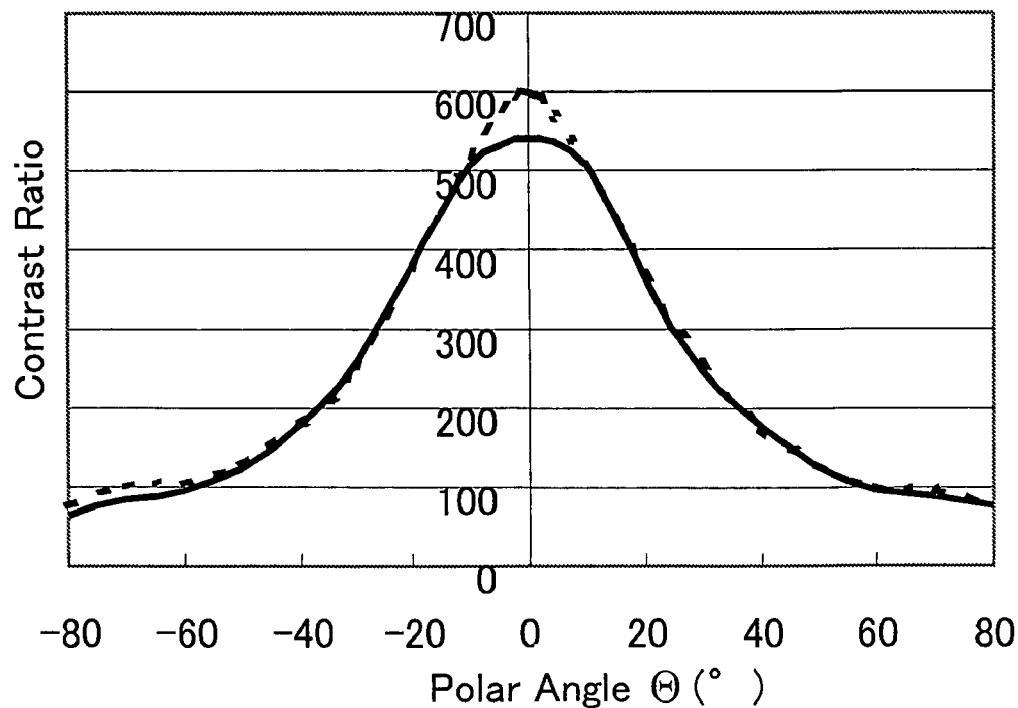
FIG. 21B is a diagram showing polar angle dependencies of contrast ratios in two azimuths at azimuth angles Φ of 0° and 180° of the VA mode liquid crystal display element (broken line) and the VA mode liquid crystal display (solid line) according to Embodiment 2 of the present invention.
Figure 22A:
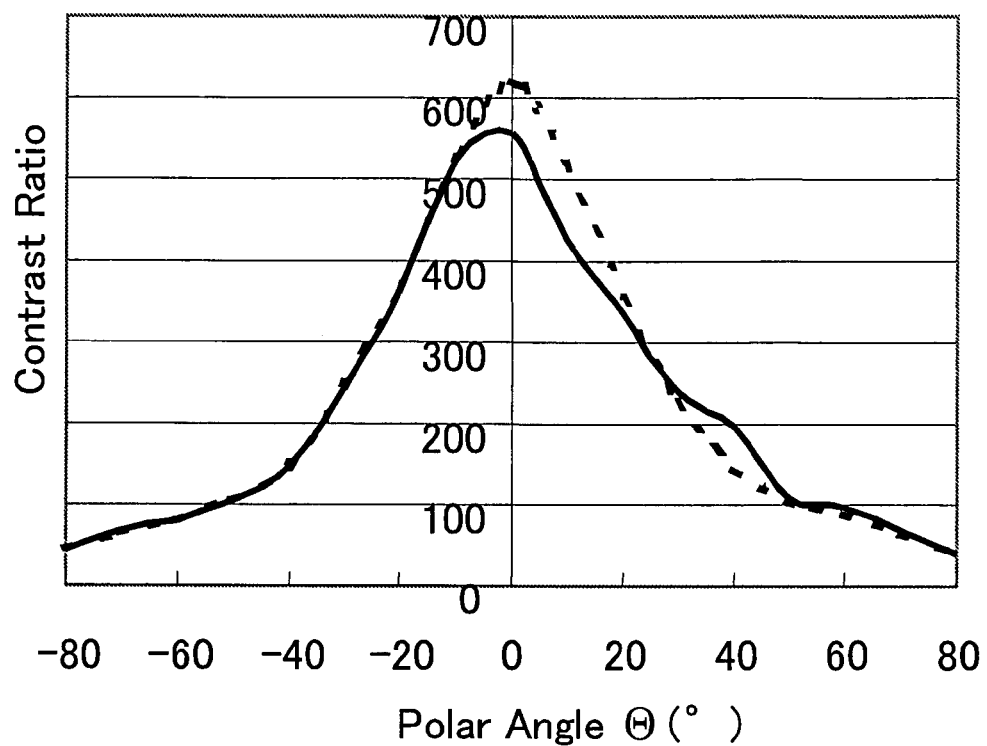
FIG. 22A is a diagram showing polar angle dependencies of contrast ratios in two azimuths at azimuth angles Φ of 90° and 270° of the VA mode liquid crystal display element (broken line) and the VA mode liquid crystal display (solid line) according to Embodiment 3 of the present invention.
Figure 22B:
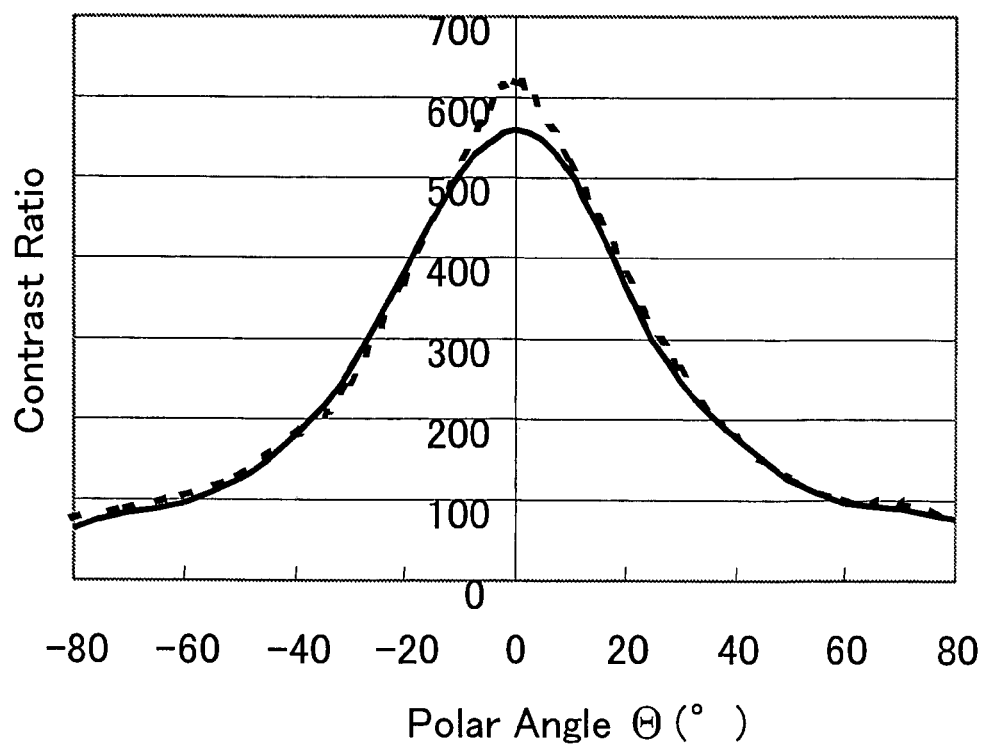
FIG. 22B is a diagram showing polar angle dependencies of contrast ratios in two azimuths at azimuth angles Φ of 0° and 180° of the VA mode liquid crystal display element (broken line) and the VA mode liquid crystal display (solid line) according to Embodiment 3 of the present invention.
Figure 23A:
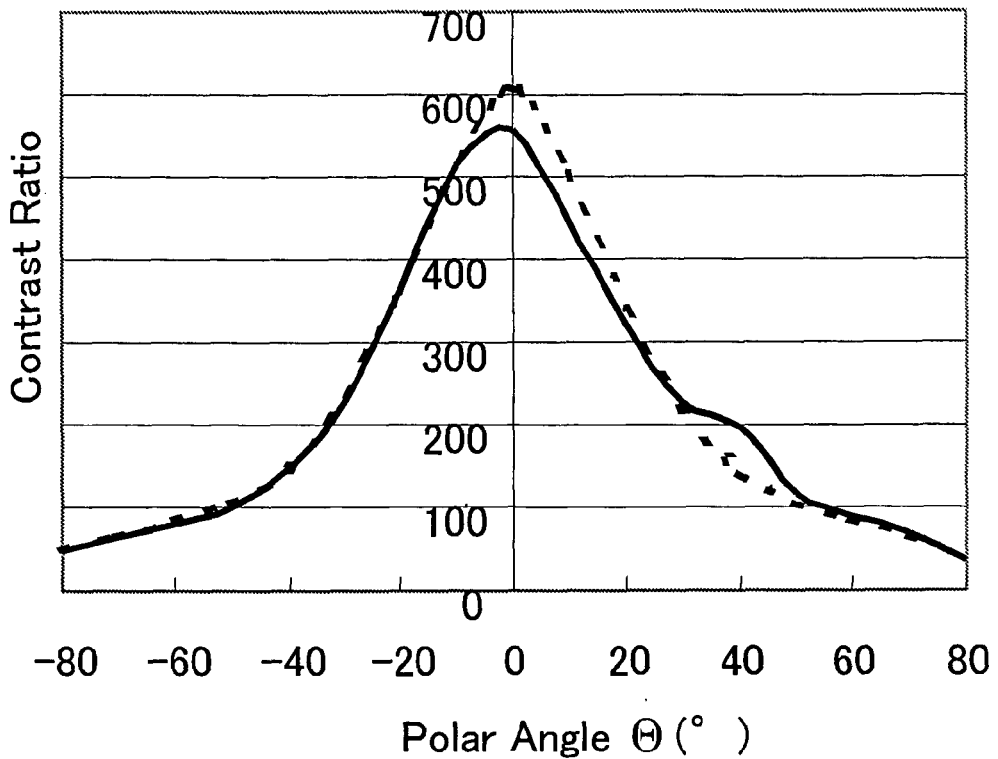
FIG. 23A is a diagram showing polar angle dependencies of contrast ratios in two azimuths at azimuth angles Φ of 90° and 270° of the VA mode liquid crystal display element (broken line) and the VA mode liquid crystal display (solid line) according to Embodiment 4 of the present invention.
Figure 23B:
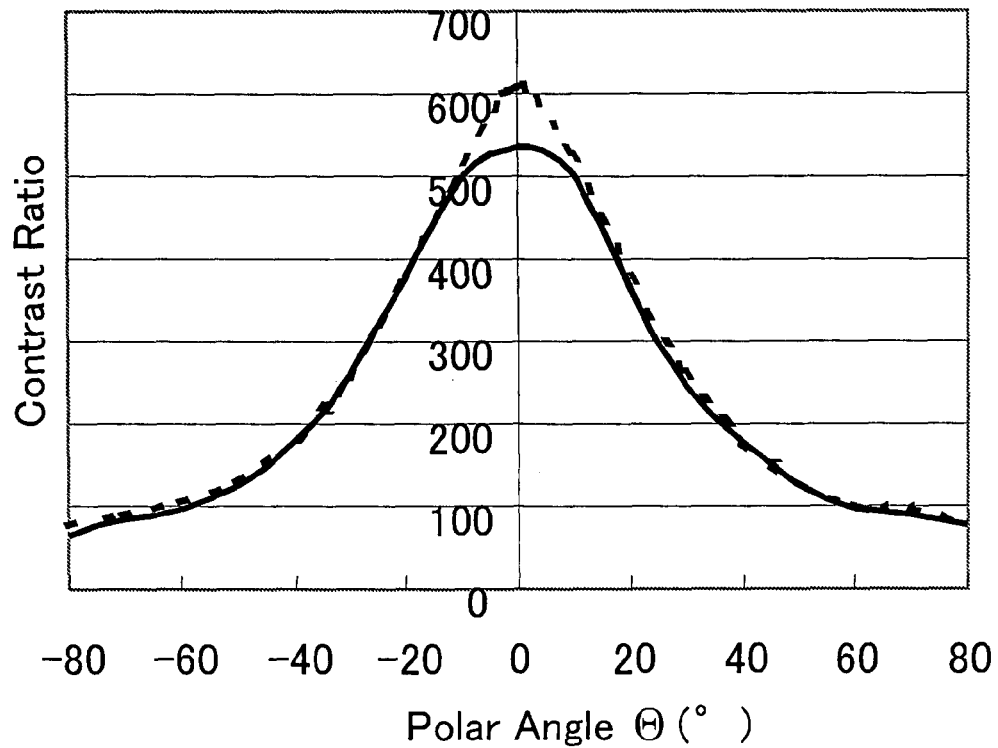
FIG. 23B is a diagram showing polar angle dependencies of contrast ratios in two azimuths at azimuth angles Φ of 0° and 180° of the VA mode liquid crystal display element (broken line) and the VA mode liquid crystal display (solid line) according to Embodiment 4 of the present invention.
Figure 24A:
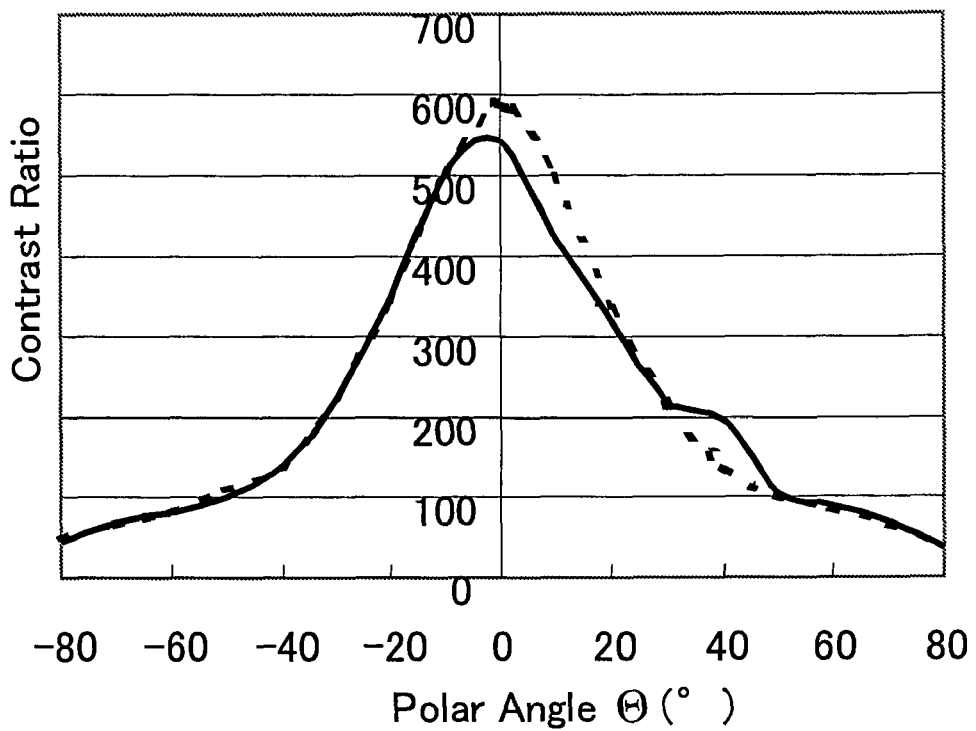
FIG. 24A is a diagram showing polar angle dependencies of contrast ratios in two azimuths at azimuth angles Φ of 90° and 270° of the VA mode liquid crystal display element (broken line) and the VA mode liquid crystal display (solid line) according to Embodiment 5 of the present invention.
Figure 24B:
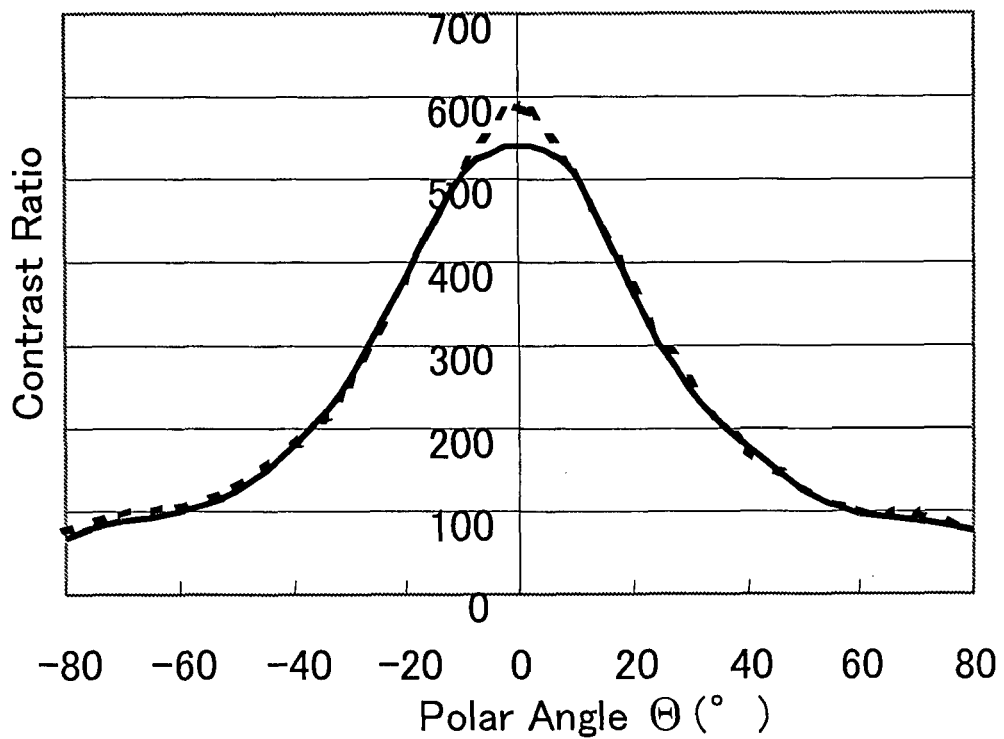
FIG. 24B is a diagram showing polar angle dependencies of contrast ratios in two azimuths at azimuth angles Φ of 0° and 180° of the VA mode liquid crystal display element (broken line) and the VA mode liquid crystal display (solid line) according to Embodiment 5 of the present invention.

A part of a polarizing plate on the backlight side of a commercially available OCB mode liquid crystal TV (trade name: VY23 X D1, product of EIZO NANAO CORP.) was peeled and attached on the viewing screen side to prepare an OCB mode liquid crystal display element. With respect to the performances of the polarizing plate partially peeled, the polarizing plate had a parallel transmittance of 36.30%, across transmittance of 0.005% and a polarization degree of 99.99%. Then, the OCB mode liquid crystal display element was measured for azimuth angle dependency of a contrast ratio in a direction having a polar angle Θ of 45° using a viewing angle measurement device (trade name: EZContrast160R, product of ELDIM company). FIG. 19 shows the results. As shown in FIG. 19, the OCB mode liquid crystal display element 15c had four azimuths at azimuth angles Φ of 45°, 135°, 225°, and 315° as the azimuths in which the contrast ratio in the direction having a polar angle showed a maximum value (the maximum azimuth). Further, the OCB mode liquid crystal display element 15c had four azimuths at Φ of 0°, 90°, 180°, and 270° as the azimuth in which the contrast ratio in the direction having a polar angle Θ of 45° showed a minimum value (the minimum azimuth).

(Preparation of OCB Mode Liquid Crystal Display)

Then, the first anisotropic scattering film 10a was attached to the viewing screen side of the OCB mode liquid crystal display element in such a way that the azimuth at an azimuth angle Φ of 45° of the OCB mode liquid crystal display element (the maximum azimuth) was almost the same as the axial azimuth $S_1$ of the scattering central axis of the first anisotropic scattering film 10a. As a result, an OCB mode liquid crystal display was prepared.

Comparative Embodiment 1

(Preparation of Isotropic Scattering Film)

A UV coating material according to the following formulation was coated on one surface of a PET film having a thickness of 75 μm (Product name: COSMOSHINE®, product number: A4300, product of TOYOBO Co., Ltd.) with a wire bar. Then, the PET film on which the UV coating material was coated was dried and irradiated (cured) with UV ray to obtain an isotropic scattering film having a coated layer with a film thickness of about 3 μm.

| <<UV coating material>> | |
|---|---|
| A UV curable resin (trade name: BEAMSET (registered trademark) 575CB, nonvolatile matter 100%, product of Arakawa Chemical Industries, Ltd.) | 98 parts by weight |
| polystyrene fine particles (trade name: SX350H, average diameter: 3.5 μm, product of Soken Chemical & Engineering Co., Ltd.) | 12 parts by weight |
| MIBK (methyl isobutyl ketone) | 100 parts by weight |

(Measurement of Scattering Property of Isotropic Scattering Film)

Figure 15:
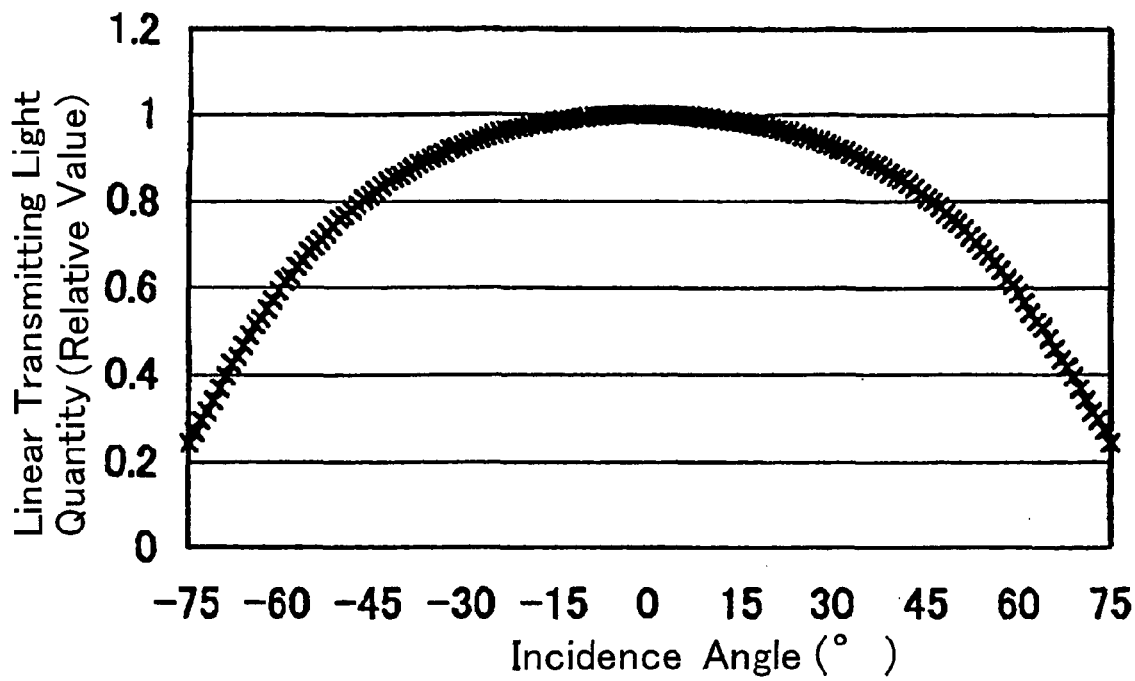
FIG. 15 is a diagram showing incidence angle dependency of scattering property of an isotropic scattering film.

The isotropic scattering film was measured for scattering property in the same manner as in the first anisotropic scattering film. FIG. 15 shows the scattering property of the isotropic scattering film. In the isotropic scattering film, as shown in FIG. 15, a graph showing the incidence angle dependency of the scattering property has a projection shape having a top at an incidence angle of 0°. The reason for this is that a length of a path along which incident light passes through the film increases with increases in the incidence angle.

It is shown by the plus and minus of the incidence angle that the isotropic scattering film was rotated in directions opposite to each other.

(Preparation of Liquid Crystal Display)

The isotropic scattering film with a turbidity of 30% measured with a turbidity meter (trade name: NDH-2000, product of Nippon Denshoku Industries Co., Ltd.) was attached to the viewing screen side of the VA mode liquid crystal display element 15a prepared in Embodiment 1 to prepare a VA mode liquid crystal display. The VA mode liquid crystal display was prepared in the same manner as in Embodiment 1, except that the isotropic scattering film was used instead of the first anisotropic scattering film.

Comparative Embodiment 2

(Preparation of Liquid Crystal Display)

A visible range control film (product name: LUMISTY®, product number: MFY-1060, product of Sumitomo Chemical Co., Ltd.) was attached to the viewing screen side of the VA mode liquid crystal display element 15a prepared in Embodiment 3 to prepare a VA mode liquid crystal device. The LUMISTY® is a film showing anisotropic scattering property in a specific direction. In this Comparative Embodiment, the LUMISTY® scattering light which enters the LUMISTY® at a polar angle Θ of 10 to 60° in one azimuth (hereinafter, also referred to as "scattering direction") was attached to the viewing screen side of the VA mode liquid crystal display element 15a in such a way that the scattering direction was almost the same as the azimuth at an azimuth angle Φ of 90° (the maximum azimuth) of the VA mode liquid crystal display element 15a. Therefore, the constitution of the device in this Comparative Embodiment was the same as in Embodiment 3, except that the LUMISTY® was used instead of the first anisotropic scattering film.

2. Measurement of Optical Characteristics of Liquid Crystal Displays in Embodiments 1 to 8 and Comparative Embodiments 1 and 2

The liquid crystal displays in Embodiments 1 to 8 and Comparative Embodiments 1 and 2 were measured for viewing angle dependency of luminance and chromaticity at the time of black display (grading value: 0), intermediate scale display (grading value: 128) and white display (grading value: 255) in 256 gray scale display using a viewing angle measuring device (Product name: EZContrast160R, manufactured by ELDIM company). The viewing angle is represented by a polar angle Θ and an azimuth angle Φ.

"Evaluation of Improvement in Viewing Angle Dependency of Contrast Ratio"

Each liquid crystal display was evaluated for polar angle dependency of a contrast ratio in the azimuth (the maximum azimuth) in which the contrast ratio of the liquid crystal display element shows the maximum value in the direction having a polar angle Θ of 45°. That is, the VA mode and IPS mode liquid crystal displays were evaluated for polar angle dependency of the contrast ratio in the four azimuths at azimuth angles Φ of 0°, 90°, 180°, 270°. The TN mode and OCB mode liquid crystal displays were evaluated for polar angle dependency of the contrast ratio in the four azimuths at azimuth angles Φ of 45°, 135°, 225°, 315°. The contrast ratio was measured based on the following formula (3) using the luminance measured at black display (grading value: 0) and at white display (grading value: 255)

(Contrast ratio)=(White display luminance)/(Black display luminance)　　　(3)

FIG. 20A to 29A and 20B to 29B each show the polar angle dependencies of the contrast ratios in the maximum azimuths of the liquid crystal display element and the liquid crystal display according to Embodiments 1 to 8 and Comparative Embodiments 1 and 2. The solid line in each figure shows the polar angle dependency of the contrast ratio of the liquid crystal display. The broken line in each figure shows the polar angle dependency of the contrast ratio of the liquid crystal display element.

FIGS. 20A to 27A each show the polar angle dependencies of the contrast ratios in two maximum azimuths almost parallel to the axial azimuth of the scattering central axis of the first anisotropic scattering film 10a. FIGS. 20B to 27B each show the polar angle dependencies of the contrast ratios in two azimuths perpendicular to the maximum azimuths. In the VA mode liquid crystal displays according to Embodiments 1 to 5 in the present invention, FIGS. 20A to 24A clearly show that in almost the same maximum azimuth as the axial azimuth of the scattering central axis (in the azimuth at an azimuth angle Φ=90°), the contrast ratio was improved near the axial direction of the scattering central axis (the direction having a polar angle Θ of 30°). The effect of improving the viewing angle dependency of the contrast ratio was obtained. FIGS. 20A to 24A and 20B to 24B clearly show that no influence such as reduction in contrast ratio was observed in the azimuth opposite to the maximum azimuth (in the azimuth at an azimuth angle Φ of 270°) and two azimuths perpendicular to the maximum azimuth (in the azimuths at azimuth angles Φ of 0° and 180°).

Figure 28A:
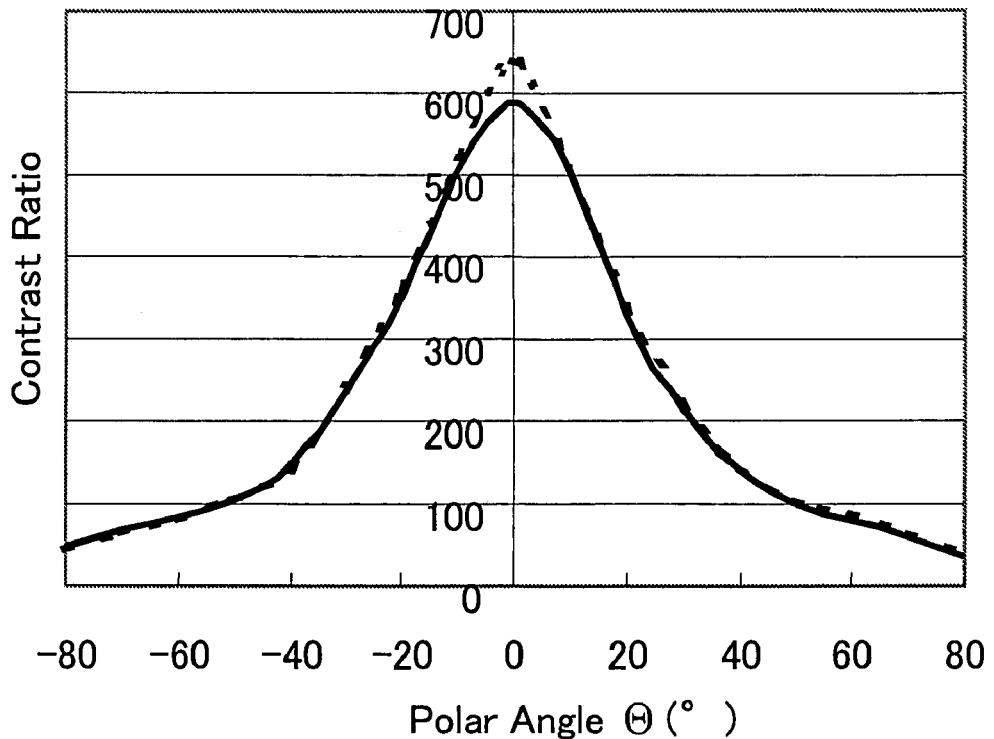
FIG. 28A is a diagram showing polar angle dependencies of contrast ratios in two azimuths at azimuth angles Φ of 90° and 270° of the VA mode liquid crystal display element (broken line) and the VA mode liquid crystal display (solid line) according to Comparative Embodiment 1 of the present invention.
Figure 28B:
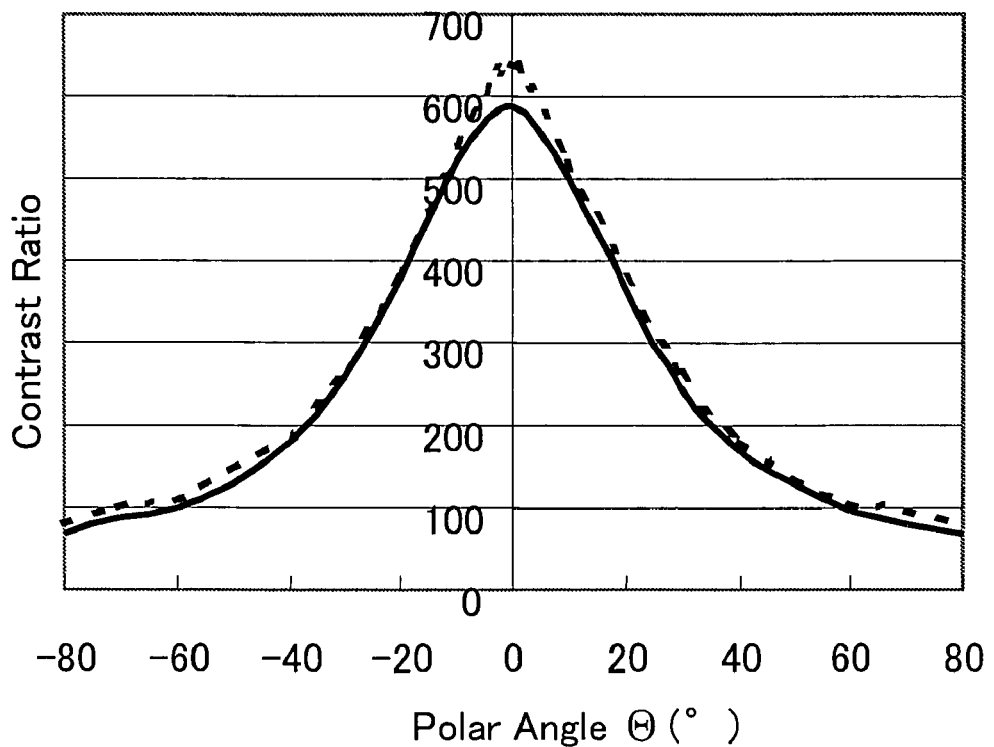
FIG. 28B is a diagram showing polar angle dependencies of contrast ratios in two azimuths at azimuth angles Φ of 0° and 180° of the VA mode liquid crystal display element (broken line) and the VA mode liquid crystal display (solid line) according to Comparative Embodiment 1 of the present invention.
Figure 29A:
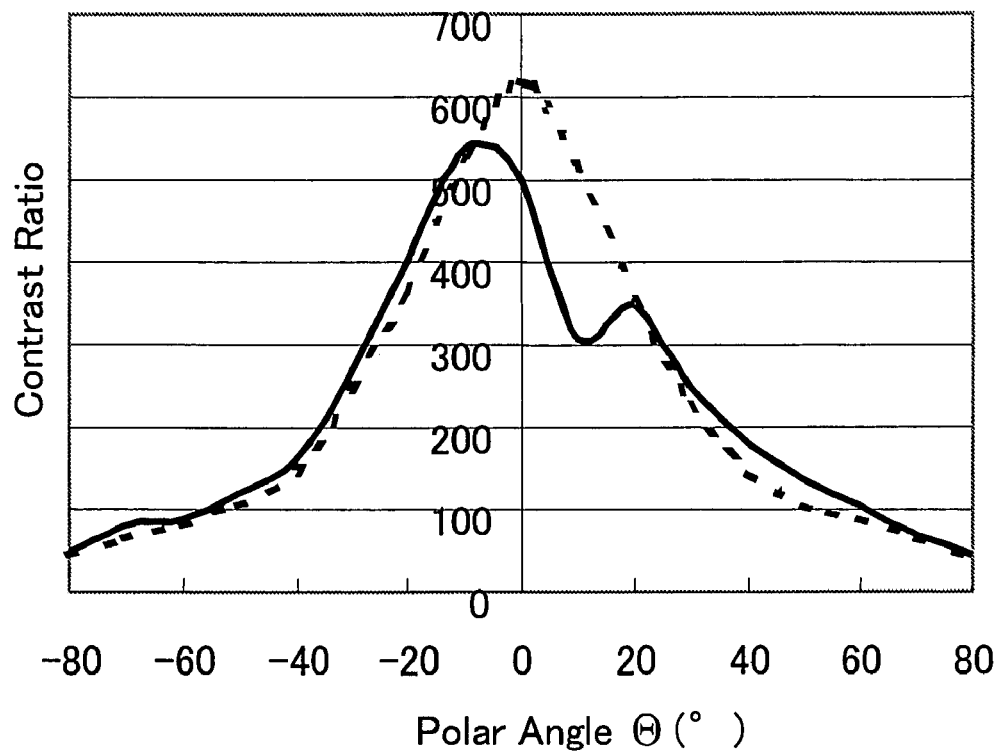
FIG. 29A is a diagram showing polar angle dependencies of contrast ratios in two azimuths at azimuth angles Φ of 90° and 270° of the VA mode liquid crystal display element (broken line) and the VA mode liquid crystal display (solid line) according to Comparative Embodiment 2 of the present invention.
Figure 29B:
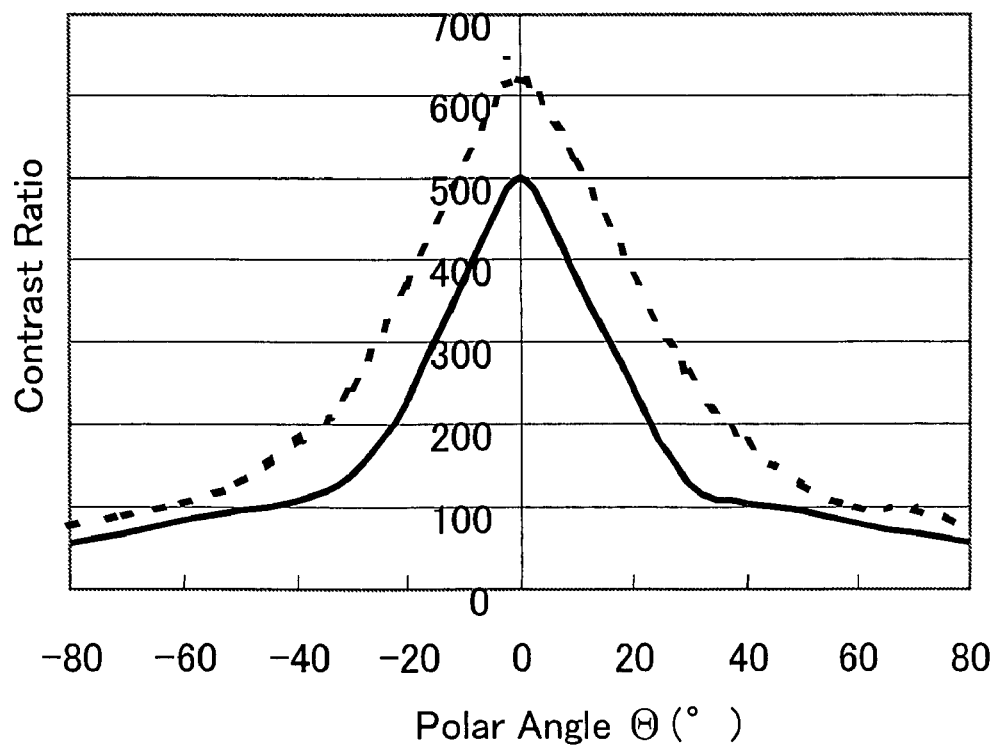
FIG. 29B is a diagram showing polar angle dependencies of contrast ratios in two azimuths at azimuth angles Φ of 0° and 180° of the VA mode liquid crystal display element (broken line) and the VA mode liquid crystal display (solid line) according to Comparative Embodiment 2 of the present invention.

However, in the VA mode liquid crystal display according to Comparative Embodiment 1, the contrast ratio was not improved in any azimuths, as shown in FIGS. 28A and 28B. In the VA mode liquid crystal display according to Comparative Embodiment 2, FIG. 29A shows that the viewing angle in almost the same maximum azimuth as the scattering direction (in the azimuth at an azimuth angle Φ of 90°) was improved, but in two azimuths almost perpendicular to the scattering direction (in the azimuths at azimuth angles Φ of 0° and 180°), the contrast ratio was dramatically lowered in a wide range and the largest contrast ratio obtained in the front direction (in the direction having a polar angle Θ of 0°) was also lowered dramatically.

Figure 25A:
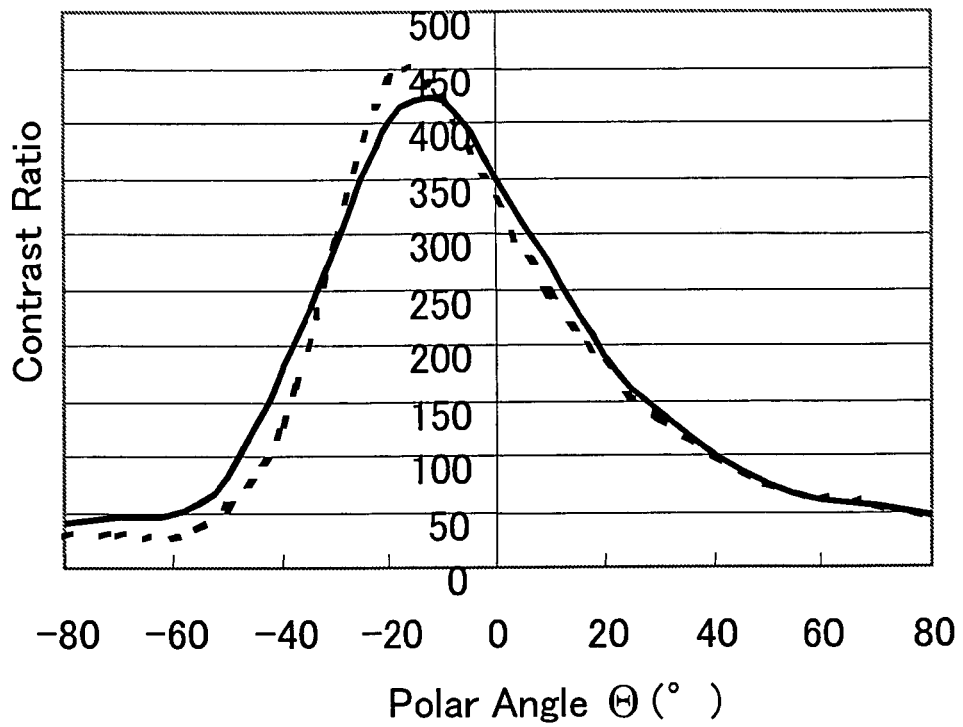
FIG. 25A is a diagram showing polar angle dependencies of contrast ratios in two azimuths at azimuth angles Φ of 45° and 225° of the TN mode liquid crystal display element (broken line) and the TN mode liquid crystal display (solid line) according to Embodiment 6 of the present invention.
Figure 25B:
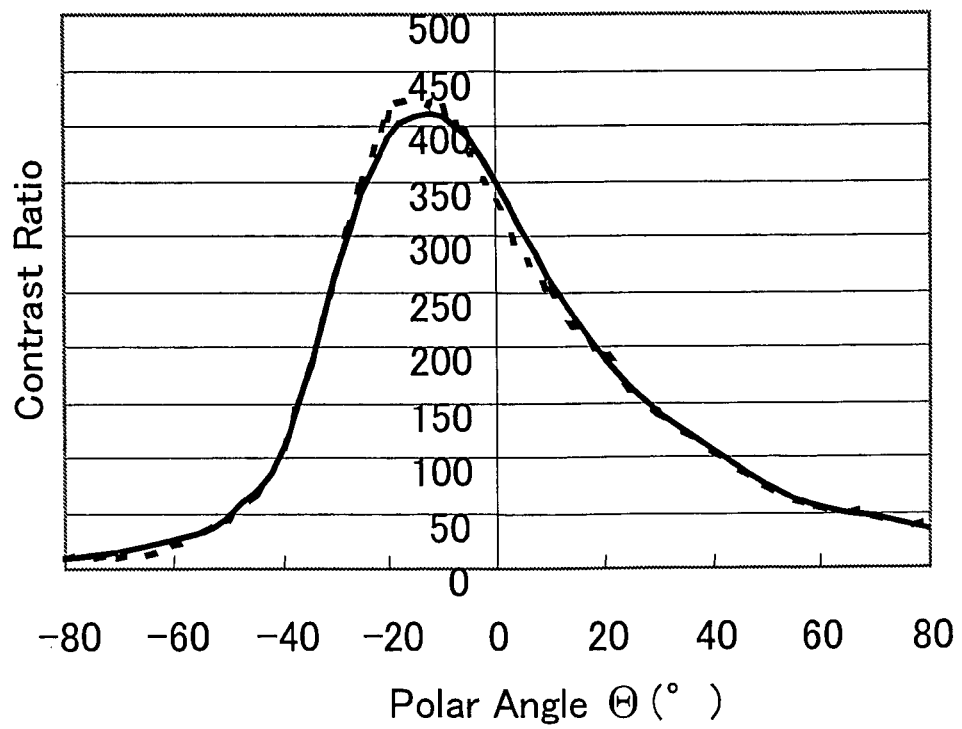
FIG. 25B is a diagram showing polar angle dependencies of contrast ratios in two azimuths at azimuth angles Φ of 135° and 315° of the TN mode liquid crystal display element (broken line) and the TN mode liquid crystal display (solid line) according to Embodiment 6 of the present invention.

In the TN mode liquid crystal display according to Embodiment 6 of the present invention, FIG. 25A clearly shows that in almost the same maximum azimuth as the axial azimuth of the scattering central axis (in the azimuth at an azimuth angle Φ of 225°), the contrast ratio was improved near the axial direction of the scattering central axis (the direction having a polar angle Θ of 30°). The effect of improving the viewing angle dependency of the contrast ratio was obtained. FIGS. 25A and 25B clearly show that no influence such as reduction in contrast ratio was observed in the azimuth opposite to the maximum azimuth (in the azimuth at an azimuth angle Φ of 45°) and two azimuths perpendicular to the maximum azimuth (in the azimuths at azimuths Φ of 135° and 315°).

Figure 26A:
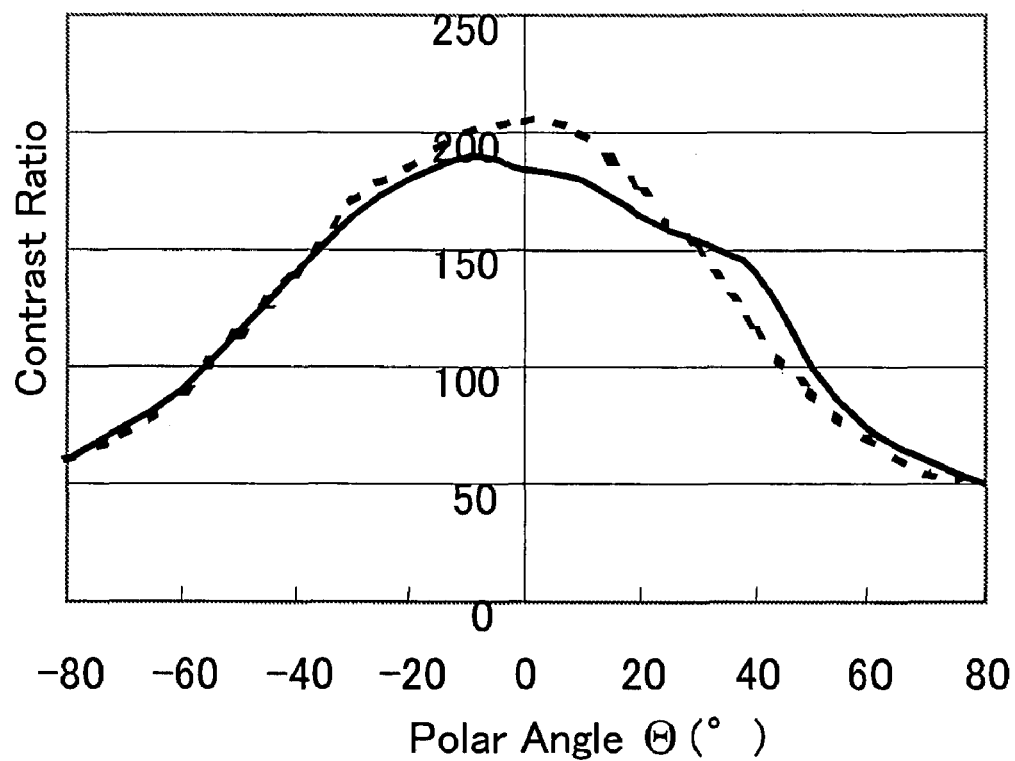
FIG. 26A is a diagram showing polar angle dependencies of contrast ratios in two azimuths at azimuth angles Φ of 90° and 270° of the IPS mode liquid crystal display element (broken line) and the IPS mode liquid crystal display (solid line) according to Embodiment 7 of the present invention.
Figure 26B:
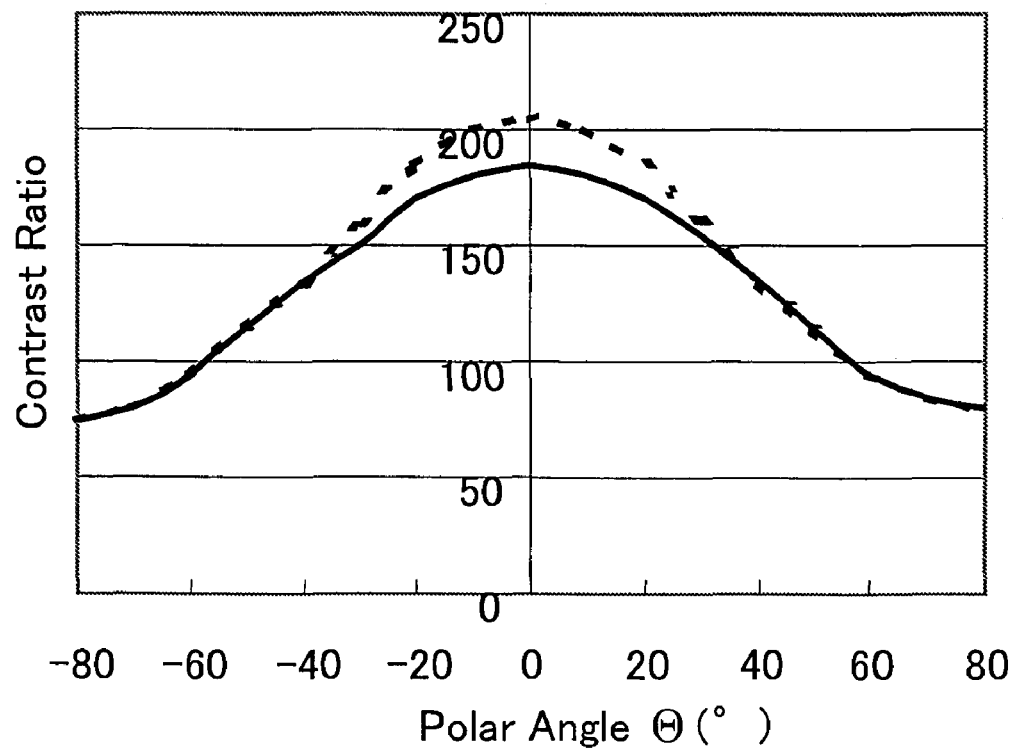
FIG. 26B is a diagram showing polar angle dependencies of contrast ratios in two azimuths at azimuth angles Φ of 0° and 180° of the IPS mode liquid crystal display element (broken line) and the IPS mode liquid crystal display (solid line) according to Embodiment 7 of the present invention.

In the IPS mode liquid crystal display according to Embodiment 7 of the present invention, FIG. 26A clearly shows that in almost the same maximum azimuth as the axial azimuth of the scattering central axis (in the azimuth at an azimuth angle Φ of 90°), the contrast ratio was improved near the axial direction of the scattering central axis (in the direction having a polar angle Θ of 30°). Therefore, the effect of improving the viewing angle dependency of the contrast ratio was obtained. FIGS. 26A and 26B clearly show that no influence such as reduction in contrast ratio was observed in the azimuth opposite to the maximum azimuth (in the azimuth at an azimuth angle Φ of 270°) and two azimuths perpendicular to the maximum azimuth (in the azimuths at azimuth angles Φ of 0° and 180°)

Figure 27A:
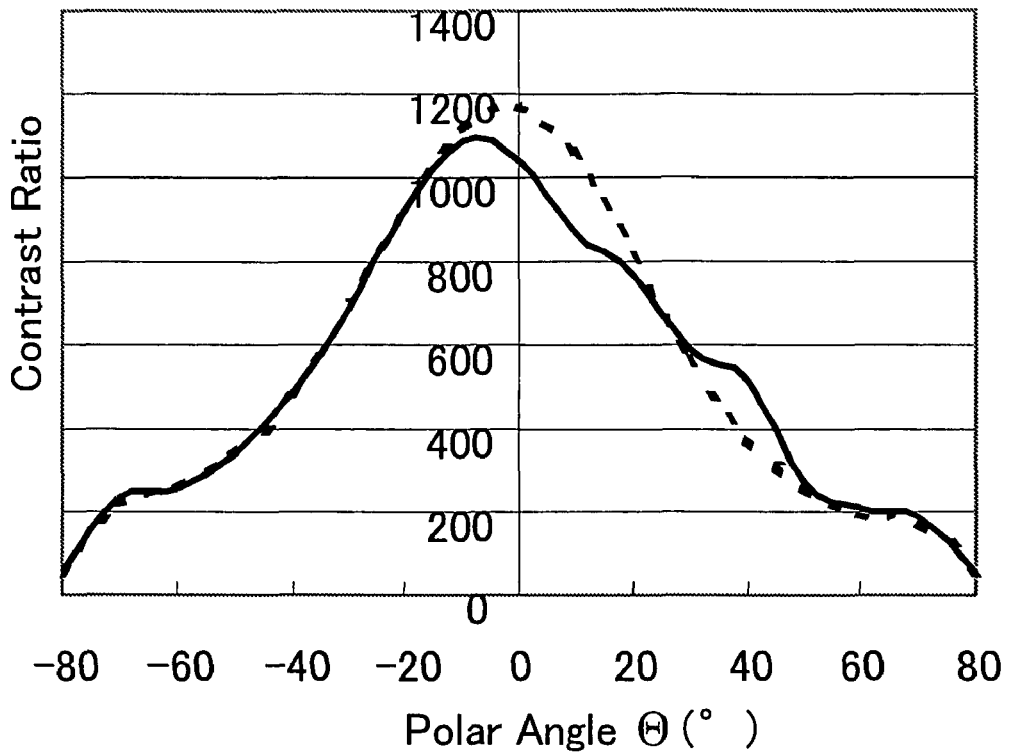
FIG. 27A is a diagram showing polar angle dependencies of contrast ratios in two azimuths at azimuth angles Φ of 45° and 225° of the OCB mode liquid crystal display element (broken line) and the OCB mode liquid crystal display (solid line) according to Embodiment 8 of the present invention.
Figure 27B:
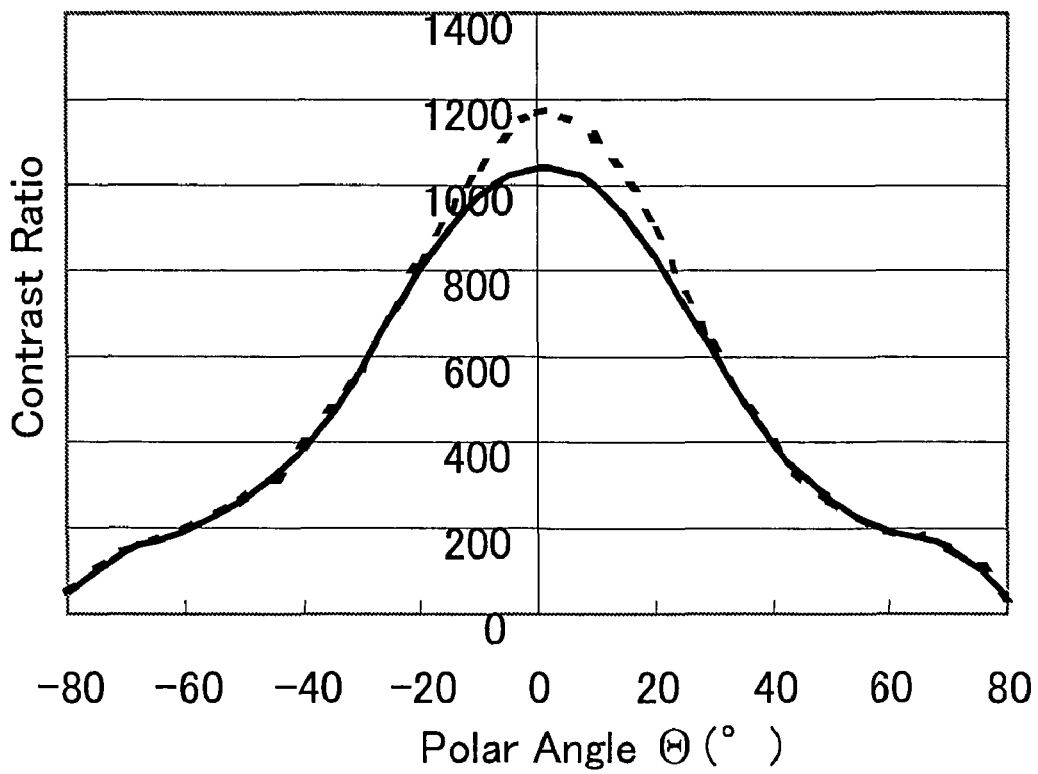
FIG. 27B is a diagram showing polar angle dependencies of contrast ratios in two azimuths at azimuth angles Φ of 135° and 315° of the OCB liquid crystal display element (broken line) and the OCB mode liquid crystal display (solid line) according to Embodiment 8 of the present invention.

In the OCB mode liquid crystal display according to Embodiment 8 of the present invention, FIG. 27A clearly shows that in almost the same maximum azimuth as the axial azimuth of the scattering central axis (in the azimuth at an azimuth angle Φ=45°), the contrast ratio was improved near the axial direction of the scattering central axis (the direction having a polar angle Θ of 30°). Therefore, the effect of improving the viewing angle dependency of the contrast ratio was obtained. FIGS. 27A and 27B clearly show that no influence such as reduction in contrast ratio was observed in the azimuth opposite to the maximum azimuth (in the azimuth at an azimuth angle Φ of 225°) and two azimuths perpendicular to the maximum azimuth (in the azimuths at azimuth angles Φ of 135° and 315°).

The reason why these results were obtained is explained as follows.

In the liquid crystal displays according to Embodiments 1 to 8 of the present invention, the first anisotropic scattering film is attached to the viewing screen side of the liquid crystal display element in such a way that the axial azimuth of the scattering central axis is almost the same as the azimuth in which the contrast ratio of the liquid crystal display element in the direction inclined by 45° from the normal direction of the viewing screen of the liquid crystal display element shows a maximum value (the maximum azimuth). Therefore, light (white luminance) which enters the film in the direction substantially parallel to the axial direction of the scattering central axis is scattered about the scattering central axis in all directions and averaged, and thereby the viewing angle dependency of the contrast ratio can be improved at least in almost the same maximum azimuth as the axial azimuth of the scattering central axis. The first anisotropic scattering film shows the scattering property shown in FIG. 7 and light which enters the film in directions other than the direction substantially parallel to the axial direction of the scattering central axis is weakly scattered. Therefore, it can be possible to suppress the scattering of light which enters the film in such directions from reducing display quality in directions showing a large contrast ratio, and the like. That is, the first anisotropic scattering film can improve the viewing angle dependency of the contrast ratio in wider azimuths about the scattering central axis without affecting the contrast ratio in other azimuths, as compared with the previous anisotropic scattering film showing the anisotropic scattering property only in a specific azimuth.

In contrast, in the liquid crystal display according to Comparative Embodiment 1, the isotropic scattering film which was used instead of the first anisotropic scattering film shows the scattering property shown in FIG. 15, and it is impossible for such an isotropic scattering film to scatter incident light from a specific direction in all directions and thereby average the light. Therefore, the viewing angle dependency of the contrast ratio cannot be improved in any azimuth. In addition, in the liquid crystal display according to Comparative Embodiment 2, the LUMISTY® which was used instead of the first anisotropic scattering film shows anisotropic scattering property only in a specific azimuth. Therefore, in azimuths in which the film shows no anisotropic scattering property, even incident light in directions showing a small contrast ratio is intensely scattered. As a result, the scattering of the incident light in such directions reduces the largest contrast ratio obtained in the front direction and the like.

"Evaluation of Improvement in Gamma Curve"

A gamma curve in the front direction (in the direction having a polar angle Θ of 0°) and gamma curves in oblique directions (in four directions having a polar angle Θ of 40° and an azimuth in which the contrast ratio of the liquid crystal display element showed a maximum value at a polar angle Θ of 40°) were measured. The luminance at white display was defined as 1, and the luminance at each gray scale display was normalized. Then, a deviation (deviation quantity) between the normalized luminance in the front direction at intermediate scale display (grading value: 128) and the normalized luminance in each oblique direction at intermediate scale display (grading value: 128) was calculated. Table 8 shows the proportion of the improvement effect, which was determined by comparison the above-mentioned deviation in the liquid crystal display element and that in the liquid crystal display. That is, the larger the value described in Table 8, the larger the improvement effect is.

TABLE 8

|  | Φ = 0° | Φ = 90° | Φ = 180° | Φ = 270° |
|---|---|---|---|---|
| Embodiment 1 | 19 | 48 | 21 | 23 |
| Embodiment 2 | 20 | 52 | 19 | 21 |
| Embodiment 3 | 18 | 49 | 20 | 18 |
| Embodiment 4 | 19 | 50 | 21 | 23 |
| Embodiment 5 | 22 | 55 | 22 | 19 |
| Comparative Embodiment 1 | 11 | 12 | 12 | 15 |
| Comparative Embodiment 2 | 15 | 38 | 10 | 14 |

Table 8 clearly shows that in the liquid crystal displays according to Embodiments 1 to 5 of the present invention, the effect of improving the deviation in the gamma curve was large in almost the same maximum azimuth as the axial azimuth of the scattering central axis (in the azimuth at an azimuth angle Φ of 90°). Also in three maximum azimuths other than the maximum azimuth (in the azimuths at azimuth angles Φ of 0°, 180°, and 270°), the effect of improving the deviation in the gamma curve was obtained. However, in the liquid crystal display according to Comparative Embodiment 1, the effect of improving the deviation was small in each azimuth. In the liquid crystal display according to Comparative Embodiment 2, the effect of improving the deviation in the gamma curve was large in almost the same maximum azimuth as the scattering direction (in the azimuth at an azimuth angle Φ of 90°). However, the largest contrast ratio was significantly lowered as shown in the above-mentioned evaluation results of improvement in viewing angle dependency of the contrast ratio.

The reason why these results were obtained is explained as follows. The gamma curve in VA mode liquid crystal display elements is generally designed to be optimal in the direction showing the largest contrast ratio. The viewing angle dependency of the gamma curve has the same tendency as in the viewing angle dependency of the contrast ratio. According to the liquid crystal displays in Embodiments 1 to 5 of the present invention and Comparative Embodiment 2, the first anisotropic scattering film and the LUMISTY® show anisotropic scattering property in at least one azimuth. Therefore, the viewing angle dependency of the gamma curve can be significantly improved in the maximum azimuth if each film is attached to the viewing screen side of the VA mode liquid crystal display element in such a way that the azimuth in which each film shows anisotropic scattering property is almost the same as the maximum azimuth of the VA mode liquid crystal display element. According to the liquid crystal displays in Embodiments 1 to 5, the first anisotropic scattering film shows anisotropic scattering property in all azimuths. Therefore, even in three maximum azimuths other than the maximum azimuth that is almost the same as the azimuth in which each film shows anisotropic scattering property, the viewing angle dependency of the gamma curve can be improved. In contrast, according to the liquid crystal displays in Comparative Embodiment 1, the isotropic scattering film which was used instead of the first anisotropic scattering film shows no anisotropic scattering property, and therefore it is impossible for the film to scatter only incident light from a specific direction in all directions and thereby average the light. As a result, the viewing angle dependency of the gamma curve cannot be improved.

3. Preparation of Liquid Crystal Displays in Examples 9 to 17 and Comparative Example 3

Embodiment 9

Figure 30:
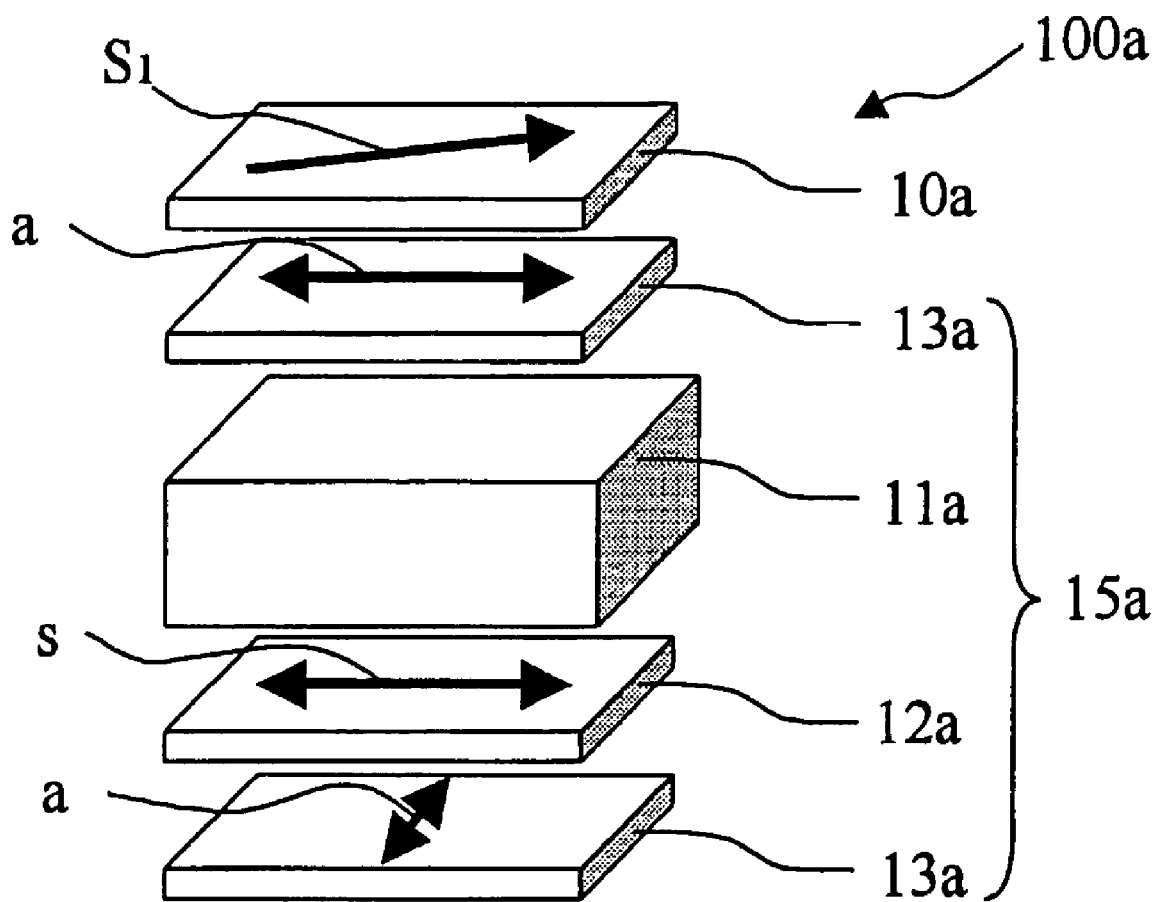
FIG. 30 is a perspective view schematically showing a configuration of a VA mode liquid crystal display according to Embodiment 9 of the present invention.

FIG. 30 is a perspective view schematically showing a configuration of a VA mode liquid crystal display according to Embodiment 9 of the present invention. The attachment and relative positional relationship of axial directions between films is shown in FIG. 30 and Table 9.

The VA mode liquid crystal display according to this Embodiment has the same configuration as in the VA mode liquid crystal display according to Embodiment 1, as shown in FIG. 30, except that the first anisotropic scattering film 10*a* was attached to the viewing screen side of the VA mode liquid crystal display element 15*a* in such a way that the azimuth at an azimuth angle Φ of 45° of the liquid crystal display element 15*a* (the minimum azimuth) was almost the same as the axial azimuth $S_1$ of the scattering central axis of the first anisotropic scattering film 10*a*.

TABLE 9

| Component | Azimuth angle φ |
| --- | --- |
| First anisotropic scattering film 10a (axial azimuth S1 of scattering central axis) | 45° |
| First polarizing plate 13a on viewing screen side (absorption axis a) | 0°-180° |
| VA mode liquid crystal cell 11a (liquid crystal molecule tilt azimuth) | 45°, 135°, 225°, 315° |
| First retardation film 12a (lagging axis s) | 0°-180° |
| First polarizing plate 13a on back surface side (absorption axis a) | 90°-270° |

Embodiment 10

Figure 31:
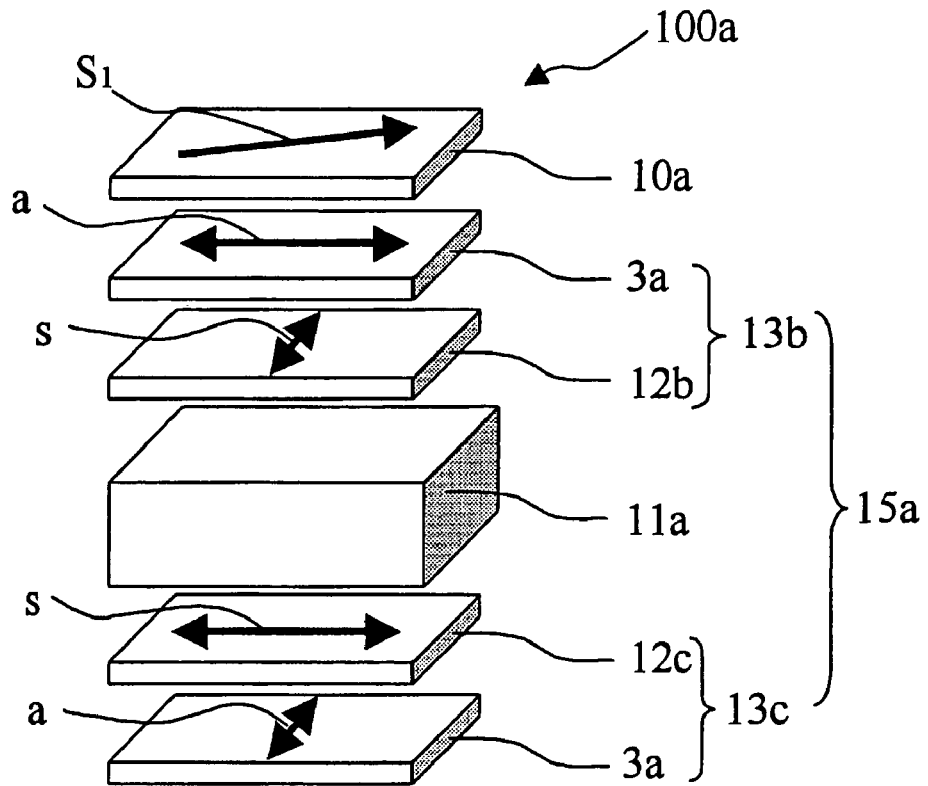
FIG. 31 is a perspective view schematically showing a configuration of a VA mode liquid crystal display according to Embodiment 10 of the present invention.

FIG. 31 is a perspective view schematically showing a configuration of a VA mode liquid crystal display 100*a* according to Embodiment 10 of the present invention. The attachment and relative positional relationship of axial directions between films is shown in FIG. 31 and Table 10.

The VA mode liquid crystal display according to this Embodiment has the same configuration as in the VA mode liquid crystal display according to Embodiment 2, as shown in FIG. 31, except that the first anisotropic scattering film 10*a* was attached to the viewing screen side of the VA mode liquid crystal display element 15*a* in such a way that the azimuth at an azimuth angle Φ of 45° of the liquid crystal display element 15*a* (the minimum azimuth) was almost the same as the axial azimuth $S_1$ of the scattering central axis of the first anisotropic scattering film 10*a*.

TABLE 10

| Component | Azimuth angle φ |
| --- | --- |
| First anisotropic scattering film 10a (axial azimuth S1 of scattering central axis) | 45° |
| Polarizing element 3a on viewing screen side (absorption axis a) | 0°-180° |
| Second retardation film 12b (lagging axis s) | 90°-270° |
| VA mode liquid crystal cell 11a (liquid crystal molecule tilt azimuth) | 45°, 135°, 225°, 315° |
| Third retardation film 12c (lagging axis s) | 0°-180° |
| Polarizing element 3a on back surface side (absorption axis a) | 90°-270° |

Embodiment 11

Figure 32:
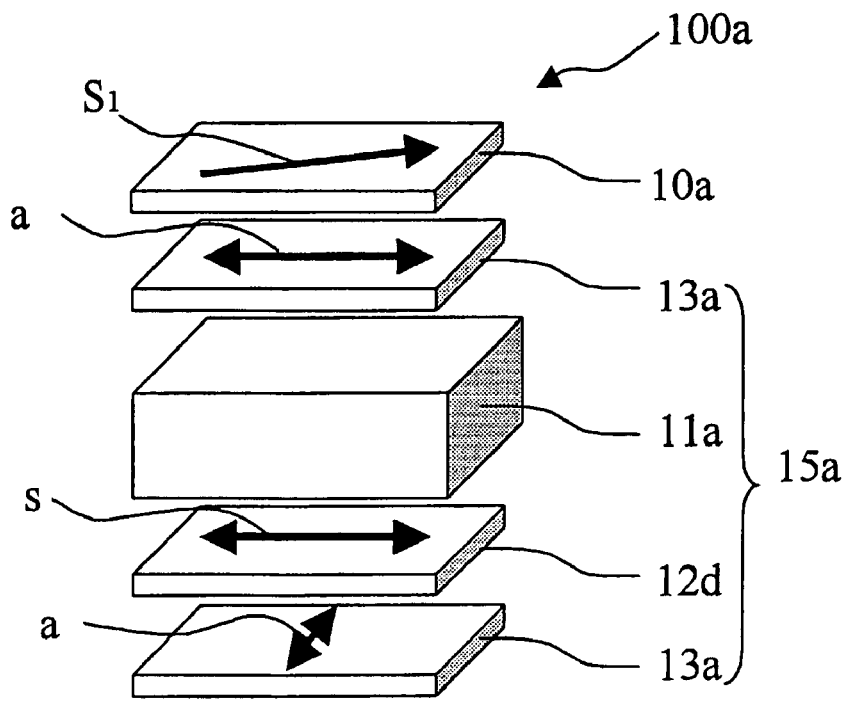
FIG. 32 is a perspective view schematically showing a configuration of a VA mode liquid crystal display according to Embodiment 11 of the present invention.

FIG. 32 is a perspective view schematically showing a configuration of a VA mode liquid crystal display 100*a* according to Embodiment 11 of the present invention. The attachment and relative positional relationship of axial directions between films is shown in FIG. 32 and Table 11.

The VA mode liquid crystal display according to this Embodiment has the same configuration as in the VA mode liquid crystal display according to Embodiment 3, as shown in FIG. 32, except that the first anisotropic scattering film 10*a* was attached to the viewing screen side of the VA mode liquid crystal display element 15*a* in such a way that the azimuth at an azimuth angle Φ of 45° of the liquid crystal display element 15*a* (the minimum azimuth) was almost the same as the axial azimuth $S_1$ of the scattering central axis of the first anisotropic scattering film 10*a*.

TABLE 11

| Component | Azimuth angle φ |
| --- | --- |
| First anisotropic scattering film 10a (axial azimuth S1 of scattering central axis) | 45° |
| First polarizing plate 13a on viewing screen side (absorption axis a) | 0°-180° |
| VA mode liquid crystal cell 11a (liquid crystal molecule tilt azimuth) | 45°, 135°, 225°, 315° |
| Fourth retardation film 12d (lagging axis s) | 0°-180° |
| First polarizing plate 13a on back surface side (absorption axis a) | 90°-270° |

Embodiment 12

Figure 33:
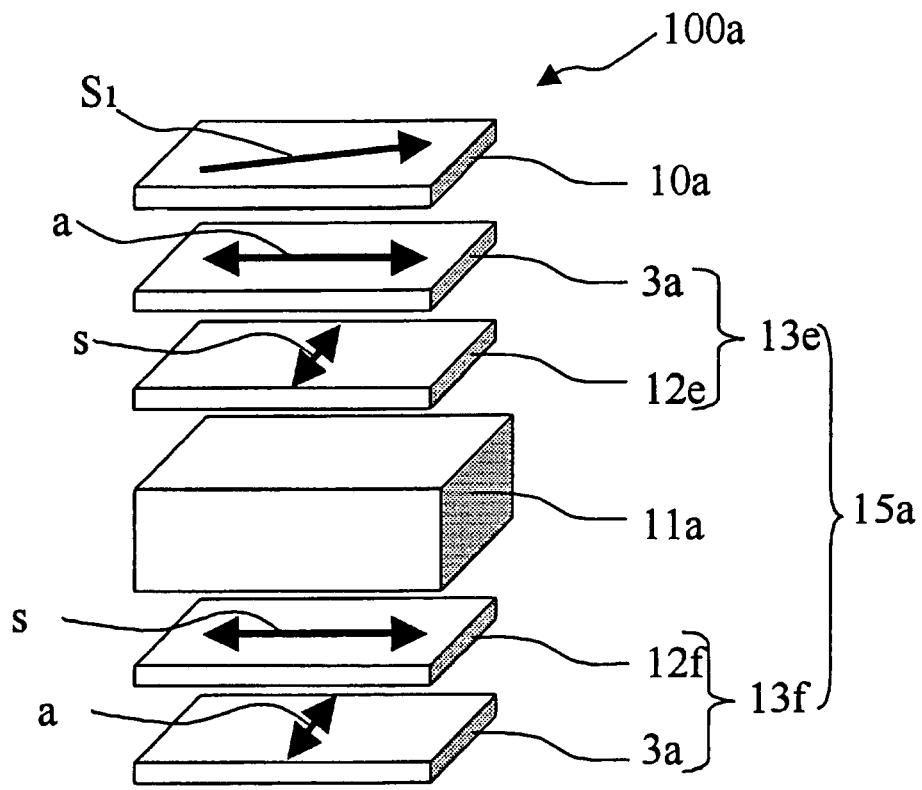
FIG. 33 is a perspective view schematically showing a configuration of a VA mode liquid crystal display according to Embodiment 12 of the present invention.

FIG. 33 is a perspective view schematically showing a configuration of a VA mode liquid crystal display 100*a* according to Embodiment 12 of the present invention. The attachment and relative positional relationship of axial directions between films is shown in FIG. 33 and Table 12.

The VA mode liquid crystal display according to this Embodiment has the same configuration as in the VA mode liquid crystal display according to Embodiment 4, as shown in FIG. 33, except that the first anisotropic scattering film 10*a* was attached to the viewing screen side of the VA mode liquid crystal display element 15*a* in such a way that the azimuth at an azimuth angle Φ of 45° of the liquid crystal display element 15*a* (the minimum azimuth) was almost the same as the axial azimuth $S_1$ of the scattering central axis of the first anisotropic scattering film 10*a*.

TABLE 12

| Component | Azimuth angle φ |
|---|---|
| First anisotropic scattering film 10a (axial azimuth S1 of scattering central axis) | 45° |
| Polarizing element 3a on viewing screen side (absorption axis a) | 0°-180° |
| Fifth retardation film 12e (lagging axis s) | 90°-270° |
| VA mode liquid crystal cell 11a (liquid crystal molecule tilt azimuth) | 45°, 135°, 225°, 315° |
| Sixth retardation film 12f (lagging axis s) | 0°-180° |
| Polarizing element 3a on back surface side (absorption axis a) | 90°-270° |

Embodiment 13

Figure 34:
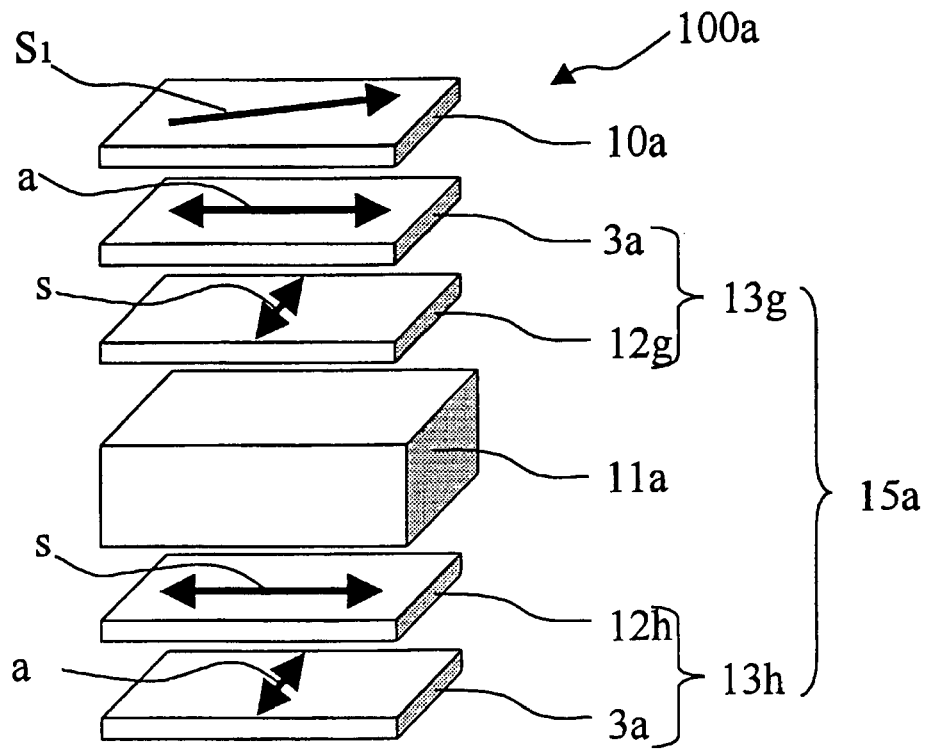
FIG. 34 is a perspective view schematically showing a configuration of a VA mode liquid crystal display according to Embodiment 13 of the present invention.

FIG. 34 is a perspective view schematically showing a configuration of a VA mode liquid crystal display 100a according to Embodiment 13 of the present invention. The attachment and relative positional relationship of axial directions between films is shown in FIG. 34 and Table 13.

The VA mode liquid crystal display according to this Embodiment has the same configuration as in the VA mode liquid crystal display according to Embodiment 5, as shown in FIG. 34, except that the first anisotropic scattering film 10a was attached to the viewing screen side of the VA mode liquid crystal display element 15a in such a way that the azimuth at an azimuth angle Φ of 45° of the liquid crystal display element 15a (the minimum azimuth) was almost the same as the axial azimuth $S_1$ of the scattering central axis of the first anisotropic scattering film 10a.

TABLE 13

| Component | Azimuth angle φ |
|---|---|
| First anisotropic scattering film 10a (axial azimuth S1 of scattering central axis) | 45° |
| Polarizing element 3a on viewing screen side (absorption axis a) | 0°-180° |
| Seventh retardation film 12g (lagging axis s) | 90°-270° |
| VA mode liquid crystal cell 11a (liquid crystal molecule tilt azimuth) | 45°, 135°, 225°, 315° |
| Eighth retardation film 12h (lagging axis s) | 0°-180° |
| Polarizing element 3a on back surface side (absorption axis a) | 90°-270° |

Embodiment 14

Figure 35:
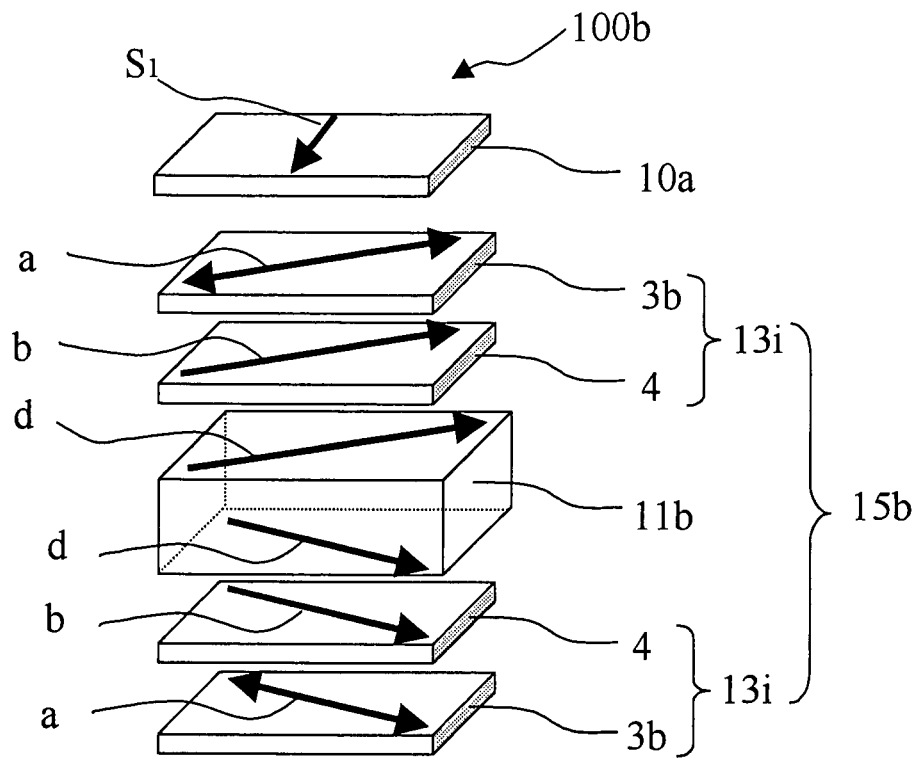
FIG. 35 is a perspective view schematically showing a configuration of a TN mode liquid crystal display in TN mode according to Embodiment 14 of the present invention.

FIG. 35 is a perspective view schematically showing a configuration of a TN mode liquid crystal display 100b according to Embodiment 14 of the present invention. The attachment and relative positional relationship of axial directions between films is shown in FIG. 35 and Table 14.

The TN mode liquid crystal display according to this Embodiment has the same configuration as in the TN mode liquid crystal display according to Embodiment 6, as shown in FIG. 35, except that the first anisotropic scattering film 10a was attached to the viewing screen side of the TN mode liquid crystal display element 15b in such a way that the azimuth at an azimuth angle Φ of 270° of the liquid crystal display element 15b (the minimum azimuth) was almost the same as the axial azimuth $S_1$ of the scattering central axis of the first anisotropic scattering film 10a.

TABLE 14

| Component | Azimuth angle φ |
|---|---|
| First anisotropic scattering film 10a (axial azimuth S1 of scattering central axis) | 270° |
| Polarizing element 3b on viewing screen side (absorption axis a) | 45°-225° |
| WV film 4 on viewing screen side (alignment control direction b of liquid crystal) | 45° |
| TN mode liquid crystal cell 11b (alignment control direction d of liquid crystal) | 45° (on viewing screen side) 315° (on back surface side) |
| WV film 4 on back surface side (alignment control direction b of liquid crystal) | 315° |
| Polarizing element 3b on back surface side (absorption axis a) | 135°-315° |

Embodiment 15

(Preparation of the Second Anisotropic Scattering Film)

Figure 2C:
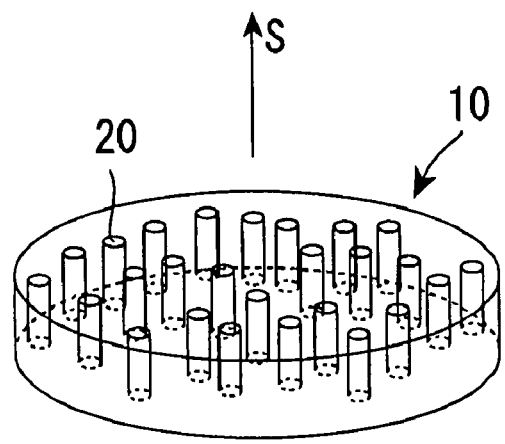
FIG. 2C is a perspective view schematically showing one example of a structure of an anisotropic scattering film (anisotropic scattering layer) constituting the display of the present invention.

The second anisotropic scattering film was prepared by the same preparation method as in the first anisotropic scattering film, except that the liquid film was irradiated with ultraviolet for 1 minute at an irradiation intensity of 30 mW/cm² from the vertical direction using an epi-irradiation unit of UV spot light source (trade name: L2859-01, product of Hamamatsu Photonics K.K). As a result, the second anisotropic scattering film was obtained. In addition, when the cross-sectional surface of the second anisotropic scattering film was observed with a microscope, the rod-shaped regions 20 extending in the normal direction of the film surface were recognized as shown in FIG. 2C.

(Measurement of Scattering Property of the Second Anisotropic Scattering Film)

FIG. 5 is a diagram showing relationships between the incidence angle and the linear transmitting light quantity in the cases where the second anisotropic scattering film was rotated about the two rotation axes (long side axis and short side axis) perpendicular to each another. The solid line in FIG. 5 shows the case where the second anisotropic scattering film was rotated about the short side axis. The broken line shows the case where the second anisotropic scattering film was rotated about the long side axis. It is shown by the plus and minus of the incidence angle that the anisotropic scattering film was rotated in directions opposite to each other.

The second anisotropic scattering film was measured for scattering property in the same manner as in the first anisotropic scattering film. FIG. 5 shows that in both of the rotation about the short side axis and the rotation about the long side axis, the second anisotropic scattering film shows substantially symmetric anisotropic scattering property shown in a deep valley shape including a small mountain-shaped part at an incidence angle of 0°. It is also shown that in the second anisotropic scattering film, the anisotropic scattering properties shown in the rotation about the short side axis and those shown in the rotation about the long side axis are substantially same. Thereby, it is found that the second anisotropic scattering film has a scattering central axis in the normal direction of the film surface. The changing ratio of the linear light transmitting quantity was 0.90 in both of the rotation about the short side axis and that about the long side axis.

(Preparation of TN Mode Liquid Crystal Display 200b)

Figure 36:
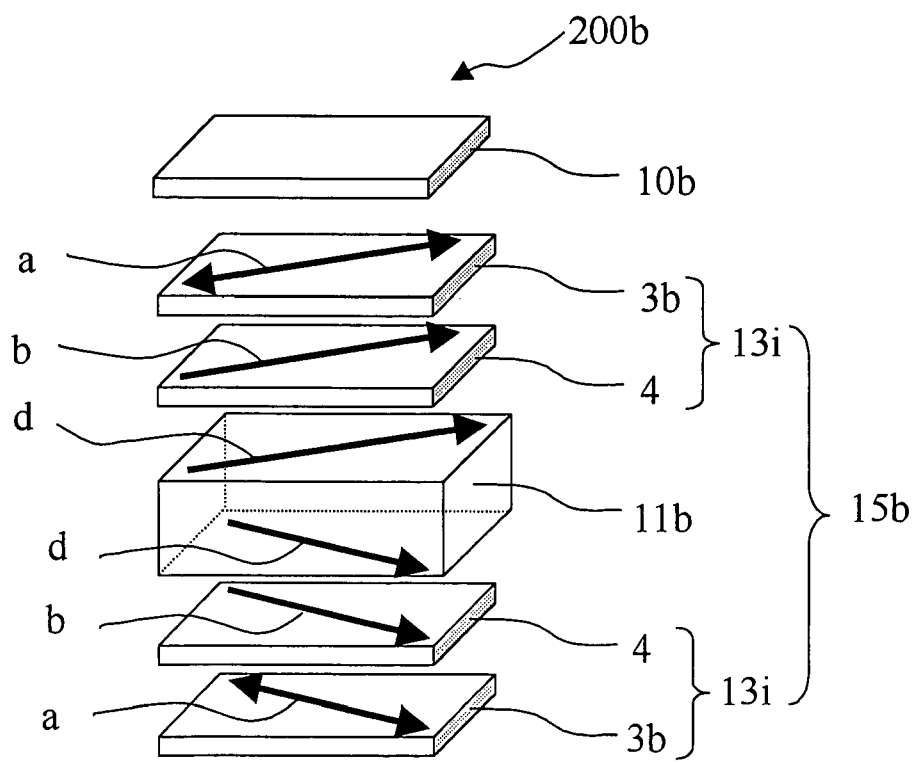
FIG. 36 is a perspective view schematically showing a configuration of an IPS liquid crystal display according to Embodiment 15 of the present invention.

FIG. 36 is a perspective view schematically showing a configuration of a TN mode liquid crystal display 200b according to Embodiment 15 of the present invention. The attachment and relative positional relationship of axial directions between films is shown in FIG. 36 and Table 15.

The TN mode liquid crystal display 200b according to this Embodiment has the same configuration as in the display according to Embodiment 14, except that instead of the first anisotropic scattering film 10a, the second anisotropic scattering film 10b was attached to the viewing screen side of the TN mode liquid crystal display element 15b. The second anisotropic scattering film 10b has a scattering central axis in the normal direction of the film surface, and therefore is considered to have an axial azimuth $S_1$ of the scattering central axis in all the azimuths.

TABLE 15

| Component | Azimuth angle φ |
| --- | --- |
| Second anisotropic scattering film 10b (axial azimuth S1 of scattering central axis) | All |
| Polarizing element 3b on viewing screen side (absorption axis a) | 45°-225° |
| WV film 4 on viewing screen side (alignment control direction b of liquid crystal) | 45° |
| TN mode liquid crystal cell 11b (alignment control direction d of liquid crystal) | 45° (on viewing screen side) 315° (on back surface side) |
| WV film 4 on back surface side (alignment control direction b of liquid crystal) | 315° |
| Polarizing element 3b on back surface side (absorption axis a) | 135°-315° |

Embodiment 16

Figure 37:
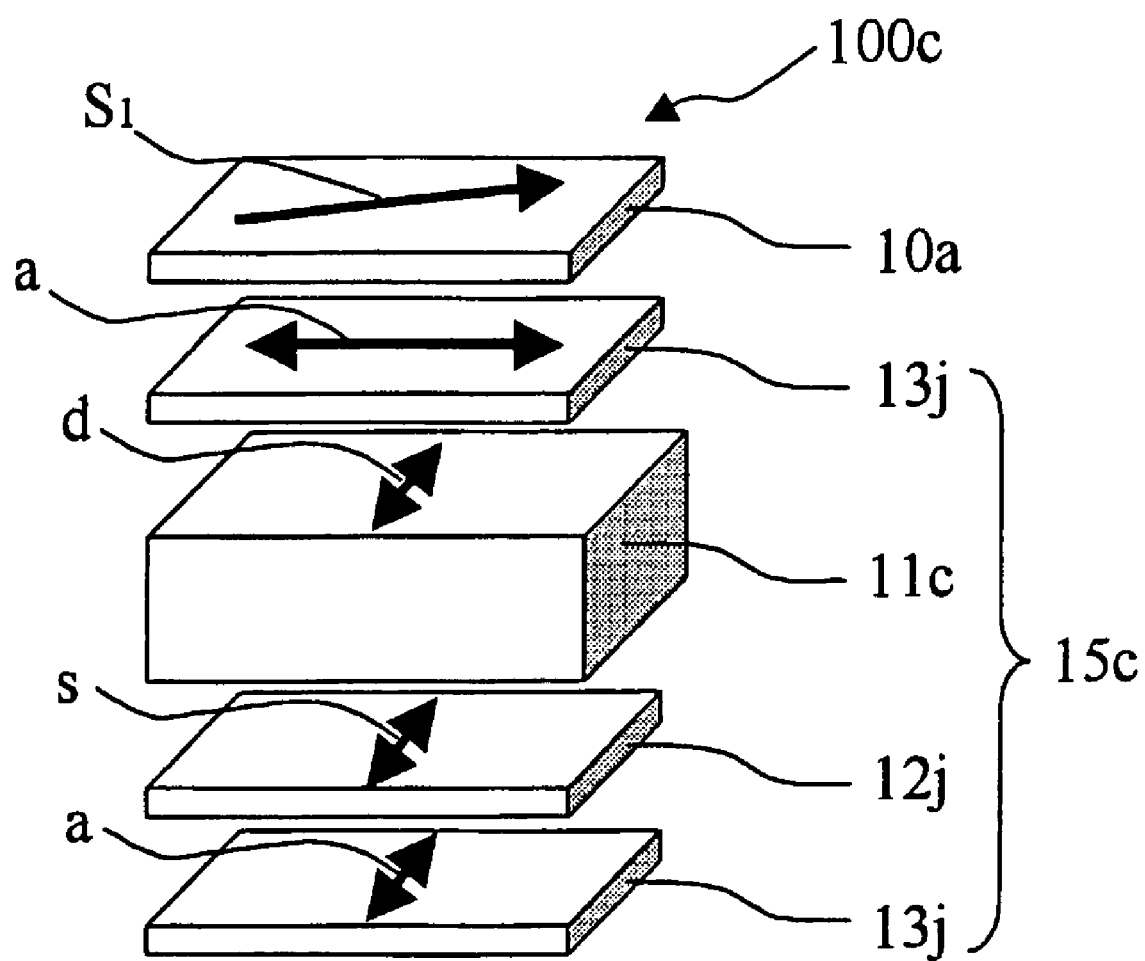
FIG. 37 is a perspective view schematically showing a configuration of an IPS liquid crystal display according to Embodiment 16 of the present invention.
Figure 38A:
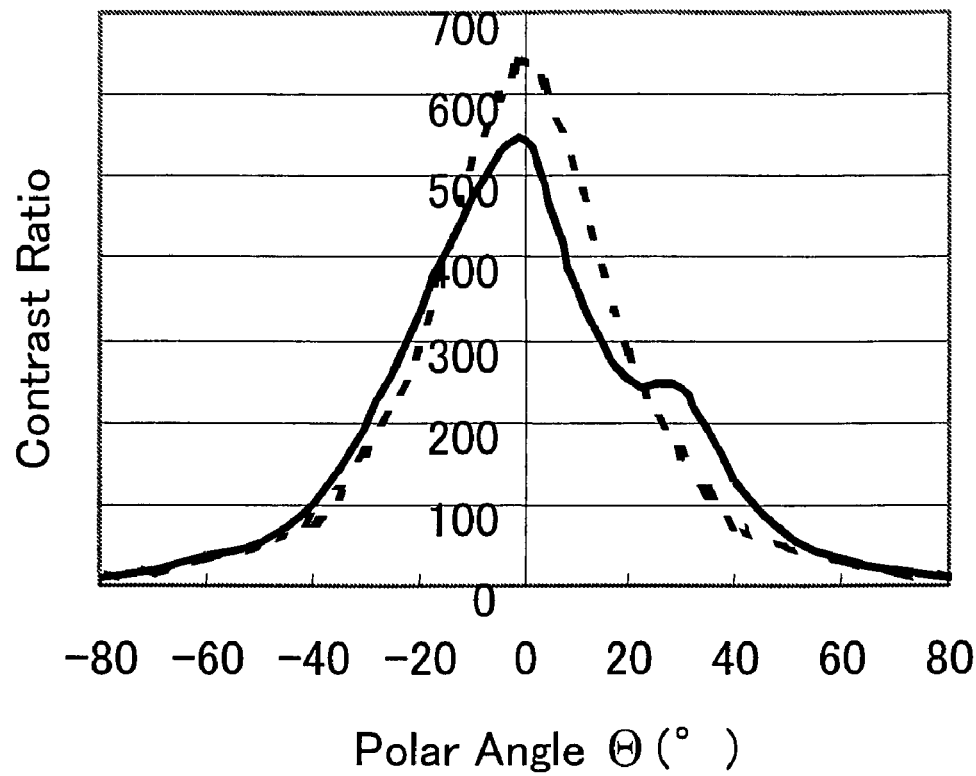
FIG. 38A is a diagram showing polar angle dependencies of contrast ratios in two azimuths at azimuth angles of 45° and 225° of the VA mode liquid crystal display element (broken line) and the VA mode liquid crystal display (solid line) according to Embodiment 9 of the present invention.
Figure 38B:
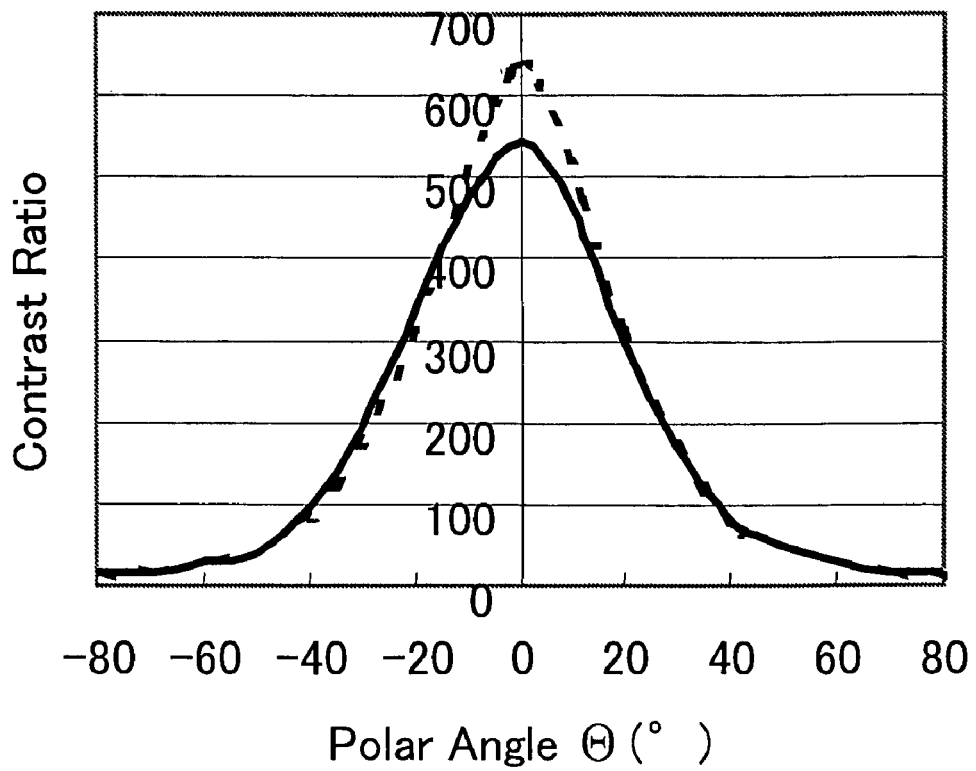
FIG. 38B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Embodiment 9 of the present invention.
Figure 39A:
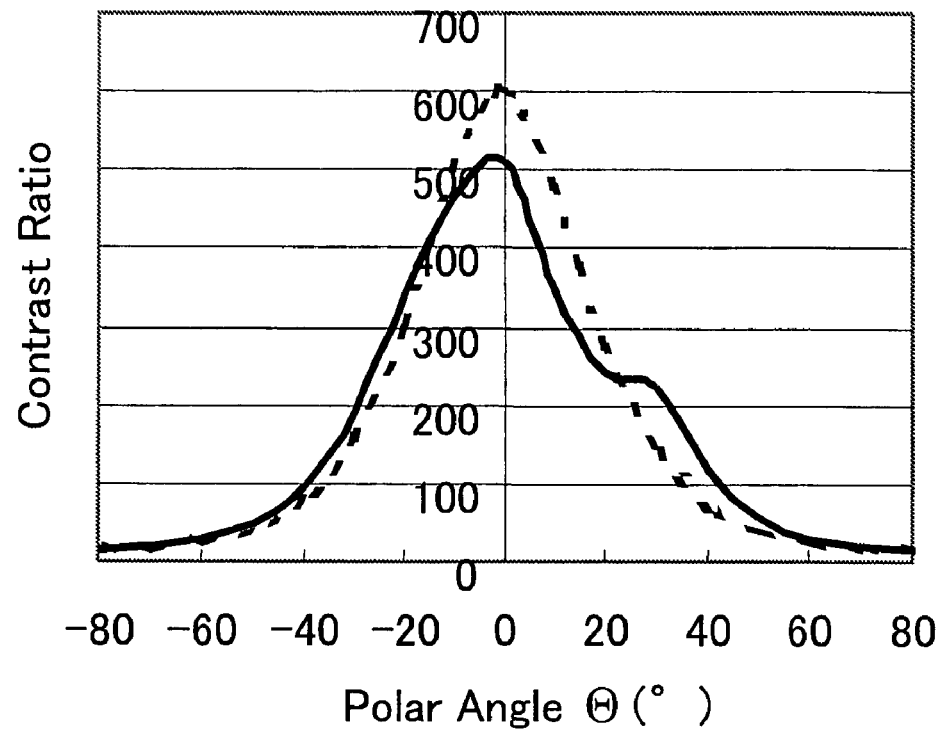
FIG. 39A is a diagram showing polar angle dependencies of contrast ratios in two azimuths at azimuth angles $\Phi$ of 45° and 225° of the VA mode liquid crystal display element (broken line) and the VA mode liquid crystal display (solid line) according to Embodiment 10 of the present invention.
Figure 39B:
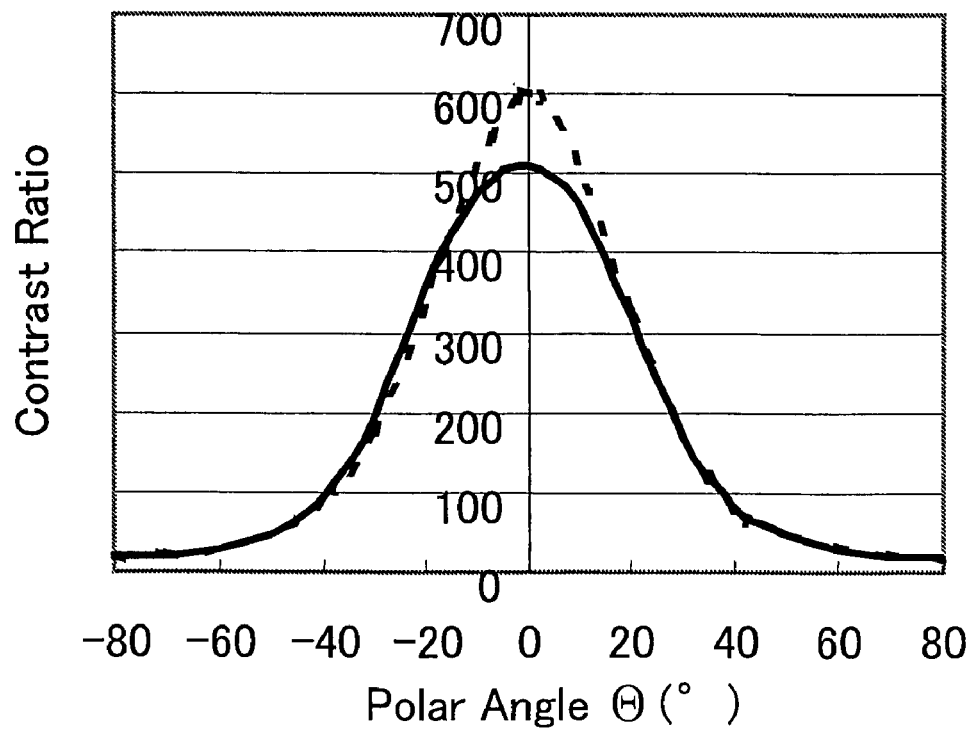
FIG. 39B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Embodiment 10 of the present invention.
Figure 40A:
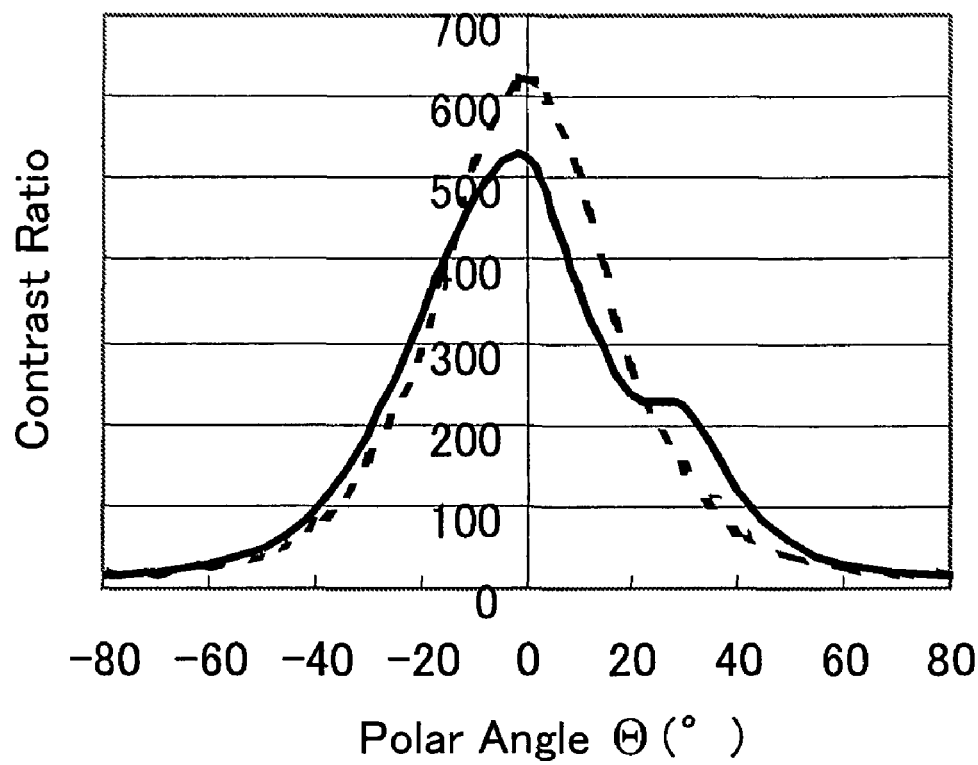
FIG. 40A is a diagram showing polar angle dependencies of contrast ratios in two azimuths at azimuth angles $\Phi$ of 45° and 225° of the VA mode liquid crystal display element (broken line) and the VA mode liquid crystal display (solid line) according to Embodiment 11 of the present invention.
Figure 40B:
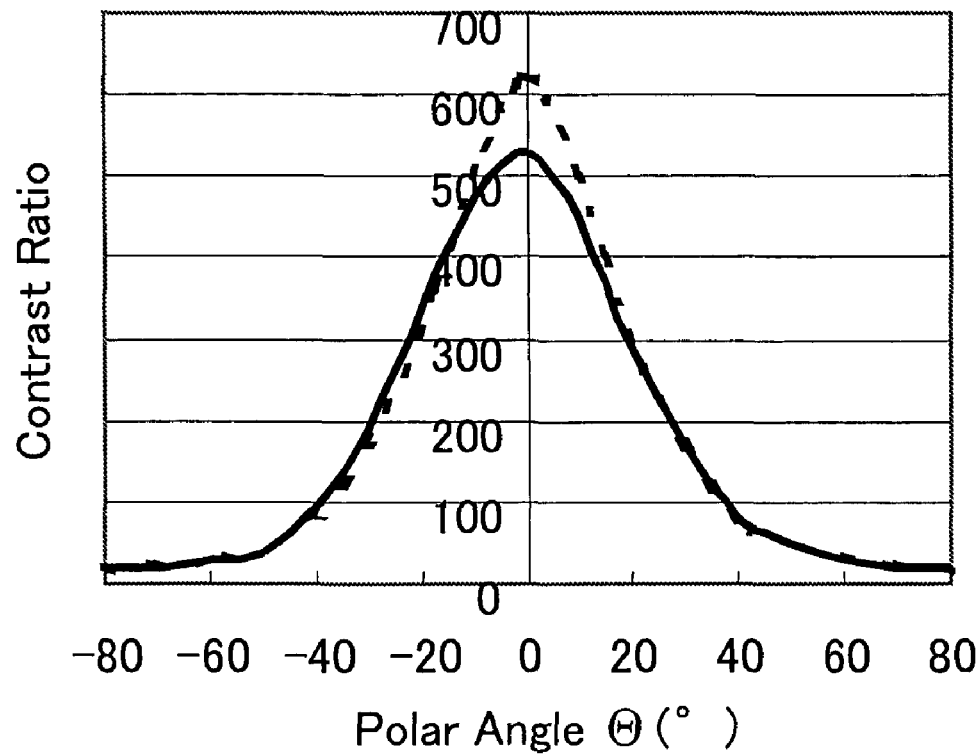
FIG. 40B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Embodiment 11 of the present invention.
Figure 41A:
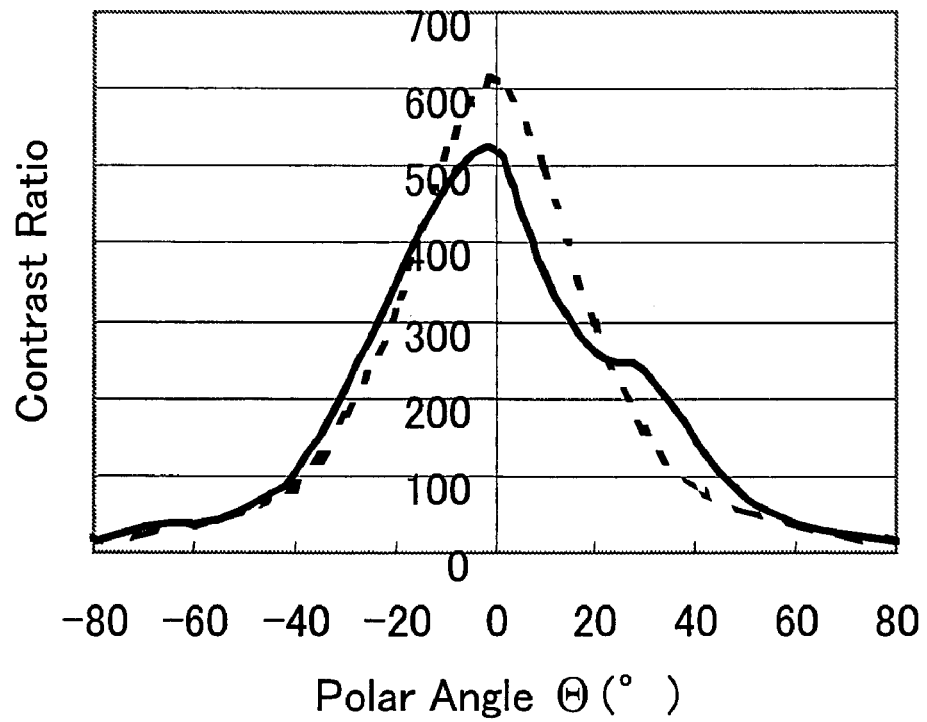
FIG. 41A is a diagram showing polar angle dependencies of contrast ratios in two azimuths at azimuth angles $\Phi$ of 45° and 225° of the VA mode liquid crystal display element (broken line) and the VA mode liquid crystal display (solid line) according to Embodiment 12 of the present invention.
Figure 41B:
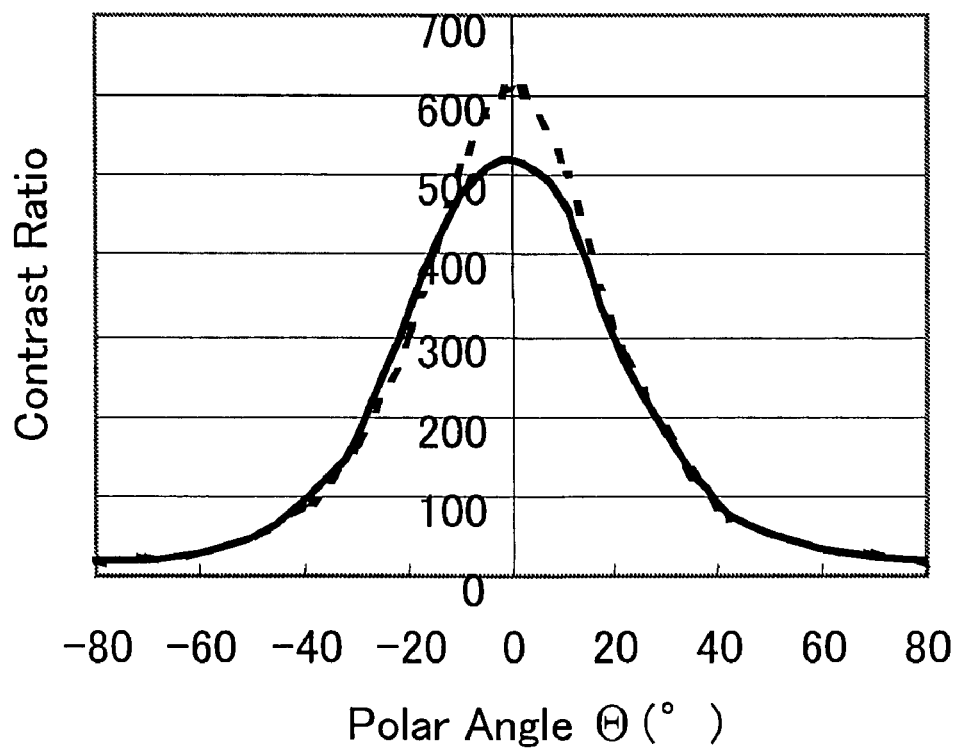
FIG. 41B is a diagram showing polar angle dependency of contrast ratio in two azimuths of the azimuth angle $\Phi$ of 135° and 315° of the VA mode liquid crystal display element (broken line) and the VA mode liquid crystal display (solid line) according to Embodiment 12 of the present invention.
Figure 42A:
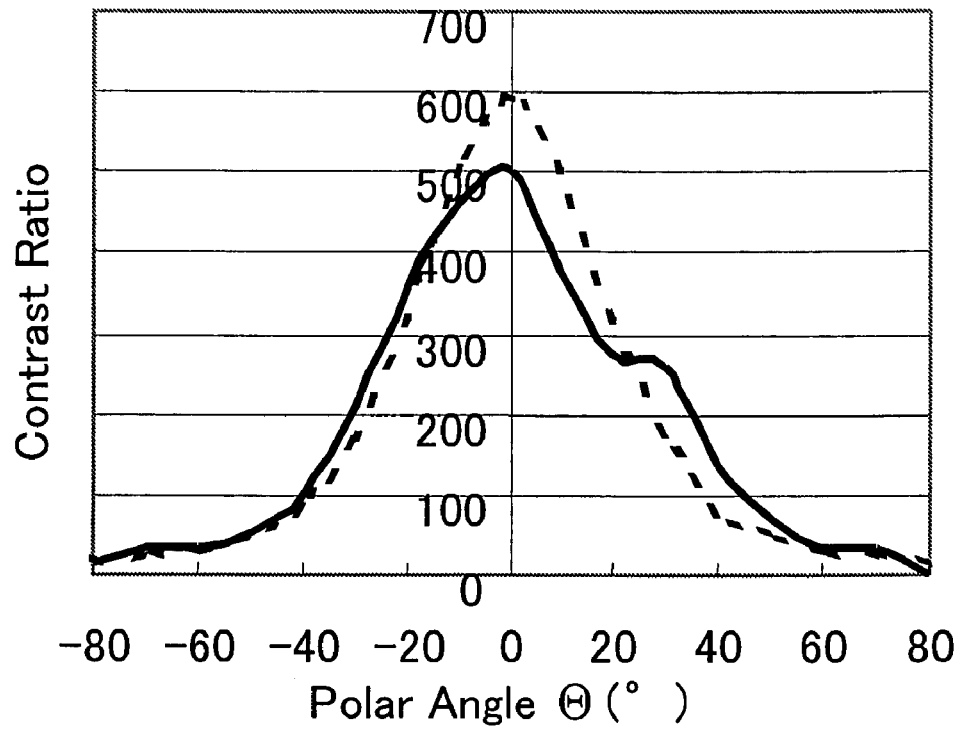
FIG. 42A is a diagram showing polar angle dependencies of contrast ratios in two azimuths at azimuth angles $\Phi$ of 45° and 225° of the VA mode liquid crystal display element (broken line) and the VA mode liquid crystal display (solid line) according to Embodiment 13 of the present invention.
Figure 42B:
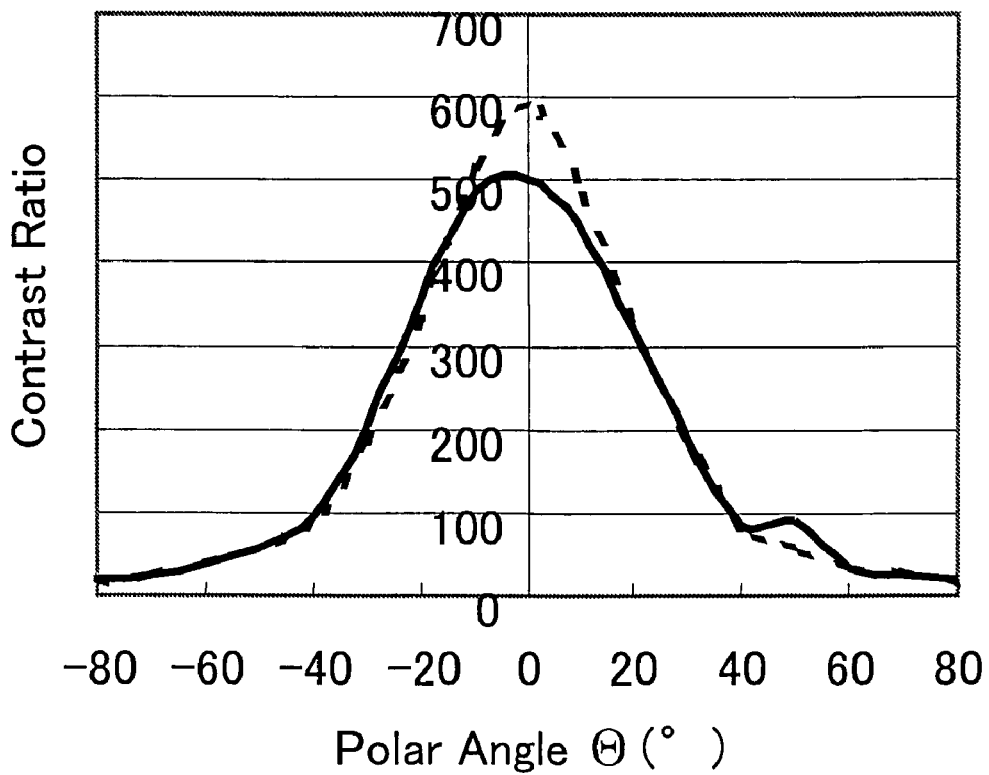
FIG. 42B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Embodiment 13 of the present invention.

FIG. 37 is a perspective view schematically showing a configuration of an IPS mode liquid crystal display 100c according to Embodiment 16 of the present invention. The attachment and relative positional relationship of axial directions between films is shown in FIG. 37 and Table 16.

The IPS mode liquid crystal display according to this Embodiment has the same configuration as in the IPS mode liquid crystal display according to Embodiment 7, as shown in FIG. 37, except that the first anisotropic scattering film 10a was attached to the viewing screen side of the liquid crystal display element 15c in such a way that the azimuth at an azimuth angle Φ of 45° of the IPS mode liquid crystal display element 15c was almost the same as the axial azimuth S1 of the scattering central axis of the first anisotropic scattering film 10a.

TABLE 16

| Component | Azimuth angle φ |
| --- | --- |
| First anisotropic scattering film 10a (axial azimuth S1 of scattering central axis) | 45° |
| Ninth polarizing plate 13j on viewing screen side (absorption axis a) | 0°-180° |
| IPS mode liquid crystal cell 11c (alignment control direction d of liquid crystal) | 90°-270° |
| Ninth retardation film 12j (lagging axis s) | 90°-270° |
| Ninth polarizing plate 13j on back surface side (absorption axis a) | 90°-270° |

Embodiment 17

The OCB mode liquid crystal display according to this Embodiment has the same configuration as in the OCB mode liquid crystal display according to Embodiment 8, except that the first anisotropic scattering film was attached to the viewing screen side of the OCB mode in such a way that the azimuth at an azimuth angle Φ of 0° of the OCB mode liquid crystal display element (the minimum azimuth) was almost the same as the axial azimuth $S_1$ of the first anisotropic scattering film.

Comparative Embodiment 3

The VA mode liquid crystal display according to this Comparative Embodiment has the same configuration as in the VA mode liquid crystal display in Comparative Example 2, except that the visible range control film (product name: LUMISTY®, product number: MFY-1060, produced by Sumitomo Chemical Co., Ltd.) was attached to the viewing screen side of the VA mode liquid crystal display element 15a in such a way that the azimuth at an azimuth angle Φ of 45° of the VA mode liquid crystal display element 15a (the minimum azimuth) was almost the same as the scattering direction of the LUMISTY®.

4. Measurement of Optical Characteristics of Liquid Crystal Displays in Embodiments 9 to 17 and Comparative Embodiments 1 and 3

The liquid crystal displays in Embodiments 9 to 17 and Comparative Embodiments 1 and 3 were measured for viewing angle dependency of luminance and chromaticity at the time of black display (grading value: 0), intermediate scale display (grading value: 128) and white display (grading value: 255) in 256 gray scale display using a viewing angle measuring device (Product name: EZContrast160R, manufactured by ELDIM company). The viewing angle is represented by a polar angle Θ and an azimuth angle Φ.

"Evaluation of Improvement in Viewing Angle Dependency of Contrast Ratio"

Each liquid crystal display was evaluated for polar angle dependency of the contrast ratio in the azimuth (the minimum azimuth) in which the contrast ratio of the liquid crystal display element shows a minimum value in the direction having a polar angle Θ of 45°. That is, the VA mode and IPS mode liquid crystal displays were evaluated for polar angle dependency of the contrast ratio in four azimuths at azimuth angles Φ of 45°, 135°, 225°, and 315°. The TN mode and OCB mode liquid crystal displays were evaluated for polar angle dependency of the contrast ratio in four azimuths at azimuth angles Φ of 0°, 90°, 180°, and 270°. The contrast ratio was measured based on the above formula (3) using the luminance measured at black display (grading value: 0) and at white display (grading value: 255).

FIGS. 38A to 48A and 38B to 48B each show the polar angle dependencies of the contrast ratios in the minimum azimuths of the liquid crystal display element and the liquid crystal display according to Embodiments 9 to 17 and Comparative Examples 1 and 3. The solid line in each figure shows the polar angle dependency of the contrast ratio of the liquid crystal display. The broken line in each figure shows the polar angle dependency of the contrast ratio of the liquid crystal display element.

FIGS. 38A to 48A each show the polar angle dependencies of the contrast ratios in the minimum azimuths almost parallel to the axial azimuth of the scattering central axis of the first anisotropic scattering film 10a or the second anisotropic scattering film 10b. FIGS. 38B to 48B each show the polar angle dependencies of the contrast ratios in the azimuths perpendicular to the minimum azimuths.

In the VA mode liquid crystal displays according to Embodiments 9 to 13 in the present invention, FIGS. 38A to 42A clearly show that in almost the same minimum azimuth as the axial azimuth of the scattering central axis (in the azimuth at an azimuth angle Φ=45°), the contrast ratio was improved near the axial direction of the scattering central axis (in the direction having a polar angle Θ of 30°). Therefore, the effect of improving the viewing angle dependency of the contrast ratio was obtained. FIGS. 38A to 42A and 38B to 42B clearly show that no influence such as reduction in contrast ratio was observed in the azimuth opposite to the minimum azimuth (in the azimuth at an azimuth angle Φ=225°) and two azimuths perpendicular to the minimum azimuth (in the azimuths at azimuth angles Φ of 135° and 270°).

Figure 47A:
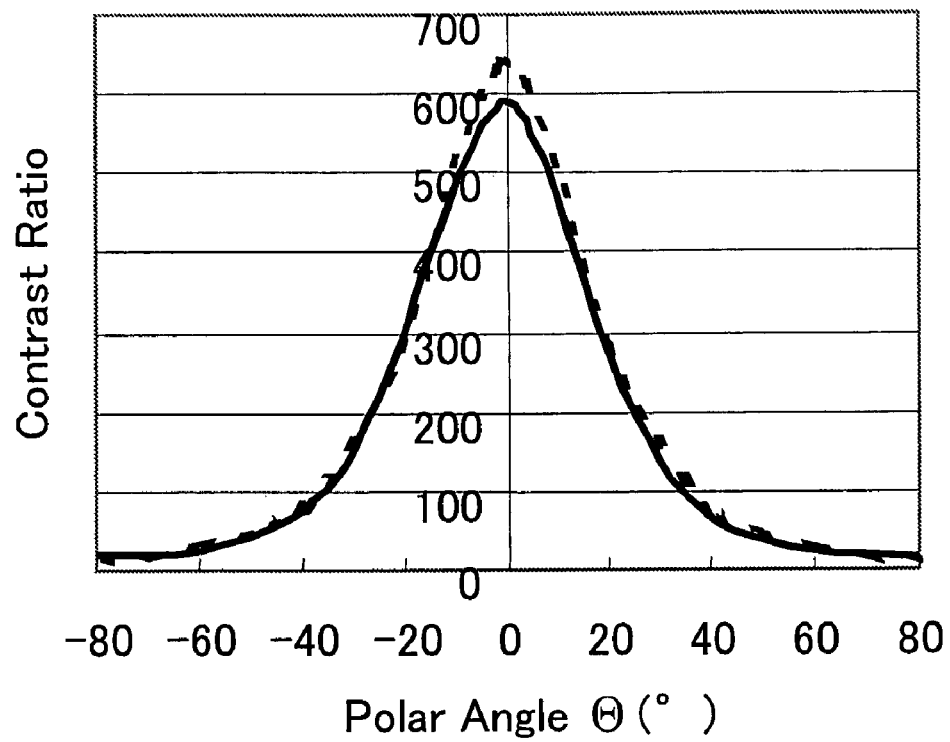
FIG. 47A is a diagram showing polar angle dependencies of contrast ratios in two azimuths at azimuth angles $\Phi$ of 45° and 225° of the VA mode liquid crystal display element (broken line) and the VA mode liquid crystal display (solid line) according to Comparative Embodiment 1.
Figure 47B:
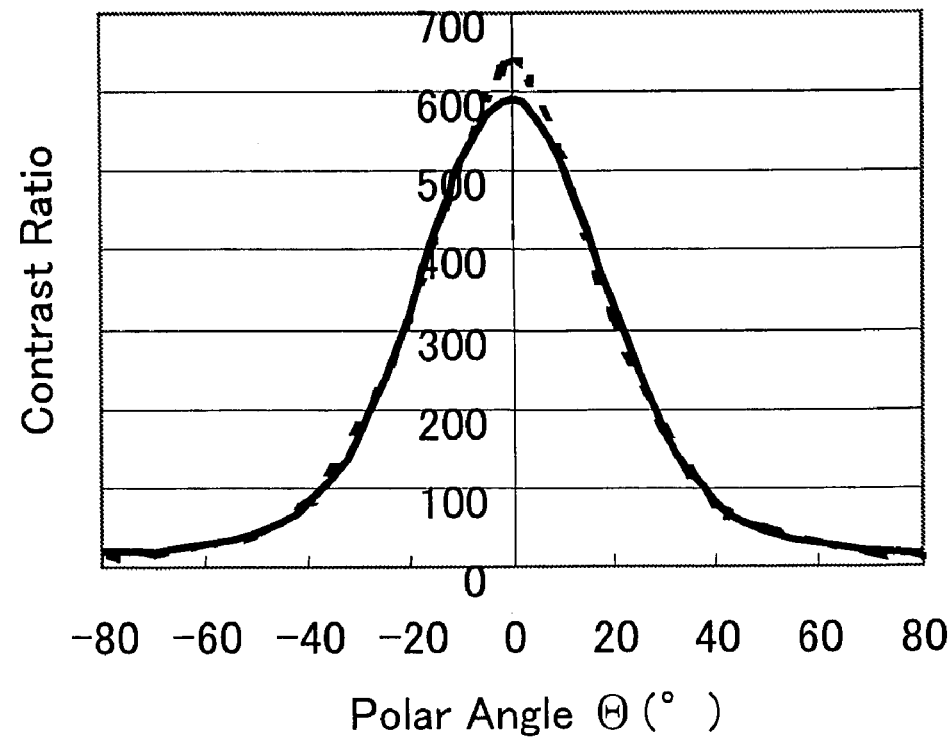
FIG. 47B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Comparative Embodiment 1.
Figure 48A:
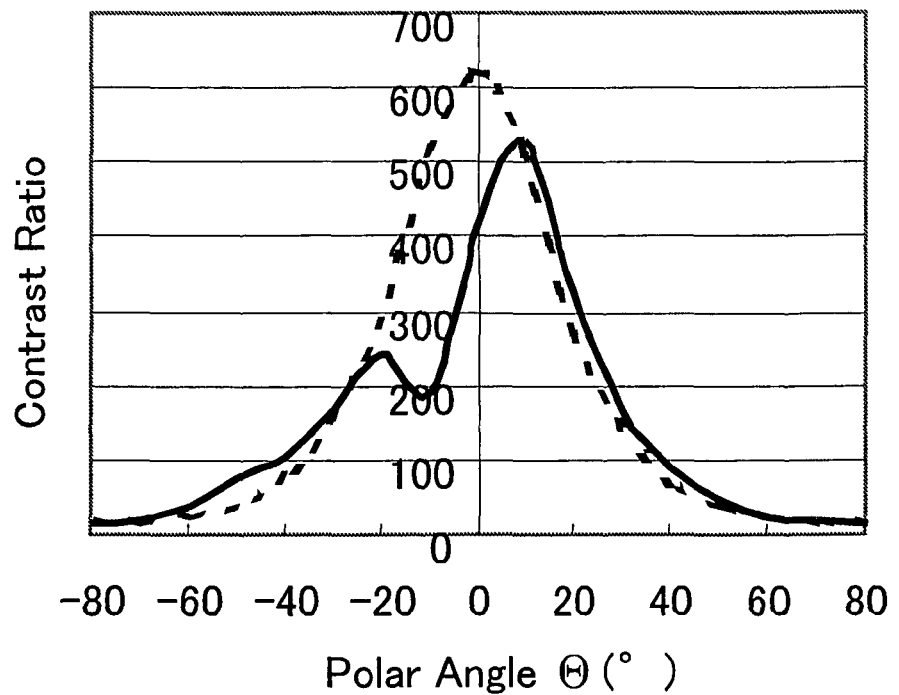
FIG. 48A is a diagram showing polar angle dependencies of contrast ratios in two azimuths of the azimuth angles $\Phi$ of 45° and 225° of the VA mode liquid crystal display element (broken line) and the VA mode liquid crystal display (solid line) according to Comparative Embodiment 3.
Figure 48B:
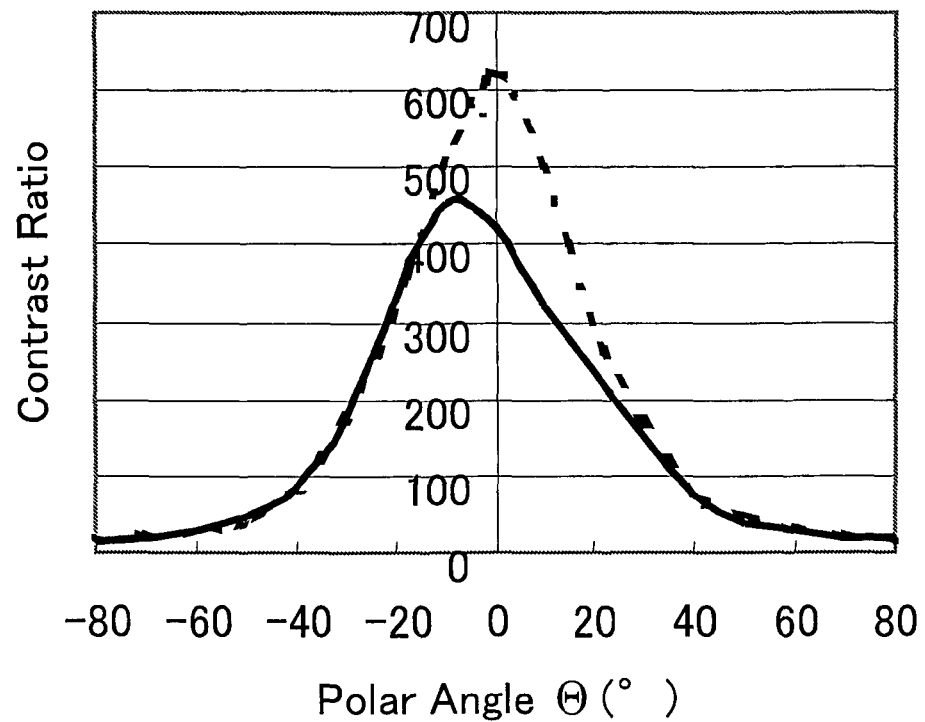
FIG. 48B is a diagram showing polar angle dependencies of contrast ratios in two azimuths at azimuth angles $\Phi$ of 135° and 315° of the VA mode liquid crystal display element (broken line) and the VA mode liquid crystal display (solid line) according to Comparative Embodiment 3.

However, in the VA mode liquid crystal display according to Comparative Embodiment 1, the contrast ratio was not improved in any azimuths, as shown in FIGS. 47A and 47B. In the VA mode liquid crystal display according to Comparative Embodiment 3, FIG. 48A shows that the viewing angle was improved in almost the same minimum azimuth as the scattering direction (in the azimuth at an azimuth angle Φ of 45°), but FIG. 48B shows that the contrast ratio was dramatically lowered in a wide range in two azimuths almost perpendicular to the scattering direction (in the azimuths at azimuth angles Φ of 135° and 270°). and the largest contrast ratio obtained in the front direction (in the direction having a polar angle Θ of 0°) was also lowered dramatically.

Figure 43A:
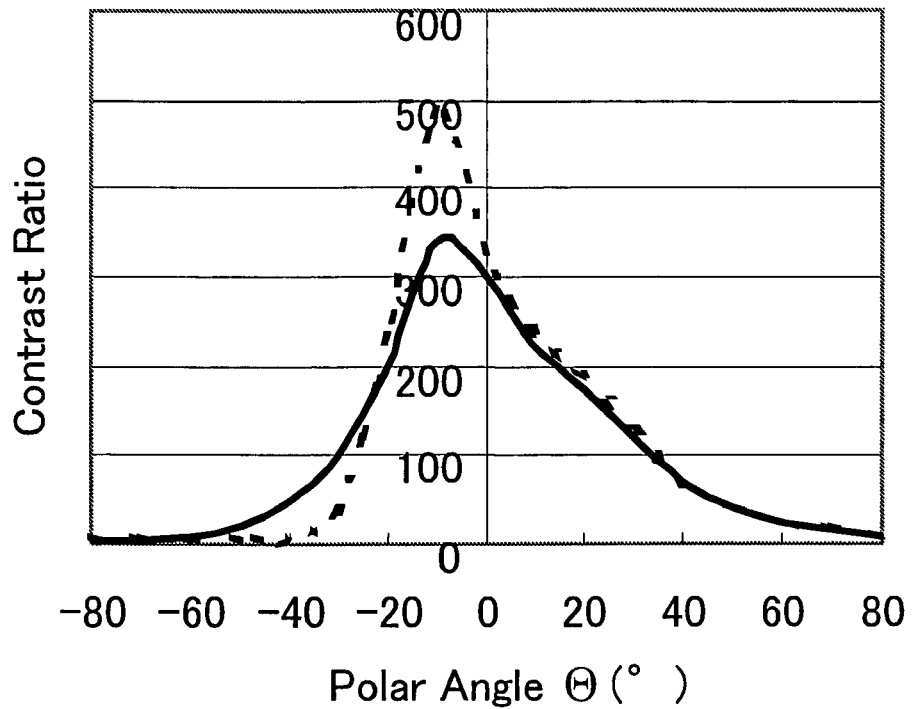
FIG. 43A is a diagram showing polar angle dependencies of contrast ratios in two azimuths at azimuth angles $\Phi$ of 90° and 270° of the TN mode liquid crystal display element (broken line) and the TN mode liquid crystal display (solid line) according to Embodiment 14 of the present invention.
Figure 43B:
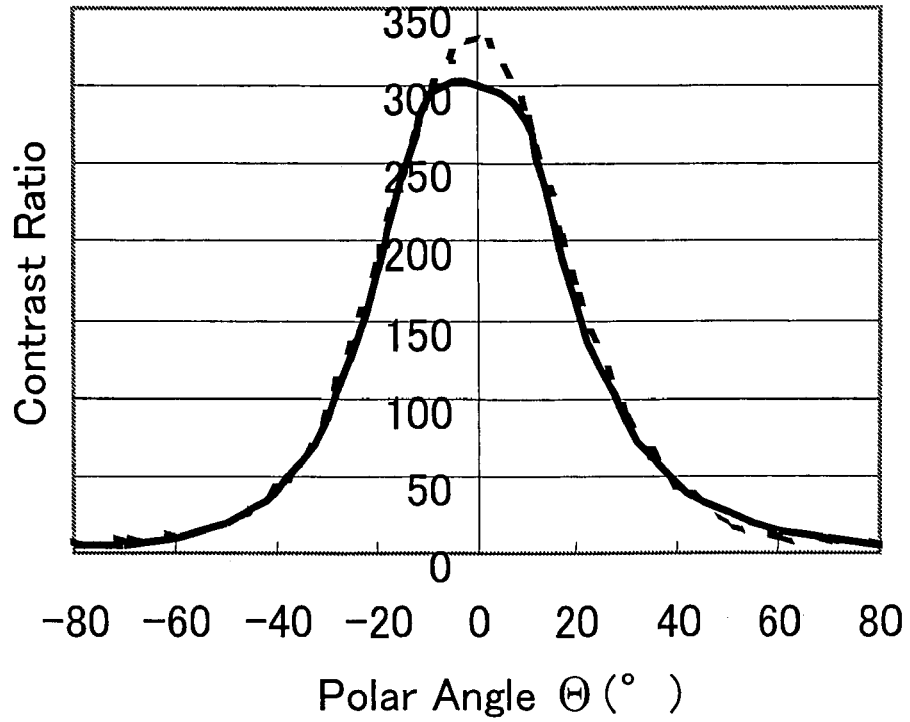
FIG. 43B is a diagram showing polar angle dependencies of contrast ratios in two azimuths at azimuth angles $\Phi$ of 0° and 180° of the TN mode liquid crystal display element (broken line) and the TN mode liquid crystal display (solid line) according to Embodiment 14 of the present invention.

In the TN mode liquid crystal display according to Embodiment 14 of the present invention, FIG. 43A clearly shows that in almost the same minimum azimuth as the axial azimuth of the scattering central axis (in the azimuth at an azimuth angle Φ of 270°), the contrast ratio was improved near the axial direction of the scattering central axis (in the direction having a polar angle Θ of 30°). Therefore, the effect of improving the viewing angle dependency of the contrast ratio was obtained. FIGS. 43A and 43B clearly show that no influence such as reduction in contrast ratio was observed in the azimuth opposite to the minimum azimuth (in the azimuth at an azimuth angle Φ of 90°) and two azimuths perpendicular to the minimum azimuth (in the azimuths at azimuths Φ of 0° and 180°).

Figure 44A:
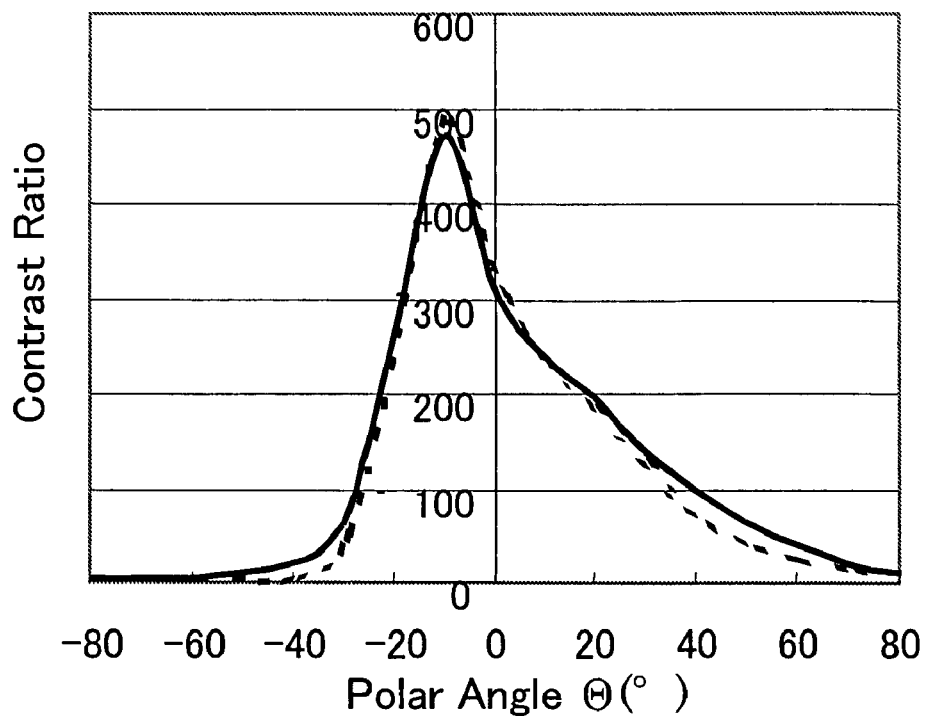
FIG. 44A is a diagram showing polar angle dependencies of contrast ratios in two azimuths at azimuth angles $\Phi$ of 90° and 270° of the TN mode liquid crystal display element (broken line) and the TN mode liquid crystal display (solid line) according to Embodiment 15 of the present invention.
Figure 44B:
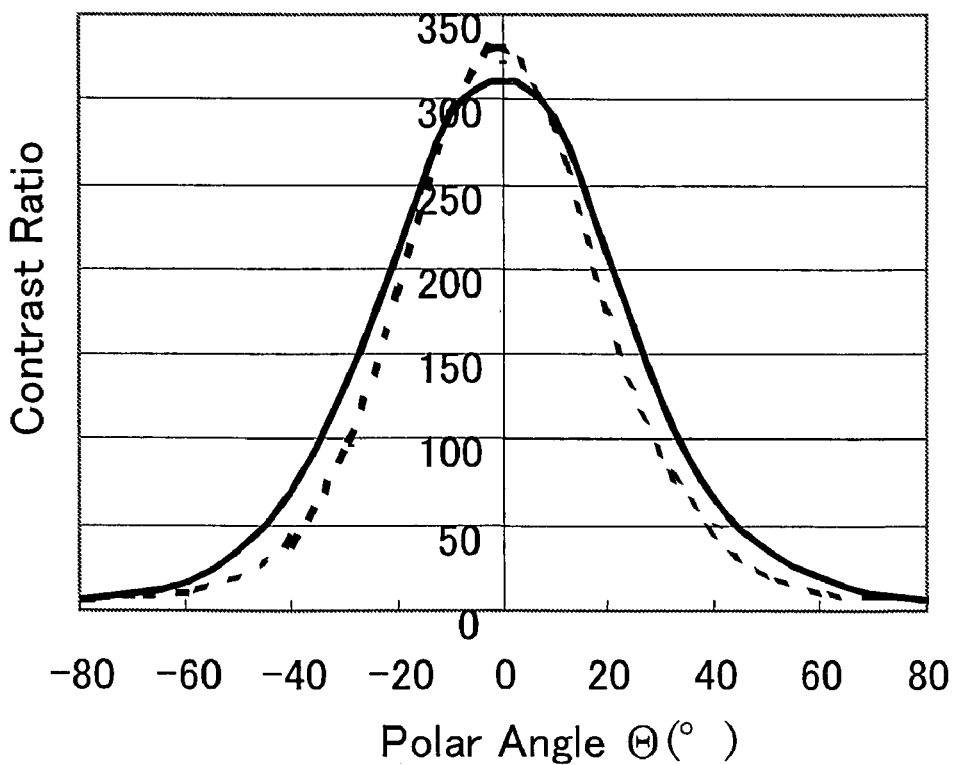
FIG. 44B is a diagram showing polar angle dependencies of contrast ratios in two azimuths at azimuth angles $\Phi$ of 0° and 180° of the TN mode liquid crystal display element (broken line) and the TN mode liquid crystal display (solid line) according to Embodiment 15 of the present invention.

Further, in the TN mode liquid crystal display according to Embodiment 15 of the present invention, FIGS. 44A and 44B clearly show that the viewing angle dependencies of the contrast ratios in four minimum azimuths (in the azimuths at azimuth angles Φ of 0°, 90°, 180°, and 270°) were improved without hardly reducing the largest contrast ratio obtained in the direction inclined by only 10° from the normal direction of the viewing screen to the azimuth at an azimuth angle Φ of 180°.

Figure 45A:
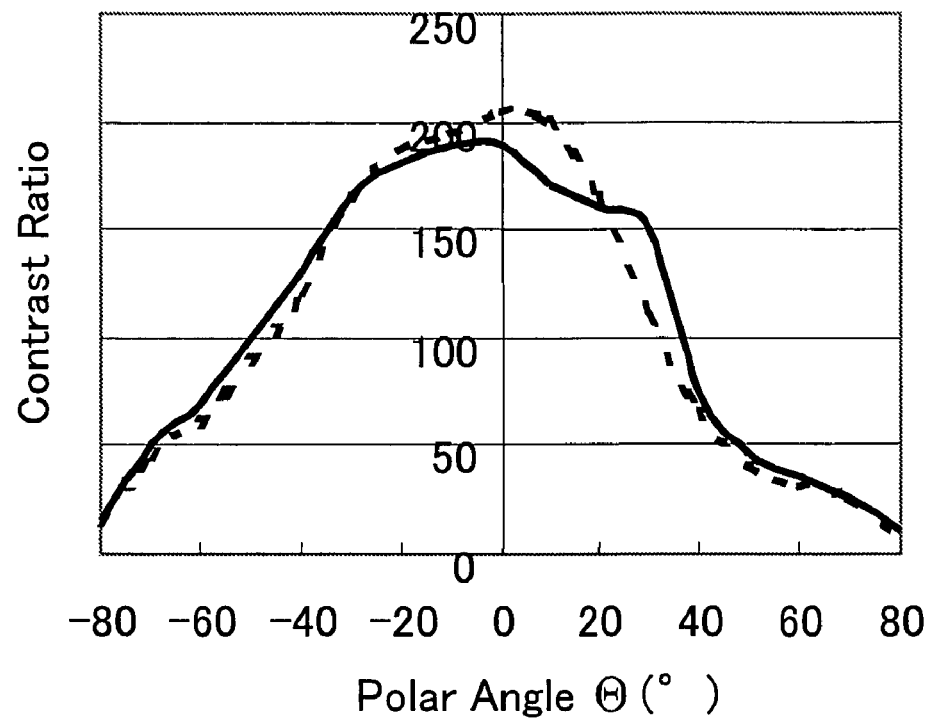
FIG. 45A is a diagram showing polar angle dependencies of contrast ratios in two azimuths at azimuth angles $\Phi$ of 45° and 225° of the IPS mode liquid crystal display element (broken line) and the IPS mode liquid crystal display (solid line) according to Embodiment 16 of the present invention.
Figure 45B:
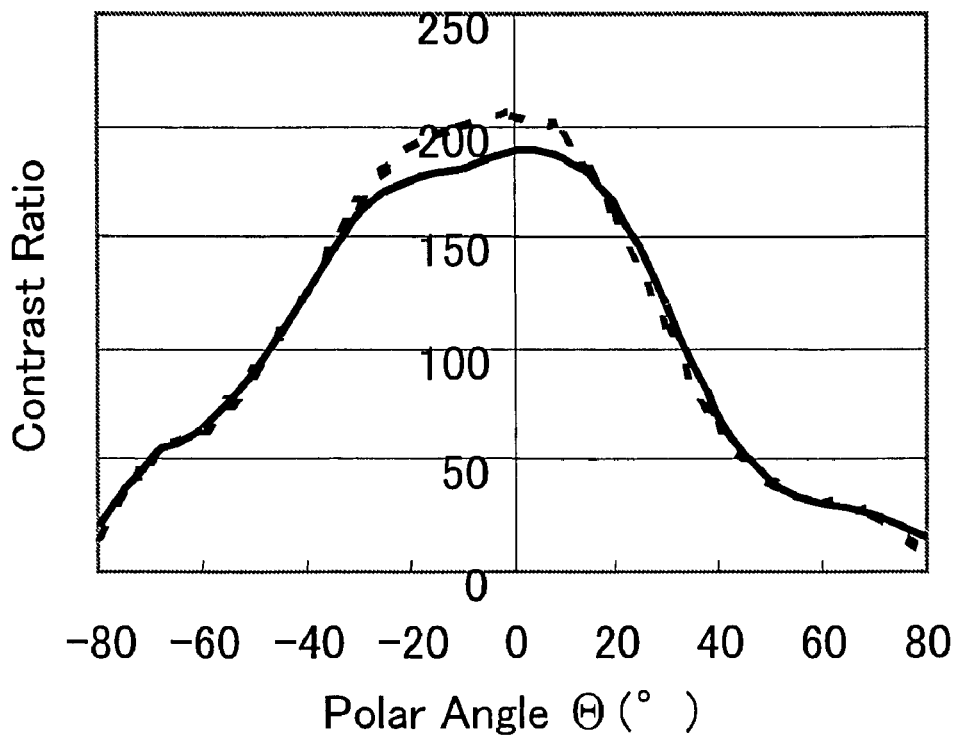
FIG. 45B is a diagram showing polar angle dependencies of contrast ratios in two azimuths at azimuth angles $\Phi$ of 135° and 315° of the IPS mode liquid crystal display element (broken line) and the IPS mode liquid crystal display (solid line) according to Embodiment 16 of the present invention.

In the IPS mode liquid crystal display according to Embodiment 16 of the present invention, FIG. 45A clearly shows that in almost the same minimum azimuth as the axial azimuth of the scattering central axis (in the azimuth at an azimuth angle Φ of 45°), the contrast ratio was improved near the axial direction of the scattering central axis (in the direction having a polar angle Θ of 30°). Therefore, the effect of improving the viewing angle dependency of the contrast ratio was obtained. FIGS. 45A and 45B clearly show that no influence such as reduction in contrast ratio was observed in the azimuth opposite to the minimum azimuth (in the azimuth at an azimuth angle Φ of 225°) and two azimuths perpendicular to the minimum azimuth (in the azimuths at azimuth angles Φ 135° and 315°).

Figure 46A:
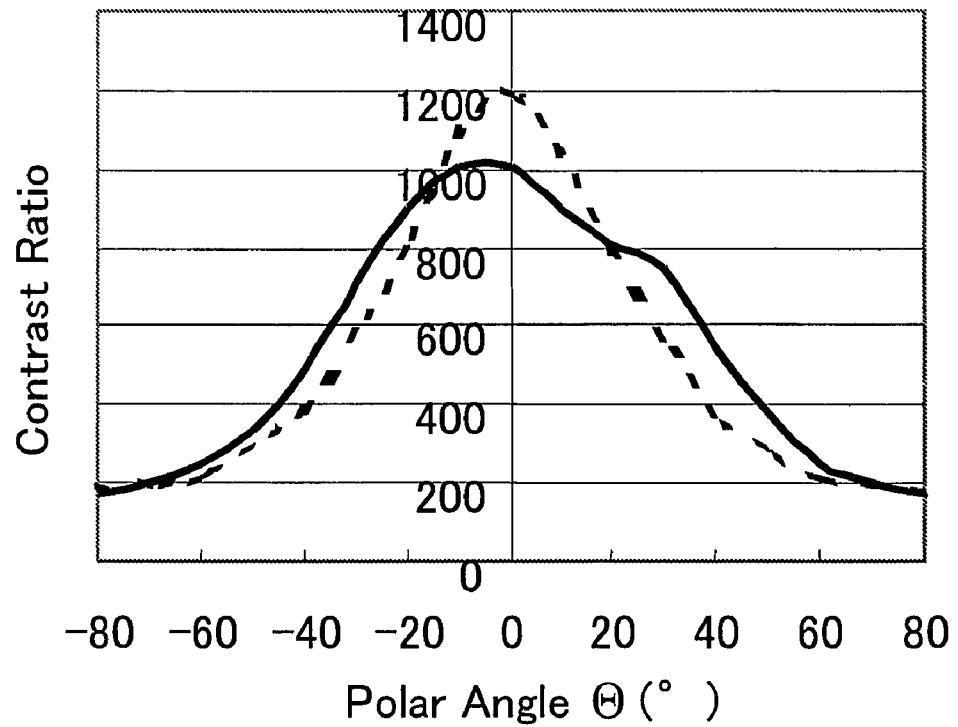
FIG. 46A is a diagram showing polar angle dependencies of contrast ratios in two azimuths at azimuth angles $\Phi$ of 90° and 270° of the OCB mode liquid crystal display element (broken line) and the OCB mode liquid crystal display (solid line) according to Embodiment 17 of the present invention.
Figure 46B:
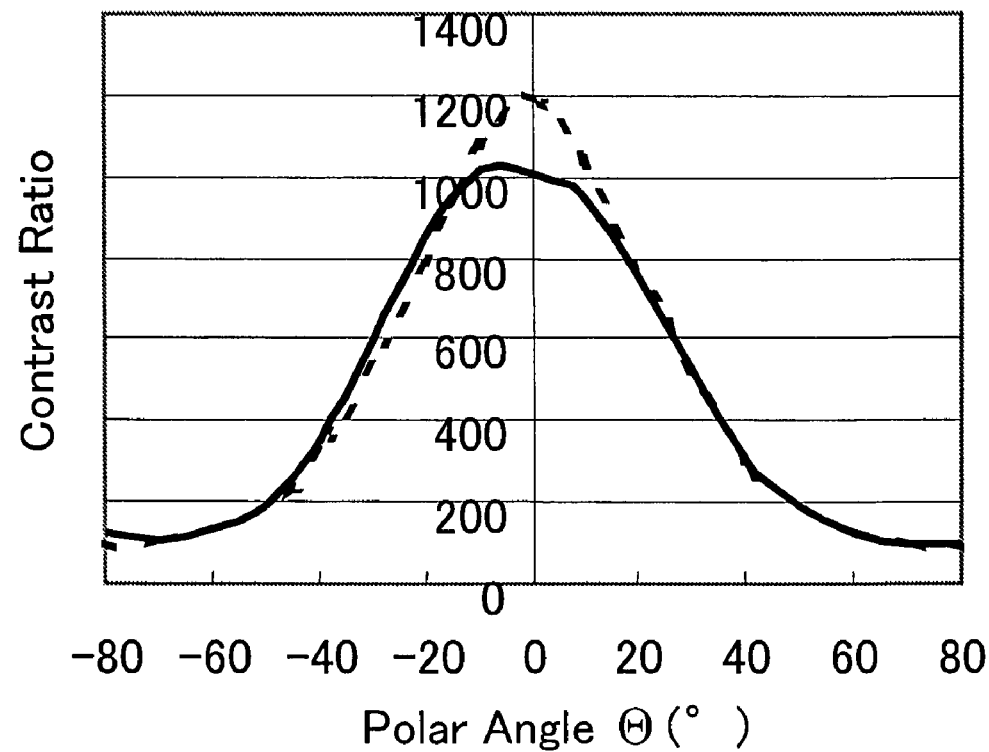
FIG. 46B is a diagram showing polar angle dependencies of contrast ratios in two azimuths at azimuth angles $\Phi$ of 0° and 180° of the OCB mode liquid crystal display element (broken line) and the OCB mode liquid crystal display (solid line) according to Embodiment 17 of the present invention.

In the OCB mode liquid crystal display according to Embodiment 17 of the present invention, FIG. 46A clearly shows that in almost the same minimum azimuth as the axial azimuth of the scattering central axis (in the azimuth at an azimuth angle Φ of 0°), the contrast ratio was improved near the axial direction of the scattering central axis (in the direction having a polar angle Θ of 30°). Therefore, the effect of improving the viewing angle dependency of the contrast ratio was obtained. FIGS. 46A and 46B clearly show that no influence such as reduction in contrast ratio was observed in the azimuth opposite to the minimum azimuth (in the azimuth at an azimuth angle Φ of 180°) and two azimuths perpendicular to the minimum azimuth (in the azimuths at azimuths Φ of 90° and 270°).

The reason why these results were obtained is explained as follows. In the liquid crystal displays according to Embodiments 9 to 17 of the present invention, the first anisotropic scattering film or the second anisotropic scattering film is attached to the viewing screen side of the liquid crystal display element in such a way that the axial azimuth of the scattering central axis is almost the same as the azimuth in which the contrast ratio of the liquid crystal display element in the direction inclined by 45° from the normal direction of the viewing screen of the liquid crystal display element showed a minimum value (the minimum azimuth). Therefore, light (black luminance) which enters the film in the direction substantially parallel to the axial direction of the scattering central axis is scattered in all directions about the scattering central axis and averaged, and thereby the viewing angle dependency of the contrast ratio can be improved at least in almost the same minimum azimuth as the axial azimuth of the scattering central axis. The first anisotropic scattering film shows the scattering property shown in FIG. 7 and the second anisotropic scattering film shows the scattering property shown in FIG. 5. The light which enters the films in directions other than the direction substantially parallel to the axial direction of the scattering central axis is weakly scattered. Therefore, it can be impossible to suppress the scattering of light which enters the film in such directions from reducing display quality in directions showing a large contrast ratio, and the like.

In contrast, in the liquid crystal display according to Comparative Embodiment 1, the isotropic scattering film which was used instead of the first anisotropic scattering film or the second anisotropic scattering film shows the scattering property shown in FIG. 15, and it is impossible for the isotropic scattering film to scatter incident light from a specific direction in all directions and thereby average the light. Therefore, the viewing angle dependency of the contrast ratio cannot be improved. In addition, in the liquid crystal display according to Comparative Embodiment 3, the LUMISTY® which was used instead of the first anisotropic scattering film or the second anisotropic scattering film shows anisotropic scattering property only in a specific azimuth. Therefore, in azimuths in which the film shows no anisotropic scattering property, even incident light in directions showing a small contrast ratio is intensely scattered. As a result, the scattering of the incident light in such directions reduces the largest contrast ratio obtained in the front direction, and the like.

"Evaluation of Improvement in Gamma Curve"

A gamma curve in the front direction (in the direction having a polar angle Θ of 0°) and gamma curves in oblique directions (in four directions having a polar angle Θ of 40° and an azimuth in which the contrast ratio of the liquid crystal display element showed a minimum value at a polar angle Θ of 40°) were measured. The luminance at white display was defined as 1, and the luminance at each gray scale display was normalized. Then, a deviation (deviation quantity) between the normalized luminance in the front direction at intermediate scale display (grading value: 128) and the normalized luminance in each oblique direction at intermediate scale display (grading value: 128) was calculated. Table 17 shows the proportion of the improvement effect, which was determined by comparison the above-mentioned deviation in the liquid crystal display element and that in the liquid crystal display. That is, the larger the value described in Table 17, the larger the improvement effect is.

TABLE 17

|  | Φ = 45° | Φ = 135° | Φ = 225° | Φ = 315° |
|---|---|---|---|---|
| Embodiment 1 | 40 | 20 | 18 | 21 |
| Embodiment 2 | 37 | 19 | 20 | 17 |
| Embodiment 3 | 43 | 16 | 25 | 23 |
| Embodiment 4 | 39 | 20 | 24 | 26 |
| Embodiment 5 | 48 | 25 | 16 | 20 |
| Comparative Embodiment 1 | 8 | 12 | 11 | 14 |
| Comparative Embodiment 2 | 42 | 10 | 15 | 13 |

Table 17 clearly shows that in the liquid crystal displays according to Embodiments 9 to 13 of the present invention, the effect of improving the deviation in the gamma curve was large in almost the same minimum azimuth as the axial azimuth of the scattering central axis (in the azimuth at an azimuth angle Φ of 45°). Also in three minimum azimuths other than the minimum azimuth (in the azimuths at azimuth angles Φ of 135°, 225°, and 315°), the effect of improving the deviation in the gamma curve was obtained. However, in the liquid crystal display according to Comparative Embodiment 1, the effect of improving the deviation in the gamma curve was small in each azimuth. In the liquid crystal display according to Comparative Embodiment 3, the effect of improving the deviation in the gamma curve was large in almost the same maximum azimuth as the scattering direction (in the azimuth at an azimuth angle Φ of 45°). However, the largest contrast ratio was significantly lowered as shown in the above-mentioned evaluation results of improvement in viewing angle dependency of the contrast ratio.

The reason why these results were obtained is explained as follows. The gamma curve in VA mode liquid crystal display elements is generally designed to be optimal in the direction shows the largest contrast ratio. The viewing angle dependency of the gamma curve has the same tendency as in the viewing angle dependency of the contrast ratio. According to the liquid crystal displays in Embodiments 9 to 13 of the present invention and Comparative Embodiment 3, the first anisotropic scattering film and the LUMISTY® show anisotropic scattering property in at least one azimuth. Therefore, the viewing angle dependency of the gamma curve can be significantly improved in the minimum azimuth if each film is attached to the viewing screen side of the VA mode liquid crystal display element in such a way that the azimuth in which each film shows anisotropic scattering property is almost the same as the minimum azimuth of the VA mode liquid crystal display element. According to the liquid crystal displays in Embodiments 9 to 13, the first anisotropic scattering film shows anisotropic scattering property in all azimuths. Therefore, even in three minimum azimuths other than the minimum azimuth that is almost the same as the azimuth in which each film shows anisotropic scattering property, the viewing angle dependency of the gamma curve can be improved. In contrast, according to the liquid crystal display in Comparative Embodiment 1, the isotropic scattering film which was used instead of the first anisotropic scattering film shows no anisotropic scattering property, and therefore it is impossible for the film to scatter only incident light from a specific direction in all directions and thereby average the light. As a result, the viewing angle dependency of the gamma curve cannot be improved.

What is claimed is:

1. A display comprising:
   a display element with a contrast ratio dependent on a viewing angle; and
   an anisotropic scattering film having an anisotropic scattering layer,
   wherein the anisotropic scattering film is located on a viewing screen side of the display element and has a scattering central axis
   wherein a linear transmitting light quantity of the anisotropic scattering film varies substantially symmetrically about a direction of the scattering central axis,
   wherein the scatting central axis is inclined from a normal direction of the viewing screen,
   wherein the contrast ratio has an extreme value in a direction inclined by an angle from the normal direction, and
   an azimuth of the scattering central axis is substantially the same as an azimuth in which the contrast ratio has the extreme value.

2. The display according to claim 1, wherein the extreme value is a maximum value.

3. The display according to claim 1, wherein the extreme value is a minimum value.

4. The display according to claim 1, wherein the scattering central axis is in substantially the same direction as the normal direction of the viewing screen of the display element.

5. The display according to claim 1, wherein the anisotropic scattering film has a scattering central axis in substantially the same azimuth as an azimuth in which a contrast ratio of the display element in a direction inclined by a certain angle of 20° or more from the normal direction of the viewing screen of the display element has an extreme value.

6. The display according to claim 1, wherein the anisotropic scattering film has a scattering central axis in substantially the same azimuth as an azimuth in which a contrast ratio of the display element in a direction inclined by 45° from the normal direction of the viewing screen of the display element has an extreme value.

7. The display according to claim 1, wherein the anisotropic scattering layer is formed by curing a composition containing a photo-curable compound.

8. The display according to claim 1, wherein the anisotropic scattering film has a direction showing a linear transmitting light quantity not larger than a linear transmitting light quantity in an axial direction of the scattering central axis and having an azimuth that is the same as the azimuth in which the contrast ratio of the display element in the direction inclined by the certain angle from the normal direction of the viewing screen of the display element has the extreme value.

9. The display according to claim 8, wherein an angle formed by an axial azimuth of the scattering central axis and the azimuth in which the contrast ratio of the display element in the direction inclined by the certain angle from the normal direction of the viewing screen of the display element has the extreme value is 15° or less.

10. The display according to claim 9, wherein the angle formed by the axial azimuth of the scattering central axis and the azimuth in which the contrast ratio of the display element in the direction inclined by the certain angle from the normal direction of the viewing screen of the display element has the extreme value is 10° or less.

11. The display according to claim 1, wherein the anisotropic scattering film has the scattering central axis in a direction forming a smaller angle with a direction showing the smallest linear transmitting light quantity of the anisotropic scattering film than an angle with a direction showing the largest linear transmitting light quantity of the anisotropic scattering film.

12. The display according to claim 1, wherein the anisotropic scattering film has an azimuth in which a polar angle of a direction showing the smallest linear transmitting light quantity is smaller than a polar angle of a direction showing the largest linear transmitting light quantity.

13. The display according to claim 1, wherein, in the anisotropic scattering film, the largest value of a linear transmitting light quantity in a direction having a polar angle larger than a polar angle of an axial direction of the scattering central axis is smaller than the largest value of a linear transmitting light quantity in a direction having a polar angle smaller than a polar angle of an axial direction of the scattering central axis, in an axial azimuth of the scattering central axis.

14. The display according to claim 1, wherein the display element is a liquid crystal display element.

15. The display according to claim 14, wherein the liquid crystal display element comprises: a liquid crystal cell having a liquid crystal sandwiched between a pair of substrates; and a polarizing plate including a supporting film and a polarizing element.

16. The display according to claim 14, wherein the liquid crystal display element has a display mode of a VA mode, a TN mode, an IPS mode, or an OCB mode.

* * * * *